United States Patent
Aoyagi (12)

(10) Patent No.: US 9,080,528 B2
(45) Date of Patent: Jul. 14, 2015

(54) CONTROL DEVICE FOR INTERNAL COMBUSTION ENGINE

(75) Inventor: Shinsuke Aoyagi, Zama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 383 days.

(21) Appl. No.: 13/696,474

(22) PCT Filed: May 17, 2010

(86) PCT No.: PCT/JP2010/058684
§ 371 (c)(1),
(2), (4) Date: Nov. 6, 2012

(87) PCT Pub. No.: WO2011/145223
PCT Pub. Date: Nov. 24, 2011

(65) Prior Publication Data
US 2013/0054122 A1 Feb. 28, 2013

(51) Int. Cl.
*F02D 41/30* (2006.01)
*F02D 41/22* (2006.01)
*F02D 41/18* (2006.01)
*F02D 41/00* (2006.01)
*F02D 41/14* (2006.01)

(52) U.S. Cl.
CPC .............. *F02D 41/22* (2013.01); *F02D 41/146* (2013.01); *F02D 41/182* (2013.01); *F02D 41/005* (2013.01); *F02D 41/144* (2013.01); *F02D 41/1454* (2013.01); *F02D 2200/0406* (2013.01); *F02D 2250/36* (2013.01)

(58) Field of Classification Search
CPC . F02D 41/146; F02D 41/1462; F02D 41/144; F02D 41/1454; F02D 41/22
USPC .................. 123/672, 436; 701/103, 104, 109; 73/114.31, 114.71, 114.72, 114.73
See application file for complete search history.

(56) References Cited

U.S. PATENT DOCUMENTS

| | | | |
|---|---|---|---|
| 5,341,643 | A | 8/1994 | Hamburg et al. |
| 2010/0024520 | A1 | 2/2010 | Sawada et al. |

FOREIGN PATENT DOCUMENTS

| | | |
|---|---|---|
| JP | A-2-5736 | 1/1990 |
| JP | A-6-299886 | 10/1994 |
| JP | A-2002-371893 | 12/2002 |
| JP | A-2003-49685 | 2/2003 |
| JP | A-2007-127004 | 5/2007 |
| JP | A-2007-262946 | 10/2007 |
| JP | A-2008-215260 | 9/2008 |

*Primary Examiner* — Hai Huynh
(74) *Attorney, Agent, or Firm* — Oliff PLC

(57) ABSTRACT

A control device for an internal combustion engine, which determines a fuel injection quantity deviation state and/or an intake oxygen concentration-related parameter deviation state on the basis of the relationship between the target value (Qtgt) of the fuel injection quantity and an NOx concentration deviation (ΔNOx) indicating the difference of the measured value or the estimate value of the NOx concentration of exhaust gas with respect to a predetermined NOx reference concentration, the control device having a state determination means for, on the basis of a first determination index including the amount of change of the NOx concentration deviation (ΔNOx) when the target value (Qtgt) of the fuel injection quantity increases within a predetermined range and the NOx concentration deviation (ΔNOx) when the target value (Qtgt) of the fuel injection quantity is a predetermined first value (Qtgt2), determining whether the fuel injection quantity deviation is zero, positive, or negative.

21 Claims, 24 Drawing Sheets

CONTROL DEVICE FOR INTERNAL COMBUSTION ENGINE

TECHNICAL FIELD

The present invention relates to a control device for an internal combustion engine that controls an amount of nitrogen oxide (hereinafter referred to as "NOx") exhausted from the internal combustion engine.

BACKGROUND ART

Gases exhausted from internal combustion engines such as spark-ignited internal combustion engines and diesel engines (especially from diesel engines) include several substances, hereinafter referred to as "emission(s)", such as NOx and particle matters (hereinafter referred to as "PM"). It is desirable to decrease the amount of the emissions as much as possible. Examples of methods to decrease the amount of the emissions in the exhaust gases includes a method where an EGR gas amount, which is an amount of gas recirculated with an EGR device, is controlled depending on operating conditions of the internal combustion engines.

On the other hand, there is a trade-off relationship between the amount of NOx in the exhaust gas and the amount of PM in the exhaust gas, as is known in this technical field. That is, the amount of PM will increase when the internal combustion engine is controlled so as to decrease the amount of NOx, or the amount of NOx will increase when the internal combustion engine is controlled so as to decrease the amount of PM. Therefore, it is desirable to control the internal combustion engine in consideration of both of the amount of NOx and the amount of PM from the viewpoint of overall decrease of the amount of the emissions.

Specifically, it is desirable to control the internal combustion engine so that the amount of NOx is adjusted to coincide with a predetermined target amount according to operating conditions of the internal combustion engine in order to decrease the amount of NOx as much as possible while suppressing increase of the amount of PM. For example, one of conventional control devices for internal combustion engines (hereinafter referred to as "conventional device") obtains operating parameters such as concentration of oxygen in gas introduced into cylinder, oxygen concentration of intake air; pressure of the gas in the cylinder, cylinder pressure; amount of fuel injected in the cylinder; and timing of the injection of the fuel in the cylinder. And then, the conventional device is configured to estimate the amount of NOx by applying values of the operating parameters to a predetermined model for estimating the amount of NOx. Furthermore, the conventional device is configured to control the amount of EGR gas, etc., so as to adjust the estimated amount of NOx to coincide with a predetermined target value, NOx target value (for example, see JP2002-371893A).

SUMMARY OF INVENTION

1. Technical Problem

The conventional device is configured to control the amount of EGR gas, etc., so as to adjust the amount of NOx that is estimated based on predetermined operating parameters to coincide with the predetermined NOx target value. In other words, the conventional device controls the amount of EGR gas, etc., on the assumption that "the obtained values of the operating parameters are coincide with actual (real) values thereof (i.e., the obtained values of the operating parameters are normal)". However, several factors may lead to a defect in members relevant to the values of the operating parameters (for example, various sensors and fuel injectors, etc.) such as malfunction and aging degradation, etc. Furthermore, the members relevant to the values of the operating parameters may have structural variation (i.e., manufacturing difference in dimensions and performances etc., between same kinds of members). The defects such as malfunction and aging degradation, etc., and the structural variation are hereinafter referred collectively to as "abnormality".

when the abnormality occurs, the values of the operating parameters obtained by the conventional device may not be normal. In the case that the operating parameters are not normal, the conventional device cannot control the amount of NOx appropriately. Furthermore, the conventional device cannot determine how different the obtained values (i.e., values different from the actual (real) values of the operating parameters) are from the actual (real) values of the operating parameters in the case that the operating parameters are not normal.

2. Solution to Problem

In view of the above technical problems, it is an object of the present invention to provide a control device for an internal combustion engine. Specifically, the control device can determine how different actual (real) values of operating parameters that affect to the amount of NOx in exhaust gas of an internal combustion engine are from obtained values of the operating parameters, even in the case that the abnormality occurs.

"First control device for internal combustion engine" according to the present invention for solving the above problem comprises: a means for determining a target value of fuel injection amount; a means for obtaining a parameter relevant to intake oxygen concentration; a means for obtaining the intake oxygen concentration; a means for obtaining NOx concentration; and a means for determining situations. Hereinafter, these means will be described in detail.

The means for determining a target value of fuel injection amount is configured to determine a target value of "fuel injection amount" based on an operating condition of the internal combustion engine. Here, the fuel injection amount is an amount of fuel injected (supplied) in a cylinder of the internal combustion engine. As the operating condition of the internal combustion engine, operating parameters required to determine the target value of fuel injection amount may be appropriately employed. For example, an engine rotation speed and an opening degree of accelerator pedal may be employed as the operating condition of internal combustion engine.

The means for obtaining a parameter relevant to intake oxygen concentration is configured to obtain a measured value, an estimated value or a target value of "the parameter relevant to intake oxygen concentration". Here, the intake oxygen concentration is an oxygen concentration of gas introduced into the cylinder. For example, at least one of the following amounts may be employed as the parameter relevant to intake oxygen concentration: an intake air amount that is an amount of air introduced into the internal combustion engine, a fuel injection amount that is an amount of fuel injected in the cylinder, the engine rotation speed, a pressure of gas in an intake passage of the internal combustion engine, a pressure of gas in an exhaust passage of the internal combustion engine, and a fuel injection timing that is a timing to inject fuel in the cylinder. Furthermore, when the exhaust gas recirculation (EGR) to recirculate the exhaust gas from the exhaust passage toward the intake passage is carried out, EGR ratio may be employed as the parameter relevant to intake oxygen concentration. Here, the EGR ratio is defined as a ratio of "an amount of EGR gas that is recirculated toward the intake passage by the exhaust gas recirculation" in reference to "an amount of gas introduced into the cylinder (that is, an amount of mixture of air introduced from the outside of the internal combustion engine and exhaust gas recirculated toward the intake passage by the exhaust gas recirculation)". Additionally, in the case that a device for the measurement of the intake oxygen concentration (for example, a sensor for intake oxygen concentration) is provided at a predetermined location on the intake passage, output value of the device may be employed as the parameter relevant to intake oxygen concentration.

Method for obtaining above "a measured value, an estimated value or a target value of the parameter relevant to intake oxygen concentration" is not specifically limited. For example, known measurement methods or known estimation method to obtain a predetermined parameter relevant to intake oxygen concentration, or known setting method of target value, may be employed as the method.

The means for obtaining the intake oxygen concentration is configured to obtain "the intake oxygen concentration" based on the parameter relevant to intake oxygen concentration. Method for obtaining above "intake oxygen concentration" is not specifically limited. For example, the following method may be employed as the method: a method where a relational expression representing a relationship between a predetermined parameter relevant to intake oxygen concentration and the intake oxygen concentration is defined in advance, and then an actual parameter relevant to intake oxygen concentration is applied to the relational expression to calculate the intake oxygen concentration. Furthermore, for example, a method where the intake oxygen concentration is obtained based on output value of the device for the measurement of the intake oxygen concentration may be employed as the method.

The above "method where an actual parameter relevant to intake oxygen concentration is applied to a predetermined relational expression to calculate the intake oxygen concentration" is not specifically limited. For example, when the exhaust gas recirculation (EGR) is carried out, a method where the intake oxygen concentration is calculated based on the EGR ratio and air excess ratio may be employed as the method. Here, the air excess ratio is a ratio of actual air-fuel ratio (real air-fuel ratio) in reference to the stoichiometric air-fuel ratio ($\approx 14.7$). Furthermore, for example, a method where the intake oxygen concentration is calculated based on the oxygen concentration of outside gas (air) of the internal combustion engine and the pressure of gas in the intake passage may be employed as the method.

The means for obtaining NOx concentration is configured to obtain a measured value or an estimated value of "NOx concentration" of gas discharged from the cylinder. Here, the NOx concentration is a concentration of nitrogen oxide. Method for obtaining "a measured value or an estimated value of NOx concentration" is not specifically limited. For example, the following method may be employed as the method for obtaining the measured value or the estimated value of the NOx concentration: a method where a device for the measurement of the NOx concentration (for example, a sensor for NOx concentration) is provided at a predetermined location on the exhaust passage, and the "measured value" of the NOx concentration is obtained based on output value of the device. Furthermore, for example, the following method may be employed as the method: a method where a relationship between a predetermined parameter (for example, intake oxygen concentration and fuel injection amount) and the NOx concentration (for example, map of NOx concentration) is obtained in advance by experiments, and then an actual operating parameter is applied to the relationship to obtain the "estimated value" of the NOx concentration. Additionally, for example, a method where an actual operating parameter is applied to a model for estimating NOx concentration may be employed as the method. Here, the model for estimating NOx concentration is a model where the NOx concentration is estimated based on a predetermined operating parameter (for example, intake oxygen concentration and fuel injection amount).

The means for determining situations is configured to determine at least one of:

whether a difference in fuel injection amount being "zero", "positive" or "negative", the difference in fuel injection amount being "a relative difference of an actual value of the fuel injection amount in reference to the target value thereof";

whether the difference in fuel injection amount being "a value within a predetermined range including zero", "a value larger than the maximum value in the predetermined range" or "a value smaller than the minimum value in the predetermined range";

whether a difference in the parameter relevant to intake oxygen concentration being "zero", "positive" or "negative", the difference in the parameter relevant to intake oxygen concentration being "a relative difference of the measured value, the estimated value or the target value of the parameter in reference to an actual value thereof"; or whether the difference in the parameter relevant to intake oxygen concentration being "a value within a predetermined range including zero", "a value larger than the maximum value in the predetermined range" or "a value smaller than the minimum value in the predetermined range".

The above difference in fuel injection amount may be a numerical value that is able to express a difference between "an actual value of fuel injection amount" and "the target value of fuel injection amount" in reference to "the target value of fuel injection amount", but is not specifically limited. For example, the following value may be employed as the difference in fuel injection amount: a value obtained by dividing "a value calculated by subtracting the target value of the fuel injection amount from the actual value thereof" by "the target value of the fuel injection amount" (that is, a ratio of the subtracted value in reference to the target value of fuel injection amount). Furthermore, for example, "a value obtained by subtracting the target value of the fuel injection amount from the actual value thereof" itself may be employed as the difference in fuel injection amount.

More specifically, when the actual value of the fuel injection amount is larger than the target value of fuel injection amount, the difference in fuel injection amount is "positive". Furthermore, when the actual value of the fuel injection amount coincides with the target value of fuel injection amount, the difference in fuel injection amount is "zero". Additionally, when the actual value of the fuel injection amount is smaller than the target value of fuel injection amount, the difference in fuel injection amount is "negative".

The above difference in parameter relevant to intake oxygen concentration may be a numerical value that is able to express a difference between "an actual value of the parameter relevant to intake oxygen concentration" and "the measured value, the estimated value or the target value of the parameter relevant to intake oxygen concentration" in reference to "the actual value of the parameter relevant to intake oxygen concentration", but is not specifically limited. For example, the following value may be employed as the difference in parameter relevant to intake oxygen concentration: a value obtained by dividing "a value calculated by subtracting the actual value of the parameter relevant to intake oxygen concentration from the measured value, the estimated value or the target value of the parameter relevant to intake oxygen concentration" by "the actual value of the parameter relevant to intake oxygen concentration" (that is, a ratio of the subtracted value in reference to the actual value of the parameter relevant to intake oxygen concentration). Furthermore, for example, "a value obtained by subtracting the actual value of the parameter relevant to intake oxygen concentration from the measured value, the estimated value or the target value of the parameter relevant to intake oxygen concentration" itself may be employed as the difference in parameter relevant to intake oxygen concentration.

More specifically, when the measured value, the estimated value or the target value of the parameter relevant to intake oxygen concentration is larger than the actual value of the parameter relevant to intake oxygen concentration, the difference in parameter relevant to intake oxygen concentration is "positive". Furthermore, when the measured value, the estimated value or the target value of the parameter relevant to intake oxygen concentration coincides with the actual value of the parameter relevant to intake oxygen concentration, the difference in parameter relevant to intake oxygen concentration is "zero". Additionally, when the measured value, the estimated value or the target value of the parameter relevant to intake oxygen concentration is smaller than the actual value of the parameter relevant to intake oxygen concentration, the difference in parameter relevant to intake oxygen concentration is "negative".

Hereinafter, "whether a difference in fuel injection amount is zero, positive or negative; or whether the difference in fuel injection amount is a value within a predetermined range including zero, a value larger than the maximum value in the predetermined range or a value smaller than the minimum value in the predetermined range" is simply referred to as "situation of the difference in fuel injection amount" for convenience. Furthermore, hereinafter, "whether a difference in the parameter relevant to intake oxygen concentration is zero, positive or negative; or whether the difference in the parameter relevant to intake oxygen concentration is a value within a predetermined range including zero, a value larger than the maximum value in the predetermined range or a value smaller than the minimum value in the predetermined range" is simply referred to as "situation of the difference in parameter relevant to intake oxygen concentration" for convenience.

The above "predetermined range" according to the difference in fuel injection amount may be a range where the difference in fuel injection amount may be deemed to be zero, from the view point of decreasing the amount of the emissions of internal combustion engine as much as possible, but is not specifically limited. Furthermore, the above "predetermined range" according to the difference in parameter relevant to intake oxygen concentration may be a range where the difference in parameter relevant to intake oxygen concentration may be deemed to be zero, from the view point of decreasing the amount of the emissions of internal combustion engine as much as possible, but is not specifically limited. These "predetermined range" may be determined based on a required amount of the emissions on the internal combustion engine, etc.

Hereinafter, the situation where "the difference in fuel injection amount is zero or the value within the predetermined range, and the difference in parameter relevant to intake oxygen concentration is zero or the value within the predetermined range" is referred to as "the fuel injection amount and the parameter relevant to intake oxygen concentration are normal" for convenience. Furthermore, hereinafter, the situation where "at least one of the difference in fuel injection amount being zero or the value within the predetermined range, and the difference in parameter relevant to intake oxygen concentration being zero or the value within the predetermined range is not met" is referred to as "the fuel injection amount and the parameter relevant to intake oxygen concentration are abnormal" for convenience.

More specifically regarding indications that are used when the situation of the difference in fuel injection amount and the situation of the difference in parameter relevant to intake oxygen concentration are determined, the means for determining situations is configured to determine at least one of the situation of the difference in fuel injection amount and the situation of the difference in parameter relevant to intake oxygen concentration based on at least one of the following indications:

(1) a first indication including: an amount of change of "NOx concentration difference" with an increasing amount of the target value of the fuel injection amount within a predetermined range, the NOx concentration difference being "a relative difference of the measured value or the estimated value of the NOx concentration in reference to a predetermined NOx referential concentration"; and the NOx concentration difference upon the target value of fuel injection amount being a predetermined "first value"; and (2) a second indication including: an amount of change of NOx concentration difference with an increasing amount of the intake oxygen concentration within a predetermined range; and the NOx concentration difference upon the intake oxygen concentration being a predetermined "second value".

The above NOx concentration difference may be a numerical value that is able to express a difference between "the NOx referential concentration" and "a measured value or an estimated value of NOx concentration" in reference to "the NOx referential concentration", but is not specifically limited. For example, the following value may be employed as the NOx concentration difference: a value obtained by dividing "a value calculated by subtracting the NOx referential concentration from the measured value or the estimated value thereof" by "the NOx referential concentration" (that is, a ratio of the subtracted value in reference to the NOx referential concentration). Furthermore, for example, "a value obtained by subtracting the NOx referential concentration from the measured value or the estimated value thereof" itself may be employed as the NOx concentration difference.

More specifically, when the measured value or the estimated value of NOx concentration is larger than the NOx referential concentration, the NOx concentration difference is "positive". Furthermore, when the measured value or the estimated value of NOx concentration coincides with the NOx referential concentration, the NOx concentration difference is "zero". Additionally, when the measured value or the estimated value of NOx concentration is smaller than the NOx referential concentration, the NOx concentration difference is "negative".

The above "NOx referential concentration" corresponds to "a NOx concentration that is obtained when the difference in fuel injection amount is zero or a value within the predetermined range and the difference in parameter relevant to intake oxygen concentration is zero or a value within the predetermined range". In other words, when the fuel injection amount and the parameter relevant to intake oxygen concentration are normal, the NOx concentration difference is zero or a value within the predetermined range.

The above "predetermined range" according to the NOx concentration difference may be a range where the NOx concentration difference may be deemed to be zero, from the view point of decreasing the amount of the emissions of internal combustion engine as much as possible, but is not specifically limited. This "predetermined range" may be determined based on a required amount of the emissions on the internal combustion engine, etc.

Method for determining the NOx referential concentration is not specifically limited. For example, the following method may be employed as the method: a method where "a relationship between a predetermined operating parameter (e.g., the fuel injection amount and the parameter relevant to intake oxygen concentration) and the NOx concentration, regarding an internal combustion engine that has been confirmed to perform so that the fuel injection amount and the parameter relevant to intake oxygen concentration are normal" is obtained in advance by experiments, and an actual operating parameter is applied to the relationship, then the obtained NOx concentration is defined as the NOx referential concentration. Furthermore, for example, a method where an actual operating parameter is applied to a model for estimating NOx concentration may be employed as the method. Here, the model for estimating NOx concentration is a model where the NOx concentration is estimated based on a predetermined operating parameter (for example, intake oxygen concentration and fuel injection amount).

The above "first value" and the above "second value" may be an appropriate value in order to determine at least one of the situation of the difference in fuel injection amount and the situation of the difference in parameter relevant to intake oxygen concentration, but are not specifically limited. Furthermore, the above "predetermined range" according to the target value of fuel injection amount and the above "predetermined range" according to the intake oxygen concentration may be an appropriate range in order to determine at least one of the situation of the difference in fuel injection amount and the situation of the difference in parameter relevant to intake oxygen concentration, but are not specifically limited.

The above "first indication" may be configured to "only" include: the amount of change of NOx concentration difference with an increasing amount of the target value of the fuel injection amount within the predetermined range; and the NOx concentration difference when the target value of fuel injection amount is the first value. Furthermore, the above "first indication" may be configured to include: the amount of change of NOx concentration difference with an increasing amount of the target value of the fuel injection amount within the predetermined range; the NOx concentration difference when the target value of fuel injection amount is the first value; and "other" parameters (i.e., parameters other than them) that may affect the above determination.

The above "second indication" may be configured to "only" include: the amount of change of NOx concentration difference with an increasing amount of the intake oxygen concentration within the predetermined range; and the NOx concentration difference when the intake oxygen concentration is the second value. Furthermore, the above "second indication" may be configured to include: the amount of change of NOx concentration difference with an increasing amount of the intake oxygen concentration within the predetermined range; the NOx concentration difference when the intake oxygen concentration is the second value; and "other" parameters (i.e., parameters other than them) that may affect the above determination.

Subsequently, the relationship between the operating parameter of internal combustion engine and the NOx concentration will be described, before descriptions of the specific method for determining the situation of the difference in fuel injection amount and the situation of the difference in parameter relevant to intake oxygen concentration.

According to the Extended Zeldovich Mechanism, which is one of known combustion models (thermal-NOx generation mechanisms), the concentration of nitrogen oxide generated through combustion process is affected by nitrogen concentration and oxygen concentration in gas to be subjected to the combustion, and flame temperature during the combustion. The inventor of the invention has studied the Extended Zeldovich Mechanism in more detail. Through considerations and experiments by the inventor, it has been recognized that there is a strong association between the amount of NOx included in exhausted gas of internal combustion engine (that is, the NOx concentration), the amount of fuel injected (supplied) into the cylinder of internal combustion engine (that is, the fuel injection amount), and the oxygen concentration of gas introduced into the cylinder (that is, the intake oxygen concentration). Furthermore, through the considerations and experiments by the inventor, it has been recognized that "the degree of the association between the fuel injection amount and NOx concentration" is different from "the degree of the association between the intake oxygen concentration and the NOx concentration". In addition, this intake oxygen concentration is a value that is determined based on the parameter relevant to intake oxygen concentration.

Therefore, the degree of the NOx concentration difference in the case that the "difference in fuel injection amount" occurs is different from the degree of the NOx concentration difference in the case that the "difference in parameter relevant to intake oxygen concentration" occurs. Furthermore, the degree of the NOx concentration difference in the case that the "difference in fuel injection amount" occurs when the target value of fuel injection amount is a predetermined value is different from the degree of the NOx concentration difference in the case that the "difference in parameter relevant to intake oxygen concentration" occurs when the target value of fuel injection amount is that predetermined value. Additionally, the degree of the NOx concentration difference in the case that the "difference in fuel injection amount" occurs when the intake oxygen concentration is a predetermined value is different from the degree of the NOx concentration difference in the case that the "difference in parameter relevant to intake oxygen concentration" occurs when the intake oxygen concentration is that predetermined value.

Furthermore, as described above, the NOx concentration difference is determined so as to be zero or a value within the predetermined range including zero when the fuel injection amount and the parameter relevant to intake oxygen concentration are normal (that is, the difference in fuel injection amount is zero or a value within the predetermined range and the difference in parameter relevant to intake oxygen concentration is zero or a value within the predetermined range). Therefore, the NOx concentration difference changes depending on the amount of the difference in fuel injection amount, and the NOx concentration difference changes depending on the amount of the difference in parameter relevant to intake oxygen concentration.

As described above, there is a certain association between the NOx concentration, the fuel injection amount, the intake oxygen concentration, the NOx concentration difference, the difference in fuel injection amount, and the difference in parameter relevant to intake oxygen concentration. Therefore, the means for determining situations is configured to determine the situation of the difference in fuel injection amount and the situation of the difference in parameter relevant to intake oxygen concentration by using the "first indication (that is, the relationship between the fuel injection amount and the NOx concentration difference)" and the "second indication (that is, the relationship between the intake oxygen concentration and the NOx concentration difference)".

Namely, the means for determining situations is configured to determine at least one of:

(A) whether the difference in fuel injection amount is "zero", "positive" or "negative";
(B) whether the difference in fuel injection amount being "a value within a predetermined range including zero", "a value larger than the maximum value in the predetermined range" or "a value smaller than the minimum value in the predetermined range";
(C) whether the difference in the parameter relevant to intake oxygen concentration being "zero", "positive" or "negative"; or
(D) whether the difference in the parameter relevant to intake oxygen concentration being "a value within a predetermined range including zero", "a value larger than the maximum value in the predetermined range" or "a value smaller than the minimum value in the predetermined range", based on at least one of the first indication and the second indication.

As described above, the first control device for internal combustion engine according to the present invention can determine at least one of "the situation of the difference in fuel injection amount" and "the situation of the difference in parameter relevant to intake oxygen concentration" by using the NOx concentration difference. That is, the first control device for internal combustion engine can determine how different actual values of the fuel injection amount and the parameter relevant to intake oxygen concentration are from obtained values thereof, when the NOx concentration difference occurs.

Additionally, if the means for determining situations determines that the difference in fuel injection amount is zero or a value within the predetermined range including zero, then it can be also determined that a member relevant to the fuel injection amount is normal. Furthermore, if the means for determining situations determines that the difference in parameter relevant to intake oxygen concentration is zero or a value within the predetermined range including zero, then it can be also determined that a member relevant to the intake oxygen concentration is normal.

Furthermore, "second control device for internal combustion engine" according to the present invention for solving the above problem comprises: a means for determining a target value of fuel injection amount; a means for obtaining a parameter relevant to intake oxygen concentration; a means for obtaining the intake oxygen concentration; a means for obtaining NOx concentration; and a means for determining situations. Hereinafter, these means will be described in detail.

The means for determining a target value of fuel injection amount, the means for obtaining a parameter relevant to intake oxygen concentration, the means for obtaining the intake oxygen concentration, and the means for obtaining NOx concentration are the same as the means for determining a target value of fuel injection amount, the means for obtaining a parameter relevant to intake oxygen concentration, the means for obtaining the intake oxygen concentration, and the means for obtaining NOx concentration of "the first control device", respectively.

The means for determining situations is configured to determine at least one of:

whether "the difference in fuel injection amount" being "zero", "positive" or "negative", or whether the difference in fuel injection amount being "a value within a predetermined range including zero", "a value larger than the maximum value in the predetermined range" or "a value smaller than the minimum value in the predetermined range"; or whether "the difference in the parameter relevant to intake oxygen concentration" being "zero", "positive" or "negative", or whether the difference in the parameter relevant to intake oxygen concentration being "a value within a predetermined range including zero", "a value larger than the maximum value in the predetermined range" or "a value smaller than the minimum value in the predetermined range.

The difference in fuel injection amount and the difference in parameter relevant to intake oxygen concentration are the same as the difference in fuel injection amount and the difference in parameter relevant to intake oxygen concentration that are explained associated with "the first control device for internal combustion engine", respectively.

Hereinafter, the following terms are used in the same meaning as the corresponding terms of "the first control device for internal combustion engine": "situation of the difference in fuel injection amount", "situation of the difference in parameter relevant to intake oxygen concentration", "the fuel injection amount and the parameter relevant to intake oxygen concentration are normal", and "the fuel injection amount and the parameter relevant to intake oxygen concentration are abnormal".

More specifically regarding indications that are used when the situation of the difference in fuel injection amount and the situation of the difference in parameter relevant to intake oxygen concentration are determined, the means for determining situations is configured to determine at least one of the situation of the difference in fuel injection amount and the situation of the difference in parameter relevant to intake oxygen concentration based on at least one of the following indications:

(1) a first indication including a "NOx concentration difference" upon the target value of fuel injection amount being a "predetermined first value", the NOx concentration difference being "a relative difference of the measured value or the estimated value of the NOx concentration in reference to a predetermined NOx referential concentration"; and (2) a second indication including the NOx concentration difference upon the intake oxygen concentration being a "predetermined second value".

The above "difference in fuel injection amount", the above "NOx referential concentration" and the "predetermined range" according to the NOx concentration difference are the same as the "difference in fuel injection amount", the "NOx referential concentration" and the "predetermined range" that are explained associated with "the first control device for internal combustion engine", respectively.

Method for determining the NOx referential concentration is not specifically limited, and is the same as the "method for determining the NOx referential concentration" explained associated with "the first control device for internal combustion engine".

The above "first indication" may be configured to "only" include the NOx concentration difference when the target value of fuel injection amount is the first value. Furthermore, the above "first indication" may be configured to include: the NOx concentration difference when the target value of fuel injection amount is the first value; and "other" parameters (i.e., parameters other than them) that may affect the above determination.

The above "second indication" may be configured to "only" include the NOx concentration difference when the intake oxygen concentration is the second value. Furthermore, the above "second indication" may be configured to include: the NOx concentration difference when the intake oxygen concentration is the second value; and "other" parameters (i.e., parameters other than them) that may affect the above determination.

In addition, the relationship between the operating parameter of internal combustion engine and the NOx concentration associated with "the second control device for internal combustion engine" is the same as the relationship between the operating parameter of internal combustion engine and the NOx concentration associated with "the first control device for internal combustion engine".

Accordingly, there is a certain association between the NOx concentration, the fuel injection amount, the intake oxygen concentration, the NOx concentration difference, the difference in fuel injection amount, and the difference in parameter relevant to intake oxygen concentration. Therefore, the means for determining situations is configured to determine the situation of the difference in fuel injection amount and the situation of the difference in parameter relevant to intake oxygen concentration by using the "first indication (that is, the relationship between the fuel injection amount and the NOx concentration difference)" and the "second indication (that is, the relationship between the intake oxygen concentration and the NOx concentration difference)".

Namely, the means for determining situations is configured to determine at least one of:
(A) whether the difference in fuel injection amount is "zero", "positive" or "negative";
(B) whether the difference in fuel injection amount being "a value within a predetermined range including zero", "a value larger than the maximum value in the predetermined range" or "a value smaller than the minimum value in the predetermined range";
(C) whether the difference in the parameter relevant to intake oxygen concentration being "zero", "positive" or "negative"; or
(D) whether the difference in the parameter relevant to intake oxygen concentration being "a value within a predetermined range including zero", "a value larger than the maximum value in the predetermined range" or "a value smaller than the minimum value in the predetermined range",
based on at least one of the first indication and the second indication.

Here, the means for determining situations is configured to employ, as the "first value", at least one of:
the fuel injection amount estimated "to allow the NOx concentration difference to be zero or the value within the predetermined range" upon "the difference in the parameter relevant to intake oxygen concentration being zero or the value within the predetermined range and the difference in fuel injection amount not being zero or the value within the predetermined range"; and
the fuel injection amount estimated "to allow the NOx concentration difference to be zero or the value within the predetermined range" upon "the difference in fuel injection amount being zero or the value within the predetermined range and the difference in the parameter relevant to intake oxygen concentration not being zero or the value within the predetermined range".

As described above, the "first value" is a value corresponding to the target value of fuel injection amount. In the case that a value estimated "to allow the NOx concentration difference to be zero or the value within the predetermined range when the difference in the parameter relevant to intake oxygen concentration is zero or the value within the predetermined range and the difference in fuel injection amount is not zero or the value within the predetermined range" is employed as the first value (that is, the target value of fuel injection amount), if the difference in parameter relevant to intake oxygen concentration is zero or a value within the predetermined range, then the NOx concentration difference becomes zero or a value within the predetermined range including zero regardless of the amount of the difference in fuel injection amount. That is, in this case, the difference in fuel injection amount does not affect the NOx concentration difference. In other words, in this case, "only the difference in parameter relevant to intake oxygen concentration" affects the NOx concentration difference. Therefore, the means for determining situations can determine the situation of the difference in parameter relevant to intake oxygen concentration more appropriately, by using the NOx concentration difference in this case (that is, the first indication).

On the other hand, in the case that a value estimated "to allow the NOx concentration difference to be zero or the value within the predetermined range when the difference in fuel injection amount is zero or the value within the predetermined range and the difference in the parameter relevant to intake oxygen concentration is not zero or the value within the predetermined range" is employed as the first value, if the difference in fuel injection amount is zero or a value within the predetermined range, then the NOx concentration difference becomes zero or a value within the predetermined range including zero regardless of the amount of the difference in parameter relevant to intake oxygen concentration. That is, in this case, the difference in parameter relevant to intake oxygen concentration does not affect the NOx concentration difference. In other words, in this case, "only the difference in fuel injection amount" affects the NOx concentration difference. Therefore, the means for determining situations can determine the situation of the difference in fuel injection amount more appropriately, by using the NOx concentration difference in this case (that is, the first indication).

Furthermore, the means for determining situations is configured to employ, as the "second value", at least one of:
the intake oxygen concentration estimated "to allow the NOx concentration difference to be zero or the value within the predetermined range" upon "the difference in the parameter relevant to intake oxygen concentration being zero or the value within the predetermined range and the difference in fuel injection amount not being zero or the value within the predetermined range"; and
the intake oxygen concentration estimated "to allow the NOx concentration difference to be zero or the value within the predetermined range" upon "the difference in fuel injection amount being zero or the value within the predetermined range and the difference in the parameter relevant to intake oxygen concentration not being zero or the value within the predetermined range".

As described above, the "second value" is a value corresponding to the intake oxygen concentration. In the case that a value estimated "to allow the NOx concentration difference to be zero or the value within the predetermined range when the difference in the parameter relevant to intake oxygen concentration is zero or the value within the predetermined range and the difference in fuel injection amount is not zero or the value within the predetermined range" is employed as the second value (that is, the intake oxygen concentration), if the difference in parameter relevant to intake oxygen concentration is zero or a value within the predetermined range, then the NOx concentration difference becomes zero or a value within the predetermined range including zero regardless of the amount of the difference in fuel injection amount. That is, in this case, the difference in fuel injection amount does not affect the NOx concentration difference. In other words, in this case, "only the difference in parameter relevant to intake oxygen concentration" affects the NOx concentration difference. Therefore, the means for determining situations can determine the situation of the difference in parameter relevant to intake oxygen concentration more appropriately, by using the NOx concentration difference in this case (that is, the second indication).

On the other hand, in the case that a value estimated "to allow the NOx concentration difference to be zero or the value within the predetermined range when the difference in fuel injection amount being zero or the value within the predetermined range and the difference in the parameter relevant to intake oxygen concentration is not zero or the value within the predetermined range" is employed as the second value, if the difference in fuel injection amount is zero or a value within the predetermined range, then the NOx concentration difference becomes zero or a value within the predetermined range including zero regardless of the amount of the difference in parameter relevant to intake oxygen concentration. That is, in this case, the difference in parameter relevant to intake oxygen concentration does not affect the NOx concentration difference. In other words, in this case, "only the difference in fuel injection amount" affects the NOx concentration difference. Therefore, the means for determining situations can determine the situation of the difference in fuel injection amount more appropriately, by using the NOx concentration difference in this case (that is, the second indication).

In addition, as described above, the "predetermined range" according to the NOx concentration difference may be a range where the NOx concentration difference may be deemed to be zero, from the view point of decreasing the amount of the emissions of internal combustion engine as much as possible, but is not specifically limited.

As described above, the second control device for internal combustion engine according to the present invention can determine at least one of "the situation of the difference in fuel injection amount" and "the situation of the difference in parameter relevant to intake oxygen concentration" by using the NOx concentration difference. That is, the second control device for internal combustion engine can determine how different actual values of the fuel injection amount and the parameter relevant to intake oxygen concentration are from obtained values thereof, when the NOx concentration difference occurs.

Additionally, if the means for determining situations determines that the difference in fuel injection amount is zero or a value within the predetermined range including zero, then it can be also determined that a member relevant to the fuel injection amount is normal. Furthermore, if the means for determining situations determines that the difference in parameter relevant to intake oxygen concentration is zero or a value within the predetermined range including zero, then it can be also determined that a member relevant to the intake oxygen concentration is normal.

Hereinafter, "the first control device for internal combustion engine according to the present invention" and "the second control device for internal combustion engine according to the present invention" are referred collectively to as "the control device for internal combustion engine according to the present invention" for convenience.

As a first embodiment of the control device for internal combustion engine according to the present invention, the control device may be configured to comprise a means for correcting values.

This means for correcting values may be configured to correct the following values so as to:

(1) "decrease" the target value of the fuel injection amount by "a first correction amount" upon being determined as the difference in fuel injection amount being "positive" or "a value larger than the maximum value in the predetermined range";

(2) "increase" the target value of fuel injection amount by "a second correction amount" upon being determined as the difference in fuel injection amount being "negative" or "a value smaller than the minimum value in the predetermined range";

(3) "decrease" the measured value, the estimated value or the target value of the parameter relevant to intake oxygen concentration by "a third correction amount" upon being determined as the difference in the parameter relevant to intake oxygen concentration being "positive" or "a value larger than the maximum value in the predetermined range"; and (4) "increase" the measured value, the estimated value or the target value of the parameter relevant to intake oxygen concentration by "a fourth correction amount" upon being determined as the difference in the parameter relevant to intake oxygen concentration being "negative" or "a value smaller than the minimum value in the predetermined range".

As described above, the control device for internal combustion engine according to the present invention can determine how different actual values of the fuel injection amount and the parameter relevant to intake oxygen concentration are from obtained values thereof (that is, the situation of the difference in fuel injection amount and the situation of the difference in parameter relevant to intake oxygen concentration), when the NOx concentration difference occurs.

Therefore, the means for correcting values corrects the target value of fuel injection amount and the measured value, the estimated value or the target value of the parameter relevant to intake oxygen concentration, depending on the situation of the difference in fuel injection amount and the situation of the difference in parameter relevant to intake oxygen concentration. Thereby, the amount of "the difference in fuel injection amount" and "the difference in parameter relevant to intake oxygen concentration" are decreased. As a result thereof, the amount of "the NOx concentration difference" is decreased.

As a second embodiment of the control device for internal combustion engine according to the present invention, the means for determining situations may be configured so as to determine at least one of:

whether the difference in fuel injection amount being zero, positive or negative;

whether the difference in fuel injection amount being a value within a predetermined range including zero, a value larger than the maximum value in the predetermined range or a value smaller than the minimum value in the predetermined range;

whether the difference in the parameter relevant to intake oxygen concentration being zero, positive or negative; or whether the difference in the parameter relevant to intake oxygen concentration being a value within a predetermined range including zero, a value larger than the maximum value in the predetermined range or a value smaller than the minimum value in the predetermined range, based on "both" of the first indication and the second indication.

The means for determining situations of this embodiment determines at least one of the situation of the difference in fuel injection amount and the situation of the difference in parameter relevant to intake oxygen concentration based on "both" of the first indication and the second indication. Therefore, the means for determining situations of this embodiment can determine these situations more accurately compared with the determination carried out based on "one" of the first indication and the second indication.

As a third embodiment of the control device for internal combustion engine according to the present invention, the means for correcting values may be configured so as to determine amounts of the first correction amount, the second correction amount, the third correction amount and the fourth correction amount depending on "an amount of the NOx concentration difference".

As described above, the means for correcting values of the "first embodiment" is configured to correct the target value of fuel injection amount by a predetermined correction amount (the first correction amount or the second correction amount) depending on the amount of the NOx concentration difference. Furthermore, this means for correcting values is configured to correct the measured value, the estimated value or the target value of the parameter relevant to intake oxygen concentration by a predetermined correction amount (the third correction amount or the fourth correction amount) depending on the amount of the NOx concentration difference.

As described above, there is a strong association between the NOx concentration, the fuel injection amount, and the intake oxygen concentration. Therefore, it is thought that there may be a certain association between the amount of the NOx concentration difference, the amount of the difference in fuel injection amount, and the amount of the difference in parameter relevant to intake oxygen concentration. Accordingly, the means for correcting values according to "the third embodiment" is configured to determine the amount of the correction amount depending on the amount of NOx concentration difference. Thereby, the means for correcting values of this embodiment can correct the target value of fuel injection amount and the measured value, the estimated value or the target value of the parameter relevant to intake oxygen concentration more accurately, in the case that at least one of the difference in fuel injection amount and the difference in parameter relevant to intake oxygen concentration occurs. Then, the amount of "the difference in fuel injection amount" and the amount of "the difference in parameter relevant to intake oxygen concentration" are decreased more appropriately. As a result thereof, the amount of "the NOx concentration difference" is decreased more appropriately.

As a fourth embodiment of the control device for internal combustion engine according to the present invention, the means for correcting values may be configured so as to:
(1) repeatedly correct the target value of the fuel injection amount until being determined as the difference in fuel injection amount being zero or a value within the predetermined range; and
(2) repeatedly correct the measured value, the estimated value or the target value of the parameter relevant to intake oxygen concentration until being determined as the difference in the parameter relevant to intake oxygen concentration being zero or a value within the predetermined range.

As described above, the means for correcting values according to the "first embodiment" and "the third embodiment" are configured to correct the target value of fuel injection amount and the measured value, the estimated value or the target value of the parameter relevant to intake oxygen concentration.

Furthermore, the means for correcting values of the "fourth embodiment" is configured to repeatedly carry out the correction. Thereby, the means for correcting values of this embodiment can decrease the difference in fuel injection amount and the difference in parameter relevant to intake oxygen concentration to substantially zero (zero or a value within the predetermined range), in the case that at least one of the difference in fuel injection amount and the difference in parameter relevant to intake oxygen concentration occurs. As a result thereof, the amount of "the NOx concentration difference" is decreased to substantially zero (zero or a value within the predetermined range).

As a fifth embodiment of the control device for internal combustion engine according to the present invention, the control device may be configured to comprise a means for determining abnormality.

The means for determining abnormality is configured to determine at least one of: "whether or not the fuel being normally injected"; and "whether or not the measured value, the estimated value or the target value of the parameter relevant to intake oxygen concentration being normally obtained", and the means for determining abnormality may be configured so as to:

determine as "the fuel not being normally injected" upon at least one of the first correction amount and the second correction amount being larger than a predetermined threshold value; and determine as "the measured value, the estimated value or the target value of the parameter relevant to intake oxygen concentration not being normally obtained" upon at least one of the third correction amount and the fourth correction amount being larger than a predetermined threshold value".

Hereinafter, the situation where "the fuel is not normally injected" is referred to as "the fuel injection amount is abnormal" for convenience. Furthermore, the situation where "the measured value, the estimated value or the target value of the parameter relevant to intake oxygen concentration is not normally obtained" is referred to as "the parameter relevant to intake oxygen concentration is abnormal".

As described above, the means for correcting values according to the first embodiment, the second embodiment, the third embodiment and the fourth embodiment is configured to correct the target value of fuel injection amount and the measured value, the estimated value or the target value of the parameter relevant to intake oxygen concentration by a predetermined correction amount, in the case that at least one of the difference in fuel injection amount and the difference in parameter relevant to intake oxygen concentration occurs.

Furthermore, the means for determining abnormality according to the "fifth embodiment" is configured to determine whether or not the fuel injection amount is abnormal and whether or not the parameter relevant to intake oxygen concentration is abnormal based on the amount of the correction amount. Thereby, for example, in the case that it is determined that the fuel injection amount is abnormal, the control device for internal combustion engine according to the present invention may notify an operator of the internal combustion engine accordingly. Furthermore, for example, in the case that it is determined that the parameter relevant to intake oxygen concentration is abnormal, the control device for internal combustion engine according to the present invention may notify the operator accordingly.

The above "predetermined threshold value" according to the first correction amount and the second correction amount may be an appropriate value where the amount of the emissions becomes an unacceptable amount from the view point of decreasing the amount of the emissions of internal combustion engine as much as possible when at least one of the first correction amount and the second correction amount is larger than the predetermined threshold value, but is not specifically limited. Furthermore, the above "predetermined threshold value" according to the third correction amount and the fourth correction amount may be an appropriate value where the amount of the emissions becomes an unacceptable amount from the view point of decreasing the amount of the emissions of internal combustion engine as much as possible when at least one of the third correction amount and the fourth correction amount is larger than the predetermined threshold value, but is not specifically limited.

As a sixth embodiment of the control device for internal combustion engine according to the present invention, the means for determining abnormality may be configured so as to "accumulate":

the first correction amount every time the target value of the fuel injection amount being corrected;

the second correction amount every time the target value of the fuel injection amount being corrected;

the third correction amount every time the measured value, the estimated value or the target value of the parameter relevant to intake oxygen concentration being corrected; and the fourth correction amount every time the measured value, the estimated value or the target value of the parameter relevant to intake oxygen concentration being corrected, and the means for determining abnormality may be configured so as to:

determine as the fuel not being normally injected upon at least one of "the accumulated value of the first correction amount" and "the accumulated value of the second correction amount" being larger than a predetermined threshold value; and determine as the measured value, the estimated value or the target value of the parameter relevant to intake oxygen concentration not being normally obtained upon at least one of "the accumulated value of the third correction amount" and "the accumulated value of the fourth correction amount being larger than a predetermined threshold value".

As described above, the means for correcting values according to the "fourth embodiment" is configured to repeatedly correct the target value of fuel injection amount and the measured value, the estimated value or the target value of the parameter relevant to intake oxygen concentration.

Therefore, the means for determining abnormality according to the "sixth embodiment" is configured to: accumulate the correction amount used for the correction every time the correction carries out; and determine whether or not the fuel injection amount is abnormal and the parameter relevant to intake oxygen concentration is abnormal, based on the accumulated correction amount. Thereby, as the same as the above, when it is determined for example that the fuel injection amount is abnormal, the control device for internal combustion engine according to the present invention may notify the operator of the internal combustion engine accordingly. Furthermore, when it is determined for example that the parameter relevant to intake oxygen concentration is abnormal, the control device for internal combustion engine according to the present invention may notify the operator of the internal combustion engine accordingly.

The above "predetermined threshold value" according to the accumulated value of the first correction amount and the accumulated value of the second correction amount may be an appropriate value where the amount of the emissions becomes an unacceptable amount from the view point of decreasing the amount of the emissions of internal combustion engine as much as possible when at least one of the accumulated value of the first correction amount and the accumulated value of the second correction amount is larger than the predetermined threshold value, but is not specifically limited. Furthermore, the above "predetermined threshold value" according to the accumulated value of the third correction amount and the fourth correction amount may be an appropriate value where the amount of the emissions becomes an unacceptable amount from the view point of decreasing the amount of the emissions of internal combustion engine as much as possible when at least one of the third correction amount and the fourth correction amount is larger than the predetermined threshold value, but is not specifically limited.

As the seventh embodiment of the control device for internal combustion engine according to the present invention, the means for determining situations may be configured so as to employ:

as "the first value", at least one of:

the fuel injection amount estimated "to allow the NOx concentration difference to be zero or the value within the predetermined range" upon "the difference in the parameter relevant to intake oxygen concentration being zero or the value within the predetermined range and the difference in fuel injection amount not being zero or the value within the predetermined range"; and the fuel injection amount estimated "to allow the NOx concentration difference to be zero or the value within the predetermined range" upon "the difference in fuel injection amount being zero or the value within the predetermined range and the difference in the parameter relevant to intake oxygen concentration not being zero or the value within the predetermined range".

As described above, the "first value" is a value corresponding to the target value of fuel injection amount. In the case that a value estimated "to allow the NOx concentration difference to be zero or the value within the predetermined range when the difference in the parameter relevant to intake oxygen concentration is zero or the value within the predetermined range and the difference in fuel injection amount is not zero or the value within the predetermined range" is employed as the first value (that is, the target value of fuel injection amount), if the difference in parameter relevant to intake oxygen concentration is zero or a value within the predetermined range, then the NOx concentration difference becomes zero or a value within the predetermined range including zero regardless of the amount of the difference in fuel injection amount. That is, in this case, the difference in fuel injection amount does not affect the NOx concentration difference. In other words, in this case, "only the difference in parameter relevant to intake oxygen concentration" affects the NOx concentration difference. Therefore, the means for determining situations can determine the situation of the difference in parameter relevant to intake oxygen concentration more appropriately, by using the NOx concentration difference in this case (that is, the first indication).

On the other hand, in the case that a value estimated "to allow the NOx concentration difference to be zero or the value within the predetermined range when the difference in fuel injection amount is zero or the value within the predetermined range and the difference in the parameter relevant to intake oxygen concentration is not zero or the value within the predetermined range" is employed as the first value, if the difference in fuel injection amount is zero or a value within the predetermined range, then the NOx concentration difference becomes zero or a value within the predetermined range including zero regardless of the amount of the difference in parameter relevant to intake oxygen concentration. That is, in this case, the difference in parameter relevant to intake oxygen concentration does not affect the NOx concentration difference. In other words, in this case, "only the difference in fuel injection amount" affects the NOx concentration difference. Therefore, the means for determining situations can determine the situation of the difference in fuel injection amount more appropriately, by using the NOx concentration difference in this case (that is, the first indication).

Furthermore, the means for determining situations according to the seventh embodiment may be configured so as to employ:

as "the second value", at least one of:

the intake oxygen concentration estimated "to allow the NOx concentration difference to be zero or the value within the predetermined range" upon "the difference in the parameter relevant to intake oxygen concentration being zero or the value within the predetermined range and the difference in fuel injection amount not being zero or the value within the predetermined range; and the intake oxygen concentration estimated "to allow the NOx concentration difference to be zero or the value within the predetermined range" upon "the difference in fuel injection amount being zero or the value within the predetermined range and the difference in the parameter relevant to intake oxygen concentration not being zero or the value within the predetermined range".

As described above, the "second value" is a value corresponding to the intake oxygen concentration. In the case that a value estimated "to allow the NOx concentration difference to be zero or the value within the predetermined range when the difference in the parameter relevant to intake oxygen concentration is zero or the value within the predetermined range and the difference in fuel injection amount is not zero or the value within the predetermined range" is employed as the second value (that is, the intake oxygen concentration), if the difference in parameter relevant to intake oxygen concentration is zero or a value within the predetermined range, then the NOx concentration difference becomes zero or a value within the predetermined range including zero regardless of the amount of the difference in fuel injection amount. That is, in this case, the difference in fuel injection amount does not affect the NOx concentration difference. In other words, in this case, "only the difference in parameter relevant to intake oxygen concentration" affects the NOx concentration difference. Therefore, the means for determining situations can determine the situation of the difference in parameter relevant to intake oxygen concentration more appropriately, by using the NOx concentration difference in this case (that is, the second indication).

On the other hand, in the case that a value estimated "to allow the NOx concentration difference to be zero or the value within the predetermined range when the difference in fuel injection amount being zero or the value within the predetermined range and the difference in the parameter relevant to intake oxygen concentration is not zero or the value within the predetermined range" is employed as the second value, if the difference in fuel injection amount is zero or a value within the predetermined range, then the NOx concentration difference becomes zero or a value within the predetermined range including zero regardless of the amount of the difference in parameter relevant to intake oxygen concentration. That is, in this case, the difference in parameter relevant to intake oxygen concentration does not affect the NOx concentration difference. In other words, in this case, "only the difference in fuel injection amount" affects the NOx concentration difference. Therefore, the means for determining situations can determine the situation of the difference in fuel injection amount more appropriately, by using the NOx concentration difference in this case (that is, the second indication).

In addition, as described above, the "predetermined range" according to the NOx concentration difference may be a range where the NOx concentration difference may be deemed to be zero, from the view point of decreasing the amount of the emissions of internal combustion engine as much as possible, but is not specifically limited.

As an eighth embodiment of the control device for internal combustion engine according to the present invention, the means for obtaining the parameter relevant to intake oxygen concentration may be configured so as to employ an "intake air amount" as one of the parameter relevant to intake oxygen concentration. Here, the intake air amount is an amount of air introduced into the internal combustion engine.

The above intake air amount is one of typical parameters relevant to the intake oxygen concentration. In addition, when the "intake air amount" is employed as the parameter relevant to intake oxygen concentration, the means for obtaining the parameter relevant to intake oxygen concentration may be configured to obtain "a measured value or an estimated value of the intake air amount".

The above method for obtaining "a measured value or an estimated value of the intake air amount" is not specifically limited. For example, the following method may be employed as the method for obtaining the measured value or the estimated value of the intake air amount: a method where a device for the measurement of the intake air amount (for example, a hot-wire air flow mater and a flap-type air flow meter) is provided at a predetermined location on the intake passage, and the "measured value" of the intake air amount is obtained based on output value of the device. Furthermore, for example, the following method may be employed as the method: a method where the "estimated value" of the intake air amount is obtained based on one or more of operating parameters such as an engine rotation speed, a pressure of gas in an intake passage, an engine rotation speed, and an opening degree of a throttle valve.

As a ninth embodiment of the control device for internal combustion engine according to the present invention, the control device may be configured to determine the NOx referential concentration by using a "model for estimating NOx concentration". Here, the model for estimating NOx concentration is configured so as to estimate the NOx concentration based on the fuel injection amount and the intake oxygen concentration.

As described above, through considerations and experiments by the inventor, it has been recognized that there is a strong association between the NOx concentration and the intake oxygen concentration. Therefore, the above model for estimating NOx concentration may be defined based on this association. Furthermore, as described above, the NOx referential concentration corresponds to the NOx concentration that is obtained when the fuel injection amount and the parameter relevant to intake oxygen concentration are normal. Therefore, it is configured that the NOx referential concentration according to the "ninth embodiment" is determined by using the model for estimating NOx concentration. Thereby, the NOx referential concentration can be obtained more easily compared with a method such that the NOx referential concentration is obtained by using "a relationship between the NOx referential concentration and predetermined parameters, obtained in advance by experiments, etc."

As a tenth embodiment of the control device for internal combustion engine according to the present invention, the control device may be configured to determine the "first value" and the "second value" by using the model for estimating NOx concentration.

As described above, the control device for internal combustion engine according to the present invention (both of the first control device and the second control device) is configured to determine at least one of the situation of the difference in fuel injection amount and the situation of the difference in parameter relevant to intake oxygen concentration by using at least one of "the NOx concentration difference when the target value of fuel injection amount is the first value" and "the NOx concentration difference when the intake oxygen concentration is the second value". It is desirable that the first value and the second value are set appropriately as much as possible to carry out the determination.

As described above, the above model for estimating NOx concentration is a model that represents a relationship between the fuel injection amount and the intake oxygen concentration. Therefore, "the first value and the second value that are set appropriately as much as possible to carry out the determination" can be determined by using the model for estimating NOx concentration.

For example, the first value and the second value employed in the "seventh embodiment" are included as the "value set appropriately as much as possible to carry out the determination". As described above, this first value is the fuel injection amount when the predetermined plural conditions are met, and this second value the parameter relevant to intake oxygen concentration when the predetermined plural conditions are met. In general, it is difficult to specify the fuel injection amount and the parameter relevant to intake oxygen concentration when such plural conditions are met. However, by using the model for estimating NOx concentration, it may be relatively easy to determine the first value and the second value.

DESCRIPTION OF EMBODIMENTS

Figure 1:
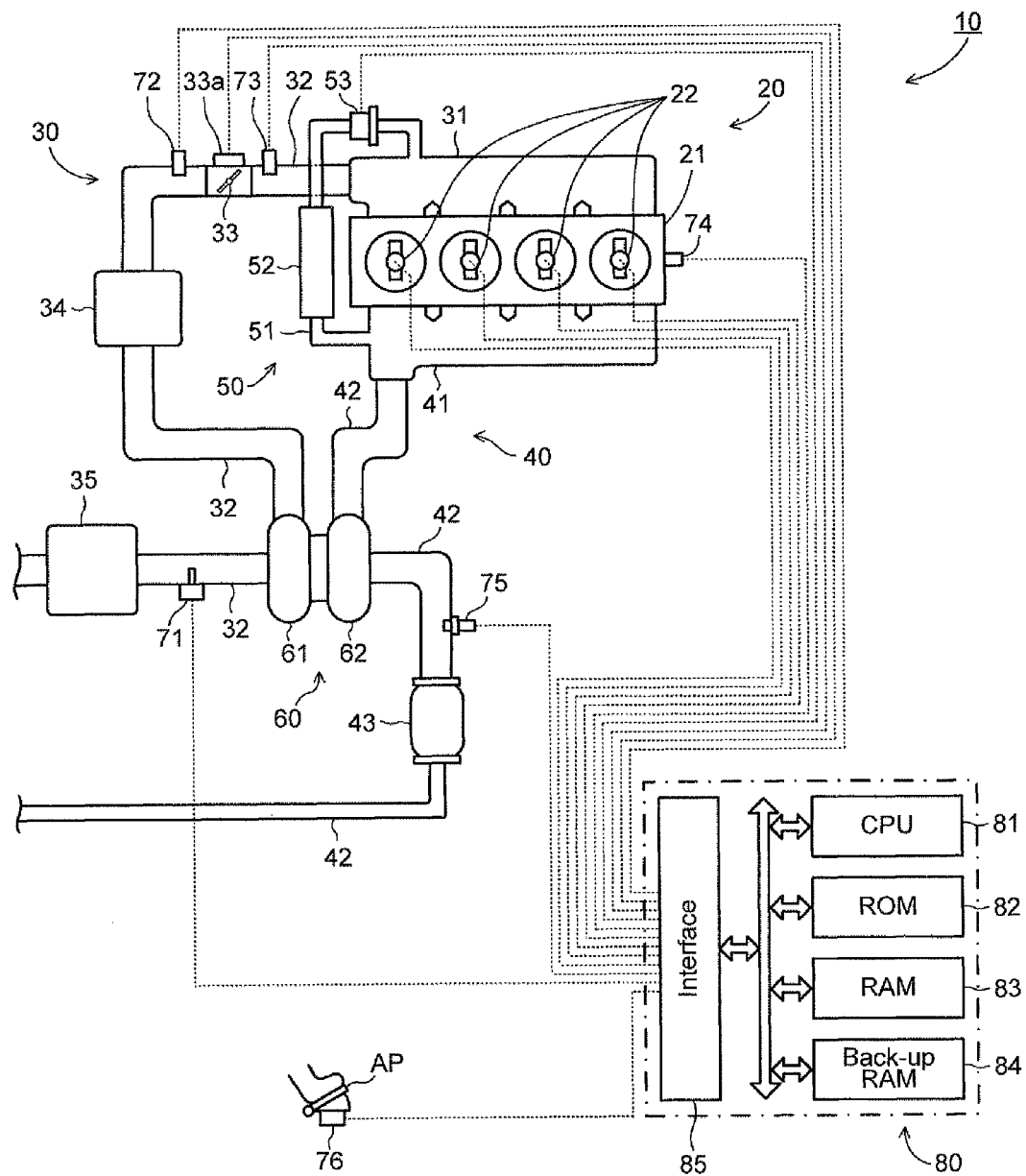
FIG. 1 is a schematic diagram of an internal combustion engine that employs a control device according to first embodiment of the invention.

Hereinafter, each embodiment of the control device for internal combustion engine of the present invention will be described by referring to the drawings.
(First Embodiment)
<Outline of Device>

FIG. 1 illustrates a schematic configuration of a system where a control device according to the first embodiment of the present invention (hereinafter referred to as "first device") is applied to internal combustion engine 10. The internal combustion engine 10 is a four-cylinder diesel engine that has four cylinders of first cylinder to fourth cylinder. Hereinafter, "internal combustion engine" is simply referred to as "engine" for convenience.

As illustrated in FIG. 1, the engine 10 includes an engine body 20 having a fuel injection (supplying) system, an intake system 30 to introduce air into the engine body 20, an exhaust system 40 to discharge exhaust gas from the engine body 20 to the outside of the engine 10, an EGR device 50 to recirculate the exhaust gas from the exhaust system 40 to the intake system 30, and a supercharging device 60 operated by energy of the exhaust gas to compress air introduced into the engine body 20.

The engine body 20 includes a cylinder head 21 to which the intake system 30 and the exhaust system 40 are connected. The cylinder head 21 includes plural fuel injecting devices 22 that are respectively provided in the upper portions of the respective cylinders so as to correspond to the respective cylinders. The respective fuel injecting devices 22 are connected to a fuel tank (not illustrated), and are configured to inject fuel into the combustion chambers of the respective cylinders depending on a command signal from an electric control device 80.

The intake system 30 includes an intake manifold 31 that communicates with the respective cylinders through the intake port (not illustrated) formed on the cylinder head 21, an intake pipe 32 that is connected to an assembled portion on the upstream side of the intake manifold 31, a throttle valve (intake throttle valve) 33 that changes opening cross-sectional area in the intake pipe 32, a throttle valve actuator 33a that rotationally operates the throttle valve 33 depending on a command signal from the electric control device 80, an intercooler 34 that is interposed in the intake pipe 32 on the upstream side of the throttle valve 33, and an air cleaner 35 that is disposed in the end portion of the intake pipe 32 on the upstream side of the supercharging device 60 provided in the upstream of the intercooler 34. The intake manifold 31 and the intake pipe 32 constitute the intake passage.

The exhaust system 40 includes an exhaust gas manifold 41 that communicates with the respective cylinders through the exhaust port 27 (not illustrated) formed on the cylinder head 21, an exhaust pipe 42 that is connected to an assembled portion on the downstream side of the exhaust gas manifold 41, and a catalyst (DPNR) 43 for purifying the exhaust gas. The catalyst 43 is interposed in the exhaust pipe 42 on the downstream side of the supercharging device 60 provided in the exhaust pipe 42. The exhaust gas manifold 41 and the exhaust pipe 42 constitute the exhaust passage.

The EGR device 50 includes an exhaust re-circulation pipe 51 that constitutes a passage (EGR passage) for re-circulating the exhaust gas from the exhaust gas manifold 41 to the intake manifold 31, an EGR gas cooling device (EGR cooler) 52 that is interposed in the exhaust re-circulating pipe 51, and an EGR control valve 53 that is interposed in the exhaust re-circulating pipe 51. The EGR control valve 53 is configured to change the amount of the exhaust gas that is re-circulated from the exhaust gas manifold 41 to the intake manifold 31 depending on a command signal from the electric control device 80.

The supercharging device 60 includes a compressor 61 and a turbine 62. The compressor 61 is disposed in the intake passage (intake pipe 32). The turbine 62 is disposed in the exhaust passage (exhaust pipe 42). The compressor 61 and the turbine 62 are connected to each other by a rotor shaft (not illustrated) so as to be coaxially rotatable about the rotor shaft. Thus, when the turbine 62 is rotated by the exhaust gas, the compressor 61 rotates and the air supplied into the compressor 61 is compressed (supercharging is performed).

The first device includes an intake air flow sensor 71, an intake air temperature sensor 72, an intake air pressure sensor 73, a crank position sensor 74, NOx concentration sensor 75, and an accelerator opening degree sensor 76. A hot-wire air flow meter may be employed as an example of the intake air flow sensor 71.

The intake air flow sensor 71 is disposed in the intake passage (intake pipe 32). The intake air flow sensor 71 is configured to output a signal depending on the amount of intake air that is the mass flow of air flowing through the intake pipe 32 and introduced into the engine 10 (that is, the mass of air introduced into the engine 10). A measured value Gamsr of the amount of intake air is obtained based on this signal.

The intake air temperature sensor 72 is disposed in the intake passage (intake pipe 32). The intake air temperature sensor 72 is configured to output a signal depending on the temperature of the intake air flowing through the intake pipe 32 and introduced into the engine 10. The intake air temperature is obtained based on this signal.

The intake air pressure sensor 73 is disposed on the intake pipe 32 on the downstream side of the throttle valve 33. The intake air pressure sensor 73 is configured to output a signal representing the pressure of the air in the intake pipe 32 at the portion where the sensor is disposed (that is, the pressure of air supplied into the combustion chamber of the engine 10. In other words, the supercharging pressure by the supercharging device 60). A measured value of the supercharging pressure (hereinafter simply referred to as "supercharging pressure Pim") is obtained based on this signal.

The crank position sensor 74 is disposed near a crank shaft (not illustrated). The crank position sensor 74 is configured to output a signal having a pulse of a narrow width for every 10 degrees rotation of the crank shaft and a pulse of a wide width for every 360 degrees rotation of the crank shaft. A measured value of the number of rotations per unit time of the crank shaft (hereinafter simply referred to as "the engine rotation speed NE") is obtained based on these signals.

The NOx concentration sensor 75 is disposed on the exhaust passage (exhaust pipe 42) on the upstream side of the catalyst (DPNR) 43 for purifying the exhaust gas. The NOx concentration sensor 75 is configured to output a signal depending on NOx concentration (mass concentration) of the exhaust gas through the exhaust pipe 42. A measured value NOxmsr of NOx concentration of the exhaust gas is obtained based on this signal.

The accelerator opening degree sensor 76 is disposed in an accelerator pedal AP that is operated by the operator of the engine 10. The accelerator opening degree sensor 75 is configured to output a signal depending on the opening degree of the accelerator pedal AP. A measured value of the opening degree of the accelerator pedal (hereinafter simply referred to as "accelerator opening degree Accp") is obtained based on this signal.

The electric control device 80 includes a CPU 81, a ROM 82 that stores a program executed by the CPU 81, a table (map), a constant, and etc. in advance, a RAM 83 that temporarily stores data if necessary by the CPU 81, a back-up RAM 84 that stores data in power-on state and keeps the stored data even in power-off state, and an interface 85 that includes an AD converter, and etc. The CPU 81, the ROM 82, the RAM 83, the back-up RAM 84 and the interface 85 are connected each other via a bus.

The interface 85 is connected to the respective sensors, etc. and configured to supply signals from the respective sensors, etc. to the CPU 81. In addition, the interface 85 is configured to output an operation signal (command signal) to the fuel injecting device 22, the throttle valve actuator 33a, the EGR control valve 53, and etc. depending on the command of the CPU 81.

<Outline of Operation of Device>

Hereinafter, the outline of the operation of the first device configured as described above will be described.

The first device obtains predetermined parameters (the measured value Gamsr of the amount of intake air, the supercharging pressure Pim, the engine rotation speed NE, and the measured value NOxmsr of NOx concentration of the exhaust gas) based on the signals output from the sensors. Furthermore, the first device controls the throttle valve 33 and the EGR valve 53 so as to adjust a target value Regrtgt of EGR ratio determined based on predetermined operating parameters to coincide with actual value Regract thereof. Additionally, The first device determines "target value Qtgt of fuel injection amount" based on predetermined operating parameters.

Next, The first device obtains (calculates) oxygen concentration of intake air introduced into cylinder, intake oxygen concentration Ocon, based on the measured value Gamsr of the intake air amount, the target value Regrtgt of EGR ratio, and the target value Qtgt of the fuel injection amount.

On the other hand, the first device has obtained in advance "the relationship between the target value Qtgt of the fuel injection amount and the intake oxygen concentration Ocon, MapNOxref(Qtgt, Ocon), regarding an internal combustion engine that has the same configuration as the engine 10 and that has been confirmed to perform so that the target value Qtgt of the fuel injection amount coincides with the actual value Qact thereof and the measured value Gamsr of the intake air amount coincides with the actual value Gaact thereof" by experiment, etc. The first device obtains NOx referential concentration NOxref by applying actual target value Qtgt of the fuel injection amount and the intake oxygen concentration Ocon to the relationship MapNOxref(Qtgt, Ocon).

Hereinafter, the condition that "the target value Qtgt of the fuel injection amount coincides with the actual value Qact thereof and the measured value Gamsr of the intake air amount coincides with the actual value Gaact thereof" is referred to as "the fuel injection amount and the intake air amount being normal" For convenience.

Then, the first device obtains "the NOx concentration difference ΔNOx" that is the value calculated by dividing "the value calculated by subtracting the NOx referential concentration NOxref from the measured value NOxmsr of the NOx concentration (NOxmsr−NOxref)" by "the NOx referential concentration NOxref". That is, the NOx concentration difference ΔNOx is a ratio of the value obtained by the subtraction (NOxmsr−NOxref) in reference to the NOx referential concentration NOxref.

During the engine 10 is being driven, the first device continues to obtain the target value Qtgt of the fuel injection amount and the NOx concentration difference together with matching them each other. Then, the first device determines the situation of the difference in fuel injection amount and the situation of the difference in intake air amount based on the obtained values. Hereinafter, "the determination of the situation of the difference in fuel injection amount and the situation of the difference in intake air amount" is simply referred to as "situation determination".

Regarding the first device, the difference in fuel injection amount represents a relative difference of the actual value Qact of the fuel injection amount in reference to the target value Qtgt thereof. Specifically, the first device obtains a value by calculated by dividing "the value calculated by subtracting the target value Qtgt of the fuel injection amount from the actual value Qact thereof (Qact−Qtgt)" by "the target value Qtgt of the fuel injection amount" (i.e., the ratio of the value Qact−Qtgt to the target value Qtgt of the fuel injection amount), and the value is treated as "the difference in fuel injection amount".

Furthermore, regarding the first device, the difference in intake air amount represents a relative difference of the measured value Gamsr of the intake air amount in reference to the actual value Gaact thereof. Specifically, the first device obtains a value calculated by dividing "the value calculated by subtracting the actual value Gaact of the intake air amount from the measured value Gamsr thereof (Gamsr−Gaact)" by "the actual value Gaact of the intake air amount" (i.e., the ratio of the value Gamsr−Gaact to the actual value Gaact of the intake air amount), and the value is treated as "the difference in intake air amount".

The first device corrects the target value Qtgt of the fuel injection amount by a predetermined correction amount so as to decrease the amount of the difference in fuel injection amount depending on the result of the situation determination. Furthermore, the first device corrects the measured value Gamsr of the intake air amount by a predetermined correction amount so as to decrease the amount of the difference in intake air amount depending on the result of the situation determination. Additionally, the first device repeats the correction until the difference in fuel injection amount becomes zero and the difference in intake air amount becomes zero.

The first device shows the status that "the fuel injecting device 22 is abnormal" on a display device (not illustrated in FIG. 1) etc., when the accumulated value of the correction amounts of the target value Qtgt of the fuel injection amount becomes larger than a predetermined threshold value. Furthermore, the first device shows the status that "the intake air flow sensor 71 is abnormal" on the display device etc., when the accumulated value of the correction amounts of the measured value Gamsr of the intake air amount becomes larger than a predetermined threshold value. These are the outline of operation of the first device.

<Method for Controlling Internal Combustion Engine>

Subsequently, the method employed in the first device for controlling the engine 10 will be described according to the following order of explanations 1-1 to 1-4, before descriptions of the specific operation of the first device.
(Explanation 1-1)
Explanation for a model for estimating NOx concentration.
(Explanation 1-2)
Explanation for reasons why the NOx concentration difference results when at least one of the difference in intake air amount and the difference in fuel injection amount occurs.
(Explanation 1-3)
Explanation for a method for determining the situation of the difference in fuel injection amount and the situation of the difference in intake air amount.
(Explanation 1-4)
Explanation for corrections depending on results of the situation determinations.
(Explanation 1-1) Explanation for a Model for Estimating NOx Concentration.

First, the intake oxygen concentration Ocon regarding an internal combustion engine that operates the exhaust gas recirculation (EGR) is approximated by the following formula (1), as is known in this technical field. Regarding the following formula (1), numerical value 23.2 represents the oxygen concentration of air (percent concentration of mass) in the standard state, Regr represents the EGR rate, and λ represents the air excess ratio. In addition, the standard state represents the state where a temperature is zero degrees Celsius (273.15 K) and a pressure is 1 bar (10^5 Pa), as is known in this technical field.

$$Ocon=23.2(1-Regr/\lambda) \quad (1)$$

Regarding the above formula (1), the air excess ratio λ is defined by the following formula (2). Regarding the following formula (2), abyfact represents an actual air-fuel ratio, and abyfstoich represents the theoretical air-fuel ratio.

$$\lambda = abyfact/abyfstoich \quad (2)$$

Regarding the above formula (2), the actual air-fuel ratio abyfact is defined by the following formula (3). Regarding the following formula (3), Ga represents the intake air amount, and Q represents the fuel injection amount.

$$abyfact = Ga/Q \quad (3)$$

The EGR ratio Regr is defined by the following formula (4). Regarding the following formula (4), Gcyl represents the total amount of gas that is introduced into a cylinder and that is determined depending on operating conditions and etc. of the internal combustion engine (for example, the engine rotation speed, supercharging pressure, and etc.), and Ga represents the intake air amount as described above.

$$Regr = (Gcyl-Ga)/Gcyl \quad (4)$$

As described above, the intake oxygen concentration Ocon regarding the internal combustion engine is determined based on the several parameters relating to the intake oxygen concentration (that is, the EGR ratio Regr, the intake air amount Ga, and the fuel injection amount Q).

Next, according to the Extended Zeldovich Mechanism, which is one of known combustion models (thermal-NOx generation mechanisms), the concentration of nitrogen oxide generated through combustion process is affected by nitrogen concentration and oxygen concentration in gas to be subjected to the combustion, and flame temperature during the combustion. The inventor of the invention has studied the Extended Zeldovich Mechanism in more detail. Specifically, in the case that the Extended Zeldovich Mechanism is applied to internal combustion engine, it may be deemed that the nitrogen concentration of the gas does not substantially change through combustion process (i.e., the nitrogen concentration is deemed to be a predetermined fixed value), since the amount of change of the nitrogen concentration in the gas through combustion process is very small. Furthermore, in this case, it may be deemed that the oxygen concentration of the gas corresponds to a value obtained by exponentiating the intake oxygen concentration Ocon of the internal combustion engine by a predetermined number of times. Additionally, it may be deemed that the flame temperature of the gas is proportionate to the intake oxygen concentration Ocon and the fuel injection amount Q.

In addition, it may be deemed that the amount of fuel-NOx and the amount of prompt-NOx are substantially zero, since the amounts thereof are small compared with the amount of the nitrogen oxide (thermal-NOx). Here, the fuel-NOx is generated due to nitrogen component (compound of nitrogen) included in fuel, and the prompt-NOx is generated due to intermediates (hydrogen cyanide, etc.) that are generated through reactions of carbon component/hydrogen component included in fuel with nitrogen in air.

The inventor has carried out various sort of considerations and experiments based on the above suppositions. Through the considerations and experiments, it has been recognized that NOx concentration NOxcon in exhaust gas of internal combustion engine can be defined by the following formula (5). Regarding the following formula (5), e represents the base of natural logarithm (Napier's number), Ocon represents the intake oxygen concentration defined by the formula (1), Q represents the fuel injection amount, and each of index numbers A, B and C represents fixed value that is determined according to configurations of the internal combustion engine, etc. In addition, the index numbers A, B and C are unique numbers that are correspond to specific internal combustion engine and determined by experiments, etc.

$$NOxcon = e^{\hat{}}A \times Ocon^{\hat{}}B \times Q^{\hat{}}C \quad (5)$$

As described above, it has been recognized that there is a strong association between the NOx concentration NOxcon in exhaust gas of internal combustion engine, the intake oxygen concentration Ocon, and the fuel injection amount Q. In other words, the NOx concentration NOxcon in exhaust gas of internal combustion engine is defined based on the intake oxygen concentration Ocon and the fuel injection amount Q.

Furthermore, through additional considerations and experiments by the inventor, it has been recognized that "the index number B that represents the degree of the association between the intake oxygen concentration Ocon and the NOx concentration NOxcon" is different from "the index number C that represents the degree of the association between the fuel injection amount Q and NOx concentration NOxcon" in a general internal combustion engine. In other words, it has been recognized that the effect of the intake oxygen concentration Ocon to the NOx concentration NOxcon is different from the effect of the fuel injection amount Q to the NOx concentration NOxcon. The above formula (5) is employed to the first device as "model for estimating NOx concentration".
(Explanation 1-2) Explanation for Reasons why the NOx Concentration Difference Results when at Least One of the Difference in Intake Air Amount and the Difference in Fuel Injection Amount Occurs.

As described above, the first device obtains the NOx concentration of exhaust gas of the engine that has been confirmed to perform so that "the fuel injection amount and the intake oxygen concentration are normal" as the NOx referential concentration NOxref. Therefore, when at least one of the difference in intake air amount and the difference in fuel injection amount causes in the engine 10, the NOx concentration NOxcon, which is measured with the NOx concentration sensor 75, does not coincide with the NOx referential concentration NOxref. That is, "the NOx concentration difference" occurs.

More specifically, the NOx concentration NOxcon is affected by the intake oxygen concentration Ocon and the fuel injection amount Q as shown in The above model for estimating NOx concentration (see the formula (5)). Furthermore, the intake oxygen concentration Ocon is affected by the EGR ratio Regr, the intake air amount Ga, and the fuel injection amount Q (see the formula (1) to the formula (4)). Additionally, the EGR ratio Regr is affected by the intake air amount Ga (see the formula (4)).

The measured value Gamsr of the intake air amount does not coincide with the actual value Gaact, when "the difference in intake air amount" occurs. Therefore, the actual value Regract of the EGR ratio does not coincide with the target value Regrtgt, even if the apparent EGR ratio Regrapp (that is, the calculated value of the EGR ratio by the formula (4)) coincides with the target value Regrtgt. As described above, the measured value Gamsr of the intake air amount does not coincide with the actual value Gaact and the actual value Regract of the EGR ratio does not coincide with the target value Regrtgt in this case, and therefore, the apparent intake oxygen concentration Oconapp (that is, the calculated value of the intake oxygen concentration by the formula (1)) does not coincide with the actual value Oconact of the intake oxygen concentration.

As a result of the above, the actual NOx concentration NOxcon that is determined based on "the actual value Oconact of the intake oxygen concentration" and "the actual value Qact of the fuel injection amount" (the NOx concentration that is measured by the NOx concentration sensor 75) does not coincide with the NOx referential concentration NOxref that is determined by applying "the apparent intake oxygen concentration Oconapp" and "the target value Qtgt of the fuel injection amount" to the above relationship MapNOxref (Qtgt, Ocon). That is, the NOx concentration difference occurs.

On the other hand, the actual value Qact of the fuel injection amount does not coincide with target value Qtgt, when "the difference in fuel injection amount" occurs. In this case, the actual value Regract of the EGR ratio coincides with the target value Regrtgt, since the EGR ratio does not directly relevant to the fuel injection amount (see the formula (4)). However, the actual value Qact of the fuel injection amount does not coincide with the target value Qtgt in this case, and therefore, the apparent intake oxygen concentration Oconapp does not coincide with the actual value Oconact of the intake oxygen concentration.

As a result of the above, the actual NOx concentration NOxcon that is determined based on "the actual value Oconact of the intake oxygen concentration" and "the actual value Qact of the fuel injection amount" does not coincide with the NOx referential concentration NOxref that is determined by applying "the apparent intake oxygen concentration Oconapp" and "the target value Qtgt of the fuel injection amount" to the above relationship MapNOxref(Qtgt, Ocon). That is, the NOx concentration difference occurs.

These are the reasons of the occurrence of the NOx concentration difference when at least one of the difference in intake air amount and the difference in fuel injection amount.
(Explanation 1-3) Explanation for a Method for Determining the Situation of the Difference in Fuel Injection Amount and the Situation of the Difference in Intake Air Amount.

As described above, both of the difference in intake air amount and the difference in fuel injection amount have effects on the NOx concentration difference. The first device determines at least one of the situations of the difference in fuel injection amount and the situation of the difference in intake air amount based on the effects. The description below is "the relationship between the target value Qtgt of the fuel injection amount and the NOx concentration difference $\Delta$NOx" in the case that "one or plural" of the following conditions 1-A to 1-D are met, with the model for estimating NOx concentration.
(Condition 1-A)
The actual value Gaact of the intake air amount is smaller than the measured value Gamsr.
(Condition 1-B)
The actual value Gaact of the intake air amount is larger than the measured value Gamsr.
(Condition 1-C)
The actual value Qact of the fuel injection amount is smaller than the target value Qtgt.
(Condition 1-D)
The actual value Qact of the fuel injection amount is larger than the target value Qtgt.

hereinafter, the situation represented by the condition 1-A is referred to as "the difference in intake air amount is negative", the situation represented by the condition 1-B is referred to as "the difference in intake air amount is positive", the situation represented by the condition 1-C is referred to as "the difference in fuel injection amount is negative", and the situation represented by the condition 1-D is referred to as "the difference in fuel injection amount is positive." Furthermore, the relationship between the target value Qtgt of the fuel injection amount and the NOx concentration difference $\Delta$NOx is hereinafter referred to as "first relationship R1(Qtgt, $\Delta$NOx)".

Furthermore, it is presupposed in this explanation 1-3 that operating parameter(s) "other than" the intake air amount and the fuel injection amount that may have effects on the NOx concentration is(are) fixed at a(each) predetermined value(s). Examples of such operating parameter includes parameters that have effects on the total amount Gcyl of gas introduced into the cylinder, such as the engine rotation speed NE and the supercharging pressure Pim; the target value Regrtgt of the EGR ratio; and the timing of injecting fuel into the cylinder, fuel injection timing. That is, it is deemed that the NOx concentration difference $\Delta$NOx is affected by "only" the difference in intake air amount and the difference in fuel injection amount.

First, the description below is the first relationship R1(Qtgt, $\Delta$NOx) when "one" of the conditions 1-A to 1-D is met.

Figure 2A:
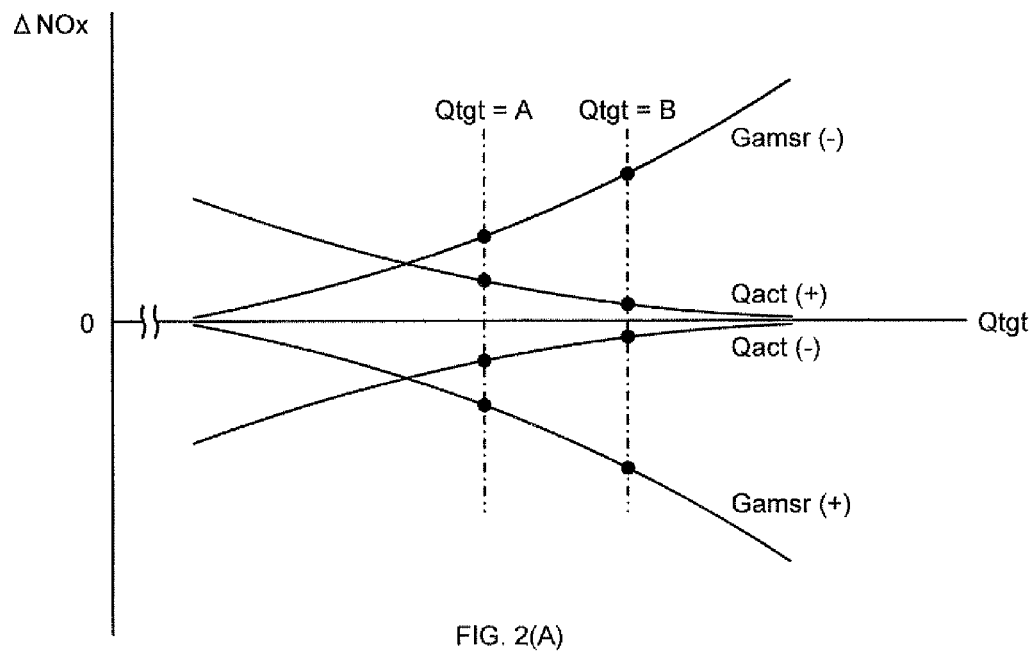
FIG. 2 is a graph illustrating the relationship between the target value of fuel injection amount, the NOx concentration difference, situation of the difference in fuel injection amount, and situation of the difference in intake air amount, regarding the internal combustion engine of FIG. 1.

FIG. 2(A) is a graph illustrating the first relationship R1(Qtgt, $\Delta$NOx), which is illustrated by using "the model for estimating NOx concentration", when one of the conditions 1-A to 1-D is met. The index numbers A, B and C (see the formula (5)) are determined based on the experiments carried out with "an engine that has the same configuration as the engine 10 and that has been confirmed to perform so that the target value Qtgt of the fuel injection amount coincides with the actual value Qact thereof and the measured value Gamsr of the intake air amount coincides with the actual value Gaact thereof."

In FIG. 2(A), Gamsr(−) indicates the curved line that represents the first relationship R1(Qtgt, $\Delta$NOx) in the case that the condition 1-A is met (that is, the case that the difference in intake air amount is negative). Gamsr(+) indicates the curved line that represents the first relationship R1(Qtgt, $\Delta$NOx) in the case that the condition 1-B is met (that is, the case that the difference in intake air amount is positive). Qact(−) indicates the curved line that represents the first relationship R1(Qtgt, ΔNOx) in the case that the condition 1-C is met (that is, the case that the difference in fuel injection amount is negative). Qact(+) indicates the curved line that represents the first relationship R1(Qtgt, ΔNOx) in the case that the condition 1-D is met (that is, the case that the difference in fuel injection amount is positive).

First, in the case that "only the condition 1-A" is met, the amount of the NOx concentration difference ΔNOx increases with the increasing amount of the target value Qtgt of the fuel injection amount within at least the range of the target value Qtgt from the predetermined value A to the predetermined value B (A≤Qtgt≤B), as shown by the curved line Gamsr(−). That is, the amount of change of the NOx concentration difference ΔNOx is "positive" when the target value Qtgt of the fuel injection amount increases. Furthermore, in this case, the NOx concentration difference ΔNOx is "positive" when the target value Qtgt of the fuel injection amount is the predetermined value B.

Furthermore, in the case that "only the condition 1-B" is met, the amount of the NOx concentration difference ΔNOx decreases with the increasing amount of the target value Qtgt of the fuel injection amount within at least the above range (A≤Qtgt≤B), as shown by the curved line Gamsr(+). That is, the amount of change of the NOx concentration difference ΔNOx is "negative" when the target value Qtgt of the fuel injection amount increases. Furthermore, in this case, the NOx concentration difference ΔNOx is "negative" when the target value Qtgt of the fuel injection amount is the predetermined value B.

Additionally, in the case that "only the condition 1-C" is met, the amount of the NOx concentration difference ΔNOx increases with the increasing amount of the target value Qtgt of the fuel injection amount within at least the above range (A≤Qtgt≤B), as shown by the curved line Qact(−). That is, the amount of change of the NOx concentration difference ΔNOx is "positive" when the target value Qtgt of the fuel injection amount increases. Furthermore, in this case, the NOx concentration difference ΔNOx is "negative" when the target value Qtgt of the fuel injection amount is the predetermined value B.

More additionally, in the case that "only the condition 1-D" is met, the amount of the NOx concentration difference ΔNOx decreases with the increasing amount of the target value Qtgt of the fuel injection amount within at least the above range (A≤Qtgt≤B), as shown by the curved line Qact (+). That is, the amount of change of the NOx concentration difference ΔNOx is "negative" when the target value Qtgt of the fuel injection amount increases. Furthermore, in this case, the NOx concentration difference ΔNOx is "positive" when the target value Qtgt of the fuel injection amount is the predetermined value B.

As described above, the first relationship R1(Qtgt, ΔNOx) in the case that the condition 1-A is met, the first relationship R1(Qtgt, ΔNOx) in the case that the condition 1-B is met, the first relationship R1(Qtgt, ΔNOx) in the case that the condition 1-C is met, and the first relationship R1(Qtgt, ΔNOx) in the case that the condition 1-D is met are different from each other.

Each of the predetermined value A and the predetermined value B may be set at an appropriate value that results in a difference between: one first relationship R1(Qtgt, ΔNOx) obtained when one of the conditions 1-A to 1-D is met; and the other first relationships R1(Qtgt, ΔNOx) obtained when the other of the conditions, which are different from the one of the conditions, is met.

As above, the first relationship R1(Qtgt, ΔNOx) in the case that "one" of the conditions 1-A to 1-D is met (that is, "one" of the difference in intake air amount and the difference in fuel injection amount occurs) is described.

Next, the description below is the first relationship R1(Qtgt, ΔNOx) when "plural" of the conditions 1-A to 1-D are met (that is, when "the both" of the difference in intake air amount and the difference in fuel injection amount occur").

Figure 2B:
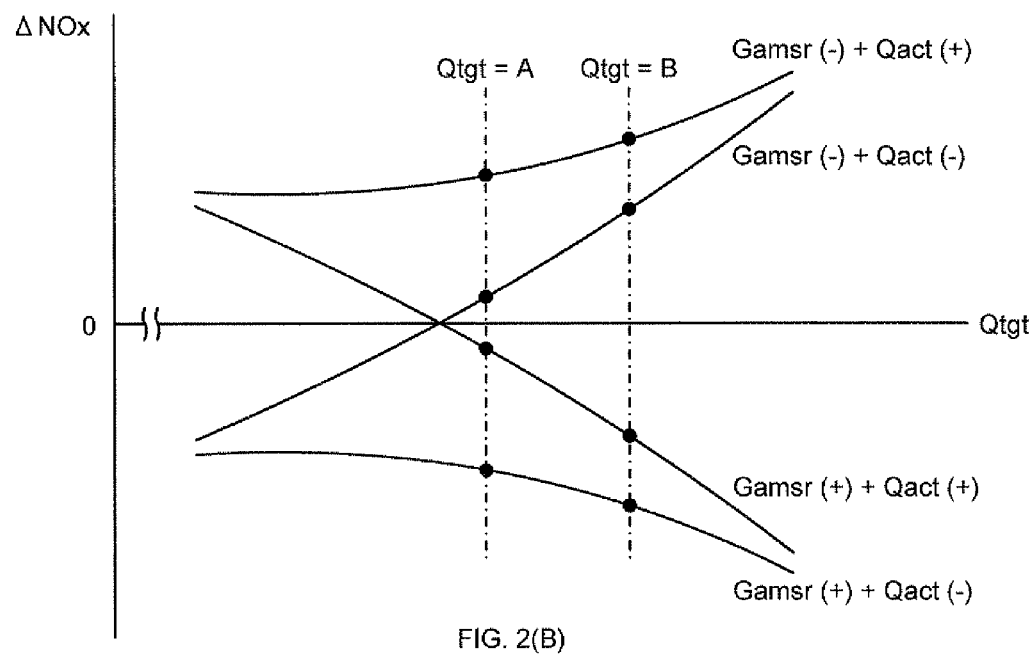
Figure 3:
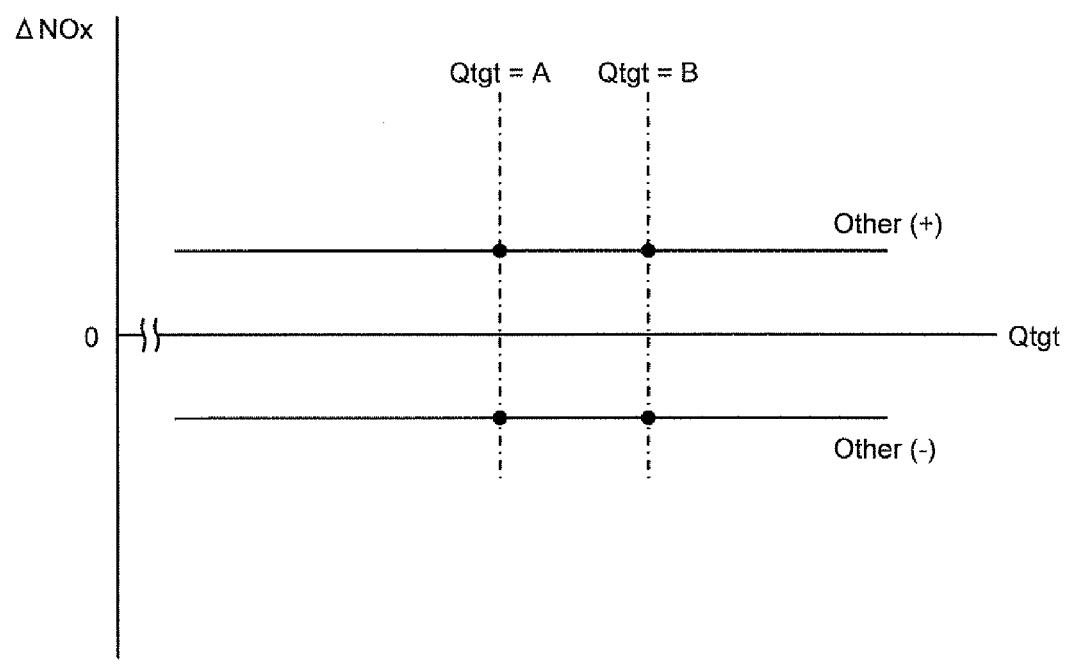
FIG. 3 is a graph illustrating the relationship between the target value of fuel injection amount, the NOx concentration difference, situation of the difference in fuel injection amount, and situation of the difference in intake air amount, regarding the internal combustion engine of FIG. 1.

FIG. 2(B) is a graph illustrating the first relationship R1(Qtgt, ΔNOx), which is illustrated by using "the model for estimating NOx concentration", when plural of the conditions 1-A to 1-D are met.

In FIG. 2(B), Gamsr(−)+Qact(+) indicates the curved line that represents the first relationship R1(Qtgt, ΔNOx) in the case that the condition 1-A and the condition 1-D are met (that is, the case that the difference in intake air amount is negative and the difference in fuel injection amount is positive). Gamsr (−)+Qact(−) indicates the curved line that represents the first relationship R1(Qtgt, ΔNOx) in the case that the condition 1-A and the condition 1-C are met (that is, the case that the difference in intake air amount is negative and the difference in fuel injection amount is negative). Gamsr(+)+Qact(+) indicates the curved line that represents the first relationship R1(Qtgt, ΔNOx) in the case that the condition 1-B and the condition 1-D are met (that is, the case that the difference in intake air amount is positive and the difference in fuel injection amount is positive). Gamsr(+)+Qact(−) indicates the curved line that represents the first relationship R1(Qtgt, ΔNOx) in the case that the condition 1-B and the condition 1-C are met (that is, the case that the difference in intake air amount is positive and the difference in fuel injection amount is negative).

in addition, the condition 1-A (where the difference in intake air amount is negative) and the condition 1-B (where the difference in intake air amount is positive) cannot be met at the same time. Furthermore, the condition 1-C (where the difference in fuel injection amount is negative) and the condition 1-D (where the difference in fuel injection amount is positive) cannot be met at the same time. Therefore, all possible combinations are the four combinations shown in FIG. 2(B).

First, in the case that "the condition 1-A and the condition 1-D" are met, the amount of the NOx concentration difference ΔNOx increases with the increasing amount of the target value Qtgt of the fuel injection amount within at least the range of the target value Qtgt from the predetermined value A to the predetermined value B (A≤Qtgt≤B), as shown by the curved line Gamsr(−)+Qact(+). That is, the amount of change of the NOx concentration difference ΔNOx is "positive" when the target value Qtgt of the fuel injection amount increases. Furthermore, in this case, the NOx concentration difference ΔNOx is "positive" when the target value Qtgt of the fuel injection amount is the predetermined value B.

Furthermore, in the case that "the condition 1-A and the condition 1-C" are met, the amount of the NOx concentration difference ΔNOx increases with the increasing amount of the target value Qtgt of the fuel injection amount within at least the above range (A≤Qtgt≤B), as shown by the curved line Gamsr(−)+Qact(−). That is, the amount of change of the NOx concentration difference ΔNOx is "positive" when the target value Qtgt of the fuel injection amount increases. Furthermore, in this case, the NOx concentration difference ΔNOx is "positive" when the target value Qtgt of the fuel injection amount is the predetermined value B.

Additionally, in the case that "the condition 1-B and the condition 1-D" are met, the amount of the NOx concentration difference ΔNOx decreases with the increasing amount of the target value Qtgt of the fuel injection amount within at least the above range (A≤Qtgt≤B), as shown by the curved line Gamsr(+)+Qact(+). That is, the amount of change of the NOx concentration difference ΔNOx is "negative" when the target value Qtgt of the fuel injection amount increases. Furthermore, in this case, the NOx concentration difference ΔNOx is "negative" when the target value Qtgt of the fuel injection amount is the predetermined value B.

More additionally, in the case that "the condition 1-B and the condition 1-C" are met, the amount of the NOx concentration difference ΔNOx decreases with the increasing amount of the target value Qtgt of the fuel injection amount within at least the above range (A≤Qtgt≤B), as shown by the curved line Gamsr(+)+Qact(−). That is, the amount of change of the NOx concentration difference ΔNOx is "negative" when the target value Qtgt of the fuel injection amount increases. Furthermore, in this case, the NOx concentration difference ΔNOx is "negative" when the target value Qtgt of the fuel injection amount is the predetermined value B.

As described above, the first relationship R1(Qtgt, ΔNOx) in the case that the condition 1-A and the condition 1-D are met is the same as the first relationship R1(Qtgt, ΔNOx) in the case that the condition 1-A and the condition 1-C are met, except for the amount of the NOx concentration difference ΔNOx within the above range. Furthermore, the first relationship R1(Qtgt, ΔNOx) in the case that the condition 1-B) and the condition 1-D are met is the same as the first relationship R1(Qtgt, ΔNOx) in the case that the condition 1-B and the condition 1-C are met, except for the amount of the NOx concentration difference ΔNOx within the above range. Additionally, the first relationship R1(Qtgt, ΔNOx) in the case that the set of the condition 1-A and the condition 1-D or the set of the condition 1-A and the condition 1-C are met is different from the first relationship R1(Qtgt, ΔNOx) in the case that the set of the condition 1-B and the condition 1-D or the set of the condition 1-B and the condition 1-C are met.

As above, the first relationship R1(Qtgt, ΔNOx) in the case that "plural" of the conditions 1-A to 1-D are met (that is, "the both" of the difference in intake air amount and the difference in fuel injection amount occur").

In addition, in the case that "any of the condition 1-A to 1-D is not met" (that is, in the case that the difference in intake air amount is "zero" and the difference in fuel injection amount is "zero"), the actual NOx concentration NOxcon coincides with the NOx concentration NOxcon. Therefore, the NOx concentration difference ΔNOx is zero in this case regardless of the target value Qtgt of the fuel injection amount. That is, the amount of change of the NOx concentration difference ΔNOx is "zero" when the target value Qtgt of the fuel injection amount increases, and the NOx concentration difference ΔNOx is "zero" when the fuel injection amount is the predetermined value B.

By the way, the NOx concentration difference ΔNOx may be occur in the case that "some members that are not related to the intake air amount and the fuel injection amount" do not operate normally. For example, in the case that the NOx concentration sensor 75 do not work normally (in the case that the sensor outputs an output value indicating a different NOx concentration other than the actual NOx concentration), the NOx concentration difference ΔNOx will occur even if the difference in intake air amount is zero and the difference in fuel injection amount is zero. Hereinafter, the above situation is referred to as the situation where "a difference(s) other than the difference in fuel injection amount and the difference in intake air amount occur(s)".

In the above case, the amount of the NOx concentration difference ΔNOx does not change regardless of the target value Qtgt of the fuel injection amount, as shown by the curved line Other(+) or the curved line Other(−). That is, the amount of change of the NOx concentration difference ΔNOx is "zero" within at least the above range (A≤Qtgt≤B). Furthermore, in this case, the NOx concentration difference ΔNOx is "positive" or "negative" when the target value Qtgt of the fuel injection amount is the predetermined value B.

As described above, the first relationship R1(Qtgt, ΔNOx) results to be different depending on: the difference in intake air amount is "zero", "positive" or "negative" (see the condition 1-A and the condition 1-B); or the difference in fuel injection amount is "zero", "positive" or "negative" (see the condition 1-C and the condition 1-D). In other words, it can be determined based on the first relationship R1(Qtgt, ΔNOx) that: whether the difference in intake air amount is "zero", "positive" or "negative"; or whether the difference in fuel injection amount is "zero", "positive" or "negative". Furthermore, it can be determined based on the first relationship R1(Qtgt, ΔNOx) that whether or not "a difference(s) other than the difference in fuel injection amount and the difference in intake air amount occur(s)."

Specifically, regarding the first relationship R1(Qtgt, ΔNOx), if the amount of change of the NOx concentration difference ΔNOx is "positive" when the target value Qtgt of the fuel injection amount increases within "the predetermined range (A≤Qtgt≤B)" and the NOx concentration difference ΔNOx is "positive" when the target value Qtgt of the fuel injection amount is the predetermined value B, then the relationship corresponds to a relationship represented as the curved line Gamsr(−) in FIG. 2(A), the curved line Gamsr(−)+Qact(+) and the curved line Gamsr(−)+Qact(−) in FIG. 2(B). That is, in this case, it can be determined that "at least the difference in intake air amount is negative."

Furthermore, regarding the first relationship R1(Qtgt, ΔNOx), if the amount of change of the NOx concentration difference ΔNOx is "negative" when the target value Qtgt of the fuel injection amount increases within "the predetermined range (A≤Qtgt≤B)" and the NOx concentration difference ΔNOx is "negative" when the target value Qtgt of the fuel injection amount is the predetermined value B, then the relationship corresponds to a relationship represented as the curved line Gamsr(+) in FIG. 2(A), the curved line Gamsr(+)+Qact(+) and the curved line Gamsr(+)+Qact(−) in FIG. 2(B). That is, in this case, it can be determined that "at least the difference in intake air amount is positive."

Additionally, regarding the first relationship R1(Qtgt, ΔNOx), if the amount of change of the NOx concentration difference ΔNOx is "negative" when the target value Qtgt of the fuel injection amount increases within "the predetermined range (A≤Qtgt 5 B)" and the NOx concentration difference ΔNOx is "positive" when the target value Qtgt of the fuel injection amount is the predetermined value B, then the relationship corresponds to a relationship represented as the curved line Qact(+) in FIG. 2(A). That is, in this case, it can be determined that "the difference in fuel injection amount is positive."

More additionally, regarding the first relationship R1(Qtgt, ΔNOx), if the amount of change of the NOx concentration difference ΔNOx is "positive" when the target value Qtgt of the fuel injection amount increases within "the predetermined range (A≤Qtgt 5 B)" and the NOx concentration difference ΔNOx is "negative" when the target value Qtgt of the fuel injection amount is the predetermined value B, then the relationship corresponds to a relationship represented as the curved line Qact(−) in FIG. 2(A). That is, in this case, it can be determined that "the difference in fuel injection amount is negative."

In addition, regarding the first relationship R1(Qtgt, ΔNOx), if the amount of change of the NOx concentration difference ΔNOx is "zero" when the target value Qtgt of the fuel injection amount increases within "the predetermined range (A≤Qtgt≤B)" and the NOx concentration difference ΔNOx is "zero" when the target value Qtgt of the fuel injection amount is the predetermined value B, then it can be determined that "the difference in intake air amount is zero and the difference in fuel injection amount is zero."

Furthermore, regarding the first relationship R1(Qtgt, ΔNOx), if the amount of change of the NOx concentration difference ΔNOx is "zero" when the target value Qtgt of the fuel injection amount increases within "the predetermined range (A≤Qtgt≤B)" and the NOx concentration difference ΔNOx is "positive" or "negative" when the target value Qtgt of the fuel injection amount is the predetermined value B, then it can be determined that "a difference(s) other than the difference in fuel injection amount and the difference in intake air amount occur(s)".

As described above, the first device can determine the situation of the difference in intake air amount and the situation of the difference in fuel injection amount based on the first relationship R1(Qtgt, ΔNOx). Hereinafter, the above method to determine the situation of the difference in intake air amount and the situation of the difference in fuel injection amount is referred to as "first method for situation determination".

(Explanation 1-4) Explanation for Corrections Depending on Results of the Situation Determinations.

The first device corrects the measured value Gamsr of the intake air amount so as to decrease the amount of the difference in intake air amount and the target value Qtgt of the fuel injection amount so as to decrease the amount of the difference in fuel injection amount, depending on the result of the about situation determination.

Specifically, if the first device determines that the difference in intake air amount is "positive", then the first device corrects the measured value Gamsr of the intake air amount so as to "decrease" the value by a predetermined correction amount. On the other hand, if the first device determines that the difference in intake air amount is "negative", then the first device corrects the measured value Gamsr of the intake air amount so as to "increase" the value by a predetermined correction amount. The "correction amounts" used in the above correction are determined depending on the amount of the NOx concentration difference ΔNOx.

Figure 4A:
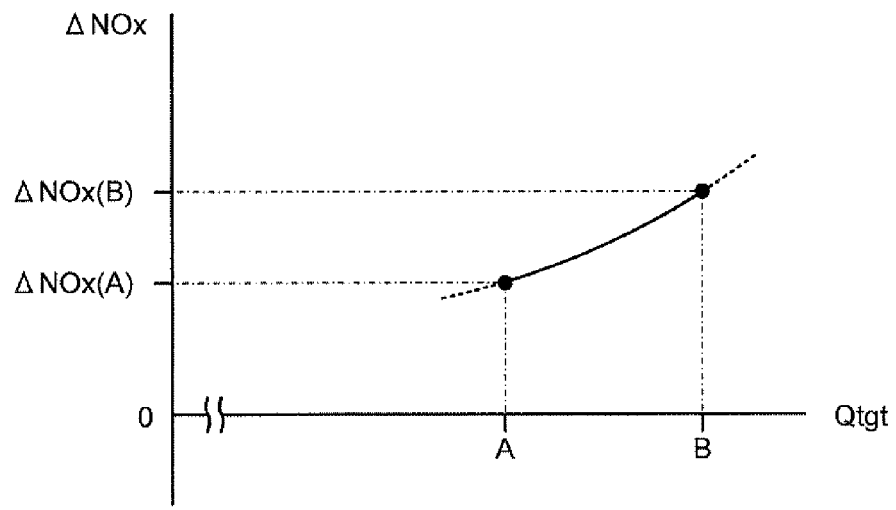
FIG. 4 is a graph illustrating the relationship between the target value of fuel injection amount, the NOx concentration difference, situation of the difference in fuel injection amount, and situation of the difference in intake air amount, regarding the internal combustion engine of FIG. 1.

For example, as shown in FIG. 4(A), if: both of the NOx concentration difference ΔNOx(A) when the target value Qtgt of the fuel injection amount is the predetermined value A and the NOx concentration difference ΔNOx(B) when the target value Qtgt of the fuel injection amount is the predetermined value B are "positive"; and the NOx concentration difference ΔNOx(B) is larger than the NOx concentration difference ΔNOx(A), then the first device determines that "at least the difference in intake air amount is negative" as described in the explanation 1-3.

In the above case, the first device determines the "correction amount" based on the average value of the NOx concentration difference ΔNOx(A) and the NOx concentration difference ΔNOx(B), etc. Then, the first device corrects the measured value Gamsr of the intake air amount so as to "increase" the value by the correction amount. Specifically, as an example, the first device changes(studies) the relationship (map) between the output value (output voltage) of the intake air flow sensor 71 and the measured value Gamsr of the intake air amount so that the measured value Gamsr is increased depending on a value obtained by multiplying the above average value by a predetermined coefficient. Thereby, the difference in intake air amount will be decreased.

Furthermore, if the first device determines that the difference in fuel injection amount is "positive", then the first device corrects the target value Qtgt of the fuel injection amount so as to "decrease" the value by a predetermined correction amount. On the other hand, if the first device determines that the difference in fuel injection amount is "negative", then the first device corrects the target value Qtgt of the fuel injection amount so as to "increase" the value by a predetermined correction amount.

The "correction amounts" used in the above correction are determined depending on the amount of the NOx concentration difference ΔNOx.

Figure 4B:
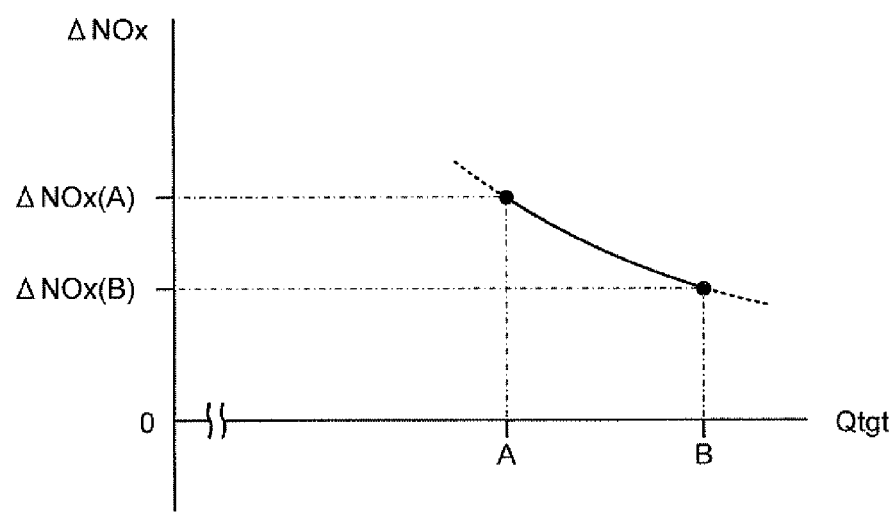

For example, as shown in FIG. 4(B), if: both of the NOx concentration difference ΔNOx(A) when the target value Qtgt of the fuel injection amount is the predetermined value A and the NOx concentration difference ΔNOx(B) when the target value Qtgt of the fuel injection amount is the predetermined value B are "positive"; and the NOx concentration difference ΔNOx(B) is smaller than the NOx concentration difference ΔNOx(A), then the first device determines that "the difference in fuel injection amount is positive" as described in the explanation 1-3.

In the above case, the first device determines the "correction amount" based on the average value of the NOx concentration difference ΔNOx(A) and the NOx concentration difference ΔNOx(B), etc. Then, the first device corrects the target value Qtgt of the fuel injection amount so as to "decrease" the value by the correction amount. Specifically, as an example, the first device changes (studies) the relationship (map) between the time period of fuel injection of the fuel injecting device 22 and target value Qtgt of the fuel injection amount so that the target value Qtgt of the fuel injection amount is decreased depending on a value obtained by multiplying the above average value by a predetermined coefficient. Thereby, the difference in fuel injection amount will be decreased.

As described above, the amount of NOx concentration difference ΔNOx is decreased by correcting the target value Qtgt of the fuel injection amount and the measured value Gamsr of the intake air amount.

By the way, the first device determines that "at least" the difference in intake air amount is negative if the predetermined condition is met (i.e., if the condition 1-A is met, if the condition 1-A and the condition 1-C are met, or if the condition 1-A and the condition 1-D are met), as described in the explanation 1-3. In this case, the first device makes the above determination without distinguishing between "the difference in intake air amount is negative", "the difference in intake air amount is negative and the difference in fuel injection amount is positive", and "the difference in intake air amount is negative and the difference in fuel injection amount is negative." That is, the first device does not determine whether or not "only" the difference in intake air amount occurs and whether or not "both" the difference in intake air amount and the difference in fuel injection amount occur.

However, the first device corrects the measured value Gamsr of the intake air amount so as to decrease "the difference in intake air amount" even when any condition of the above conditions are met, as described in the explanation 1-4. Therefore, in the case that "only" the difference in intake air amount occurs, the difference in intake air amount is decreased by this correction. As a result thereof, the amount of NOx concentration difference ΔNOx is decreased. On the other hand, in the case that "both" of the difference in intake air amount and the difference in fuel injection amount occur, the difference in intake air amount among the both is decreased by this correction. For example, when the difference in intake air amount is sufficiently decreased by being repeatedly carried out the above correction, "only" the difference in fuel injection amount among the "both" will remain. Then, in the case that "only" the difference in fuel injection amount remains, the first device determines that the difference in fuel injection amount occurs and corrects the target value Qtgt of the fuel injection amount so as to decrease the difference in intake air amount. As a result thereof, the amount of NOx concentration difference ΔNOx is decreased.

As described above, even in either of the above cases (in the case that "only" the difference in intake air amount occurs, and in the case that "both" of the difference in intake air amount and the difference in fuel injection amount occur), the NOx concentration difference ΔNOx will be decreased by the treatment that the first device repeatedly carries out the above correction. In addition, as will be appreciated from the above descriptions, in the case that the first device determines that "at least the difference in intake air amount is 'positive'", the NOx concentration difference ΔNOx will be decreased by the treatment that the first device repeatedly carries out the above correction in the same manner.

In addition, the first device does not correct the target value Qtgt of the fuel injection amount and the measured value Gamsr of the intake air amount, in the case that it determines that "the difference in fuel injection amount is zero and the difference in intake air amount is zero." Furthermore, the first device also does not correct the target value Qtgt of the fuel injection amount and the measured value Gamsr of the intake air amount, in the case that it determines that "a difference(s) other than the difference in fuel injection amount and the difference in intake air amount occur(s)."

As described in the explanation 1-1 to 1-4, the first device determines the condition of the difference in fuel injection amount and the difference in intake air amount, and the first device controls the engine 10 to decrease the amount of NOx concentration difference ΔNOx depending on the result of the determination.

By the way, the index numbers A, B and C are determined according to the situation (s) such as configurations of the internal combustion engine that the model for estimating NOx concentration is applied to. Therefore, when the model for estimating NOx concentration is applied to other engine having a different configuration from that of the engine 10, the index numbers A, B and C regarding the other engine may be different from those of the engine 10. In this case, the first relationship R1(Qtgt, ΔNOx) regarding the engine 10 is different from the first relationship R1(Qtgt, ΔNOx) regarding the other engine. However, as will be appreciated from the above descriptions, the situation of the difference in fuel injection amount and the difference in intake air amount can be determined based on similar considerations above.

<Actual Operation>

Hereinafter, an actual operation of the first device will be described.

Regarding the first device, the CPU 81 is configured to perform the respective routines indicated by the flowcharts in FIG. 5 to FIG. 11 at every predetermined timing. In these routines, the CPU 81 uses following flags: a first fuel-excess-injection flag XQP1; a first fuel-deficient-injection flag XQN1; a first intake-air-excess-measurement flag XGAP1; a first intake-air-deficient-measurement flag XGAN1; and a first other-abnormality-occurrence flag XOTH1.

When the first fuel-excess-injection flag XQP1 is "0", it indicates that the actual value Qact of the fuel injection amount is not larger than the target value Qtgt thereof (that is, Qact≤Qtgt). On the other hand, when the first fuel-excess-injection flag XQP1 is "1", it indicates that the actual value Qact of the fuel injection amount is larger than the target value Qtgt thereof (that is, Qact>Qtgt).

When the first fuel-deficient-injection flag XQN1 is "0", it indicates that the actual value Qact of the fuel injection amount is not smaller than the target value Qtgt thereof (that is, Qact≥Qtgt). On the other hand, when the first fuel-deficient-injection flag XQN1 is "1", it indicates that the actual value Qact of the fuel injection amount is smaller than the target value Qtgt thereof (that is, Qact<Qtgt).

When the first intake-air-excess-measurement flag XGAP1 is "0", it indicates that the measured value Gamsr of the intake air amount is not larger than the actual value Gaact thereof (that is, Gamsr≤Gaact). On the other hand, when the first intake-air-excess-measurement flag XGAP1 is "1", it indicates that the measured value Gamsr of the intake air amount is larger than the actual value Gaact thereof (that is, Gamsr>Gaact).

When the first intake-air-deficient-measurement flag XGAN1 is "0", it indicates that the measured value Gamsr of the intake air amount is not smaller than the actual value Gaact thereof (that is, Gamsr≥Gaact). On the other hand, when the first intake-air-deficient-measurement flag XGAN1 is "1", it indicates that the measured value Gamsr of the intake air amount is smaller than the actual value Gaact thereof (that is, Gamsr<Gaact).

When the first other-abnormality-occurrence flag XOTH1 is "0", it indicates that a difference(s) other than the difference in fuel injection amount and the difference in intake air amount does(do) not occur. On the other hand, when the first other-abnormality-occurrence flag XOTH1 is "1", it indicates that a difference(s) other than the difference in fuel injection amount and the difference in intake air amount occurs.

The back-up RAM 84 stores the following values of the flags: the value of the first fuel-excess-injection flag XQP1; the value of the first fuel-deficient-injection flag XQN1; the value of the first intake-air-excess-measurement flag XGAP1; the value of the first intake-air-deficient-measurement flag XGAN1; and the value of the first other-abnormality-occurrence flag XOTH1. Furthermore, when a predetermined operation is performed on the electric control device 80 after it is verified that no abnormality occurs in the fuel injecting device 22 and the intake air flow sensor 71 through a factory default setting of a vehicle equipped with the engine 10 and a service maintenance, etc., setting "zero" is done to a part of the values of the flags: the value of the first fuel-excess-injection flag XQP1; the value of the first fuel-deficient-injection flag XQN1; the value of the first intake-air-excess-measurement flag XGAP1; and the value of the first intake-air-deficient-measurement flag XGAN1. Additionally, when a predetermined operation is performed on the electric control device 80 after a treatment to resolve the cause for the occurrence of the difference(s) other than the difference in fuel injection amount and the difference in intake air amount through a factory default setting of a vehicle equipped with the engine 10 and a service maintenance, etc., setting "zero" is done to the other value of the flags: the value of the first other-abnormality-occurrence flag XOTH1.

Hereinafter, the respective routines performed by the CPU 81 will be described in detail.

First, it is presupposed that setting "zero" is done at this moment to all of the values of the flags: the value of the first fuel-excess-injection flag XQP1; the value of the first fuel-deficient-injection flag XQN1; the value of the first intake-air-excess-measurement flag XGAP1; the value of the first intake-air-deficient-measurement flag XGAN1; and the value of the first other-abnormality-occurrence flag XOTH1. Hereinafter, this setting is referred to as "first precondition for default setting".

Figure 5:
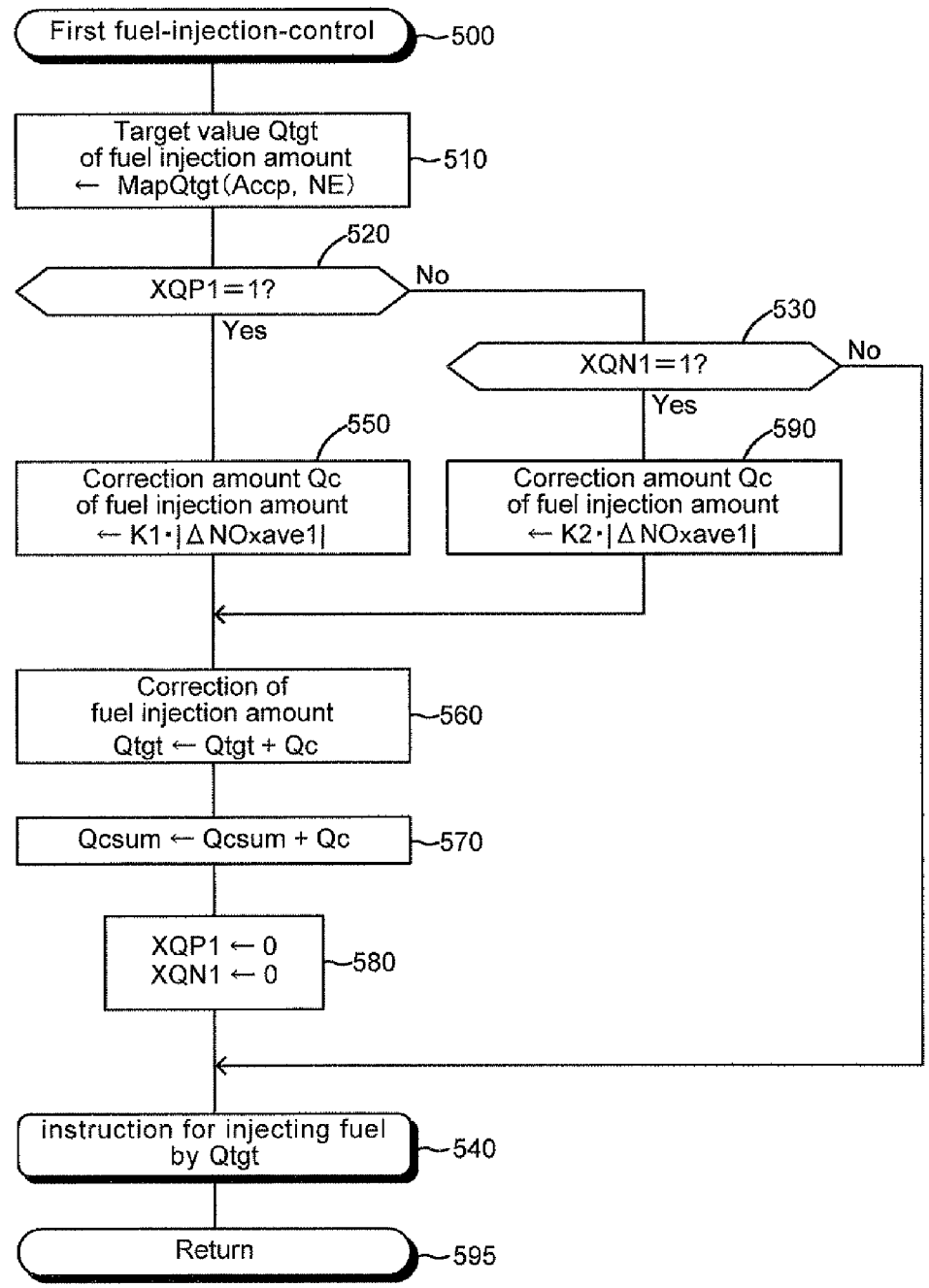
FIG. 5 is a flowchart illustrating a routine executed by CPU of the control device according to the first embodiment of the present invention.

The CPU 81 is configured to repeatedly perform the "first fuel-injection-control routine", which is indicated by the flowchart in FIG. 5, every time the crank angle of arbitrary cylinder becomes equal to a predetermined crank angle before the compression top dead center (for example, the crank angle of 90 degrees before the compression top dead center) θf. By this routine, the CPU 81 determines the target value Qtgt of the fuel injection amount and sends an instruction for injecting fuel into the respective cylinder in the amount of the target value Qtgt. Furthermore, by this routine, the CPU 81 corrects the target value Qtgt of the fuel injection amount in the case that the actual value Qact thereof does not coincide with the target value Qtgt thereof, and the CPU 81 send an instruction for injecting fuel into the respective cylinder in the amount of the corrected target value Qtgt. Hereinafter, the cylinder where the crank angle is equal to the predetermined crank angle θf before the compression top dead center during the compression stroke is referred to as "fuel injection cylinder".

Specifically, the CPU 81 determines the target value Qtgt of the fuel injection amount depending on the operating conditions of the engine 10 by this routine. Furthermore, in the case that the CPU 81 determines that the actual value Qact of the fuel injection amount is larger than the target value Qtgt, the CPU 81 decreases the target value Qtgt of the fuel injection amount by a correction amount Qc of the fuel injection amount. On the other hand, in the case that the CPU 81 determines that the actual value Qact of the fuel injection amount is smaller than the target value Qtgt, the CPU 81 increases the target value Qtgt of the fuel injection amount by a correction amount Qc of the fuel injection amount.

The CPU 81 calculates an accumulated value Qcsum of the correction amount Qc by the routine in FIG. 5. It is configured that the value of the accumulated value Qcsum is set at "zero" when a predetermined operation is performed on the electric control device 80 after it is verified that no abnormality occurs in the fuel injecting device 22 through a factory default setting of a vehicle equipped with the engine 10 and a service maintenance, etc.

More specifically, the CPU 81 starts a process at step 500 of FIG. 5 and then proceeds toward step 510 at a predetermined timing to determine the target value Qtgt of the fuel injection amount by applying an accelerator opening degree Accp and an engine rotation speed NE at this moment to a table MapQtgt(Accp, NE) for defining the target value of the fuel injection amount. The table defines "the relationship between the accelerator opening degree Accp, the engine rotation speed NE, and the target value Qtgt of the fuel injection amount" in advance. Regarding this table MapQtgt(Accp, NE) for defining the target value of the fuel injection amount, the target value Qtgt of the fuel injection amount is designed to be an appropriate value that is set depending on a required torque determined based on the accelerator opening degree Accp and the engine rotation speed NE.

Next, the CPU 81 proceeds to step 520 to determine whether or not the value of the first fuel-excess-injection flag XQP1 is "1" at this moment. According to the first precondition for default setting, the value of the first fuel-excess-injection flag XQP1 is "0", then the CPU 81 makes the "No" determination at step 520 and proceeds to step 530.

At step 530, the CPU 81 determines whether or not the value of the first fuel-deficient-injection flag XQN1 is "1" at this moment. According to the first precondition for default setting, the value of the first fuel-deficient-injection flag XQN1 is "0", then the CPU 81 makes the "No" determination at step 530 and proceeds to step 540.

At step 540, the CPU 81 sends an instruction for injecting fuel from the fuel injecting device 22 into the fuel injection cylinder in the amount of the target value Qtgt. The instruction is sent to the fuel injecting device 22. That is, the fuel in the amount of the target value Qtgt is injected into the fuel injection cylinder. After that, the CPU 81 proceeds to step 595 so as to end this routine once.

Figure 6:
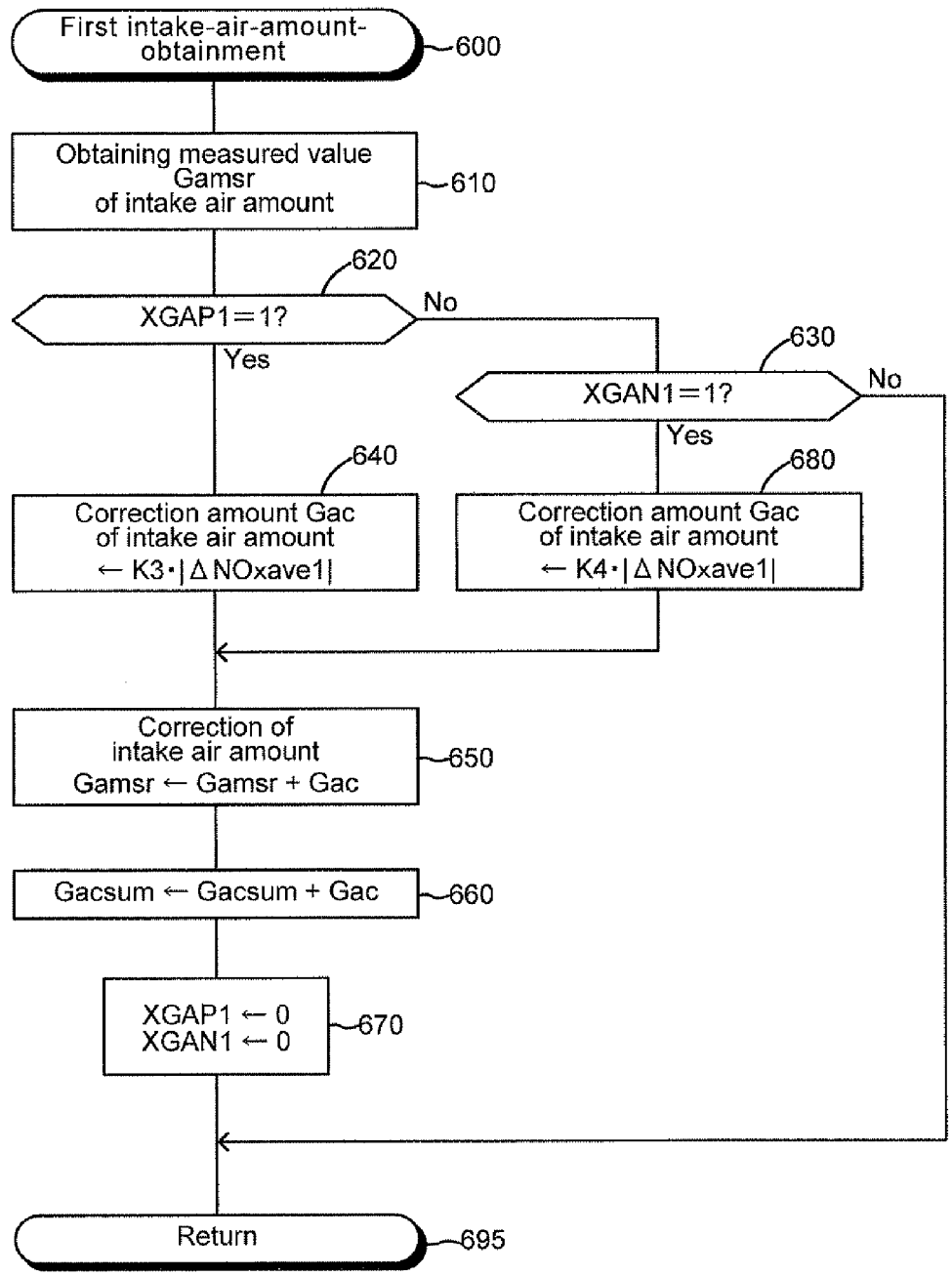
FIG. 6 is a flowchart illustrating a routine executed by CPU of the control device according to the first embodiment of the present invention.

Furthermore, the CPU 81 is configured to repeatedly perform the "first intake-air-amount-obtaining routine", which is indicated by the flowchart in FIG. 6, every time a predetermined time period elapses. By this routine, the CPU 81 determines the measured value Gamsr of the intake air amount. Furthermore, by this routine, the CPU 81 corrects the measured value Gamsr of the intake air amount in the case that the actual value Gaact thereof does not coincide with the measured value Gamsr thereof.

Specifically, the CPU 81 obtains the measured value Gamsr of the intake air amount based on an output value of the intake air flow sensor 71 by this routine. Furthermore, in the case that the CPU 81 determines that the actual value Gaact of the intake air amount is larger than the measured value Gamsr, the CPU 81 decreases the measured value Gamsr by a correction amount Gac of the intake air amount. On the other hand, in the case that the CPU 81 determines that the actual value Gaact of the intake air amount is smaller than the measured value Gamsr, the CPU 81 increases the measured value Gamsr by a correction amount Gac of the intake air amount.

The CPU 81 calculates an accumulated value Gacsum of the correction amount Gac by the routine indicated in FIG. 5. It is configured that the value of the accumulated value Gacsum is set at "zero" when a predetermined operation is performed on the electric control device 80 after it is verified that no abnormality occurs in the intake air flow sensor 71 through a factory default setting of a vehicle equipped with the engine 10 and a service maintenance, etc.

More specifically, the CPU 81 starts a process at step 600 of FIG. 6 and then proceeds toward step 610 at a predetermined timing to obtain the measured value Gamsr of the intake air amount based on the output value of the intake air flow sensor 71.

Next, the CPU 81 proceeds to step 620 to determine whether or not the value of the first intake-air-excess-measurement flag XGAP1 is "1" at this moment. According to the first precondition for default setting, the value of the first intake-air-excess-measurement flag XGAP1 is "0", then the CPU 81 makes the "No" determination at step 620 and proceeds to step 630.

At step 630, the CPU 81 determines whether or not the value of the first intake-air-deficient-measurement flag XGAN1 is "1" at this moment. According to the first precondition for default setting, the value of the first intake-air-deficient-measurement flag XGAN1 is "0", then the CPU 81 makes the "No" determination at step 630 and proceeds to step 695 so as to end this routine once.

Figure 7:
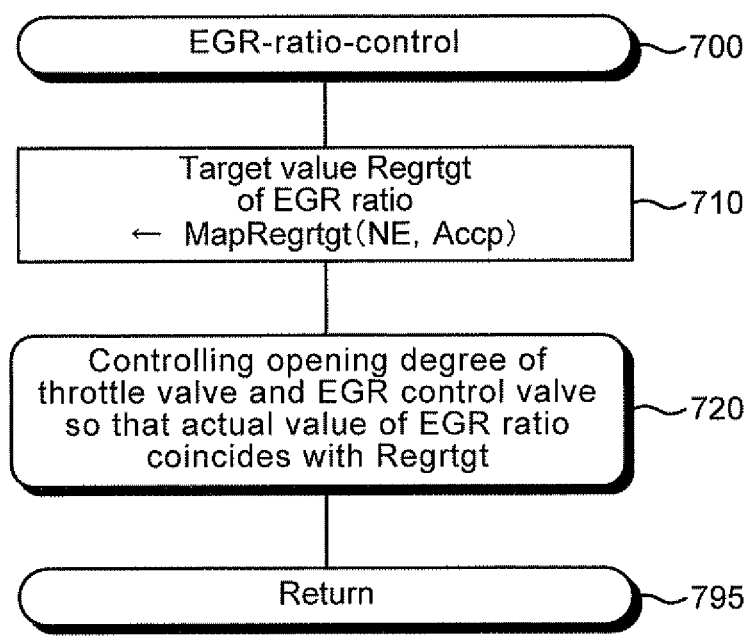
FIG. 7 is a flowchart illustrating a routine executed by CPU of the control device according to the first embodiment of the present invention.

Furthermore, the CPU 81 is configured to repeatedly perform the "EGR-ratio-control routine", which is indicated by the flowchart in FIG. 7, every time a predetermined time period elapses. By this routine, the CPU 81 determines the target value Regrtgt of the EGR ratio depending on operating conditions of the engine 10. Furthermore, by this routine, the CPU 81 controls the throttle valve 33 and the EGR control valve 53 so that the actual value Regract of the EGR ratio coincides with the target value Regrtgt.

Specifically, the CPU 81 starts a process at step 700 of FIG. 7 and then proceeds toward step 710 at a predetermined timing to determine the target value Regrtgt of the EGR ratio by applying an accelerator opening degree Accp and an engine rotation speed NE at this moment to a table MapRegrtgt(NE, Accp) for defining the target value of the EGR ratio. The table defines "the relationship between the accelerator opening degree Accp, the engine rotation speed NE, and the target value Regrtgt of the EGR ratio" in advance. Regarding this table MapRegrtgt(NE, Accp) for defining the target value of the EGR ratio, the target value Regrtgt of the EGR ratio is designed to be an appropriate value from the view point of the amount of the emissions.

Next, the CPU 81 proceeds to step 720 to control the opening degree of the throttle valve 33 and the opening degree of the EGR control valve 53 so that the actual value Regract of the EGR ratio coincides with the above target value Regrtgt. After that, the CPU 81 proceeds to step 795 so as to end this routine once. In addition, as indicated in the formula (4) described above, the actual value Regract of the EGR ratio may be calculated based on the total amount Gcyl of gas that is introduced into a cylinder and that is determined depending on the engine rotation speed NE and the supercharging pressure Pim, etc. and the measured value Gamsr of the intake air amount.

Figure 8:
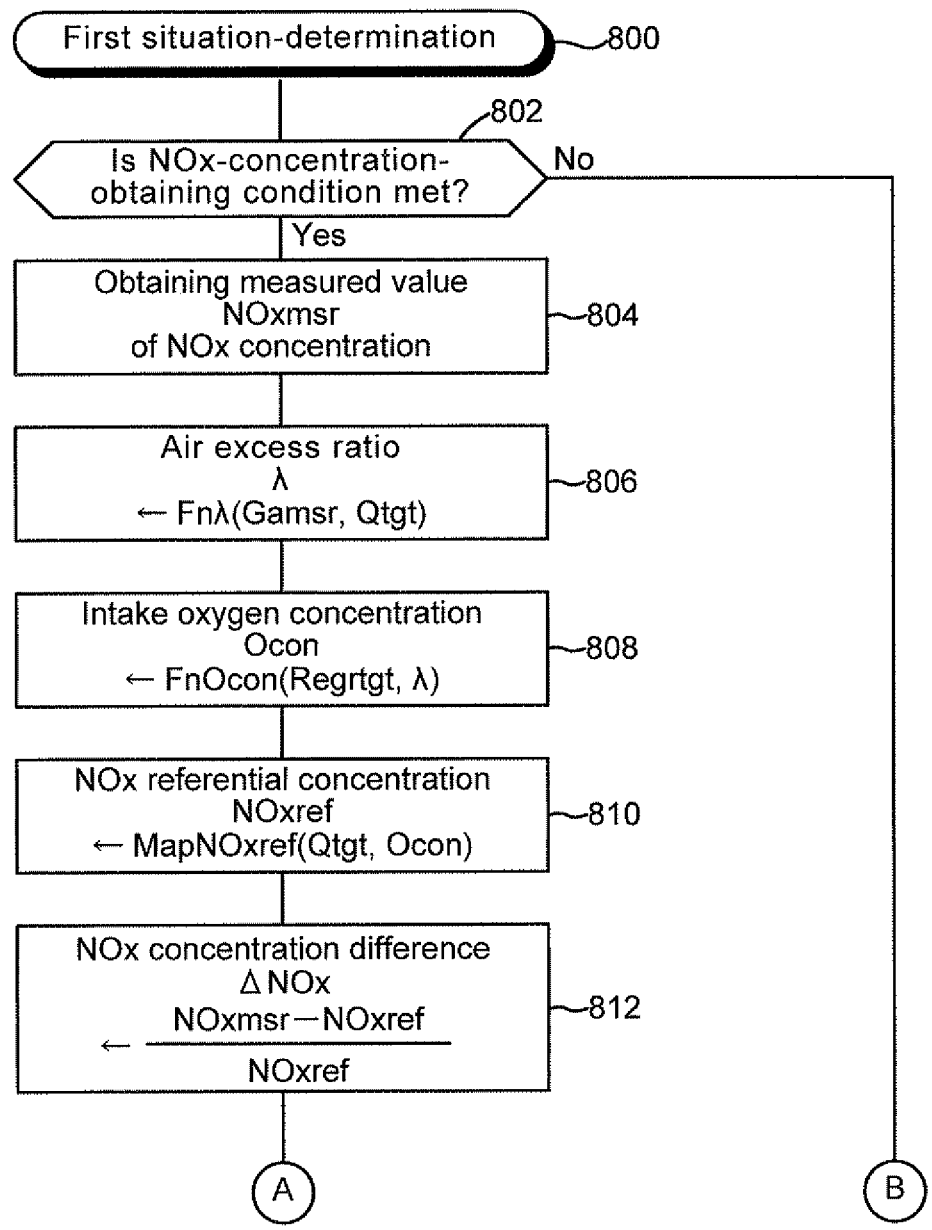
FIG. 8 is a flowchart illustrating a routine executed by CPU of the control device according to the first embodiment of the present invention.
Figure 9:
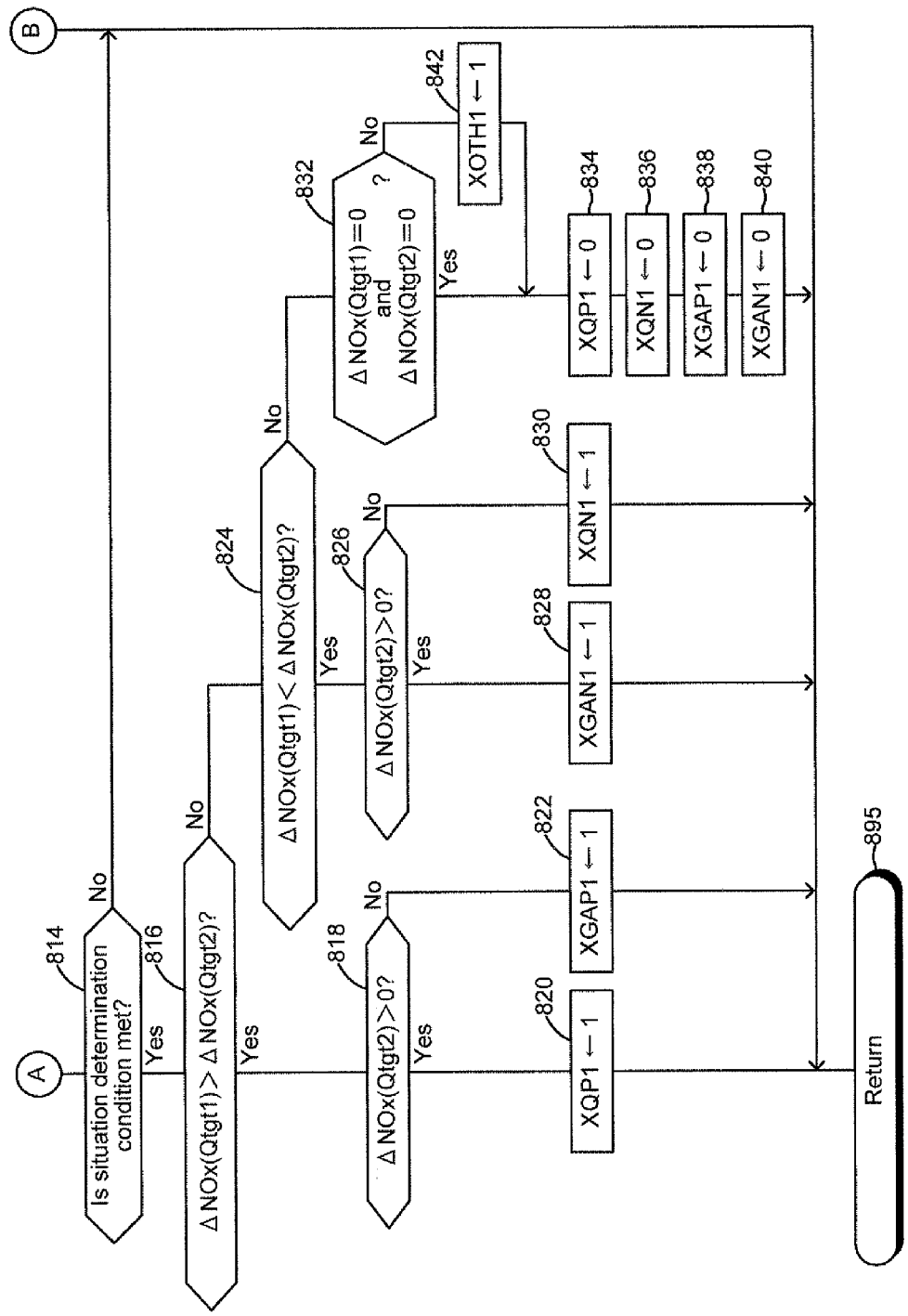
FIG. 9 is a flowchart illustrating a routine executed by CPU of the control device according to second embodiment of the present invention.

Furthermore, the CPU 81 is configured to repeatedly perform the "first situation-determination routine", which is indicated by the flowcharts in FIG. 8 and FIG. 9, every time a predetermined time period elapses. By this routine, the CPU 81 continues to obtain the target value Qtgt of the fuel injection amount and the NOx concentration difference together with matching them each other during a predetermined condition is met. Furthermore, by this routine, the CPU 81 determines the situation of the difference in fuel injection amount and the situation of the difference in intake air amount during a predetermined condition is met, based on the relationship between the target value Qtgt of the fuel injection amount and the NOx concentration difference ΔNOx (that is, the above first relationship R1(Qtgt, ΔNOx)).

Specifically, the CPU 81 starts a process at step 800 of FIG. 8 and then proceeds toward step 802 at a predetermined timing to determine whether or not "a condition for obtaining the NOx concentration (NOx-concentration-obtaining condition)" is met at this moment. More specifically, at step 802, the CPU 81 determines that the NOx-concentration-obtaining condition is met when all of the following conditions N-1-1 to N-1-5 are satisfied. In other words, the CPU 81 determines that the NOx-concentration-obtaining condition is not met when At least one of the following conditions N-1-1 to N-1-5 is not satisfied.
(Condition N-1-1)
The temperature of the NOx concentration sensor 75 is a value within a predetermined range.
(Condition N-1-2)
The pressure of gas around the NOx concentration sensor 75 is a value within a predetermined range.
(Condition N-1-3)
The oxygen concentration around the NOx concentration sensor 75 is a value within a predetermined range.
(Condition N-1-4)
The output value of the NOx concentration sensor 75 is a value within a predetermined range.
(Condition N-1-5)
Each of the engine rotation speed NE, the supercharging pressure Pim, the target value Regrtgt of the EGR ratio, and the fuel injection timing is a predetermined fixed value.

The predetermined range regarding the condition N-1-1 corresponds to a range of temperature where the NOx concentration sensor 75 is able to operate normally. The predetermined range regarding the condition N-1-2 corresponds to a range of pressure where the NOx concentration sensor 75 is able to measure the NOx concentration appropriately. The predetermined range regarding the condition N-1-3 corresponds to a range of oxygen concentration where the NOx concentration sensor 75 is able to measure the NOx concentration appropriately. The predetermined range regarding the condition N-1-4 corresponds to a range of NOx concentration where the NOx concentration sensor 75 is able to measure the NOx concentration appropriately.

Regarding the condition N-1-5, the engine rotation speed NE, the supercharging pressure Pim, the target value Regrtgt of the EGR ratio, and the fuel injection timing are operating parameters that may affect the NOx concentration other than the intake air amount and the fuel injection amount. If these parameters are predetermined fixed values, then the situation of the difference in fuel injection amount and the situation of the difference in intake air amount are determined more accurately.

When the NOx-concentration-obtaining condition is "not met", the CPU 81 makes the "No" determination at step 802 and proceeds directly toward step 895 in FIG. 9 through the connecting index B so as to end this routine once. As described above, the measured value NOxmsr of the NOx concentration is not obtained when the NOx-concentration-obtaining condition is "not" met.

To the contrary, when the NOx-concentration-obtaining condition is "met", the CPU 81 makes the "Yes" determination at step 802 and proceeds to step 804. At step 804, the CPU 81 obtains the measured value NOxmsr of the NOx concentration based on the output value of the NOx concentration sensor 75 and proceeds to step 806.

At step 806, the CPU 81 calculates the air excess ratio λ by applying the measured value Gamsr of the intake air amount and the target value Qtgt of the fuel injection amount at this moment to a function Fnλ(Gamsr, Qtgt) for calculating air excess ratio (see the formula (2) and the formula (3) described above). The function defines "the relationship between the measured value Gamsr of the intake air amount, the target value Qtgt of the fuel injection amount, and the air excess ratio λ" in advance.

Next, the CPU 81 proceeds to step 808 to calculate the intake oxygen concentration Ocon by applying the target value Regrtgt of the EGR ratio and the air excess ratio λ at this moment to a function FnOcon(Regrtgt, λ) for calculating intake oxygen concentration (see the formula (1) described above). The function defines "the relationship between the target value Regrtgt of the EGR ratio, the air excess ratio λ, and the intake oxygen concentration Ocon" in advance.

Next, the CPU 81 proceeds to step 810 to calculate a value by applying the target value Qtgt of the fuel injection amount and the intake oxygen concentration Ocon at this moment to a table MapNOxref(Qtgt, Ocon) that defines "the relationship between the target value Qtgt of the fuel injection amount, the intake oxygen concentration Ocon, and the NOx concentration regarding an engine that has been confirmed to perform so that the target value Qtgt of the fuel injection amount coincides with the actual value Qact and the measured value Gamsr of the intake air amount coincides with the actual value Gaact" as the NOx referential concentration NOxref in advance. The CPU 81 obtains the value as the NOx referential concentration NOxref.

Next, the CPU 81 proceeds to step 812 to obtain the NOx concentration difference ΔNOx by applying the measured value NOxmsr of the NOx concentration and the NOx referential concentration NOxref to the following formula (6). That is, at step 812, "the ratio of the value calculated by subtracting the NOx referential concentration NOxref from the measured value NOxmsr of the NOx concentration against the NOx referential concentration NOxref" is obtained as the NOx concentration difference $\Delta$NOx.

$$\Delta NOx=(NOxmsr-NOxref)/NOxref \quad (6)$$

Furthermore, the CPU 81 stores the NOx concentration difference $\Delta$NOx and the target value Qtgt of the fuel injection amount together with matching them each other (that is, the data of combination of the NOx concentration difference $\Delta$NOx and the target value Qtgt of the fuel injection amount) to the ROM 82.

Next, the CPU 81 proceeds to step 814 in FIG. 9 through the connecting index A to determine whether or not "a condition for determining the situation of the difference in fuel injection amount and the situation of the difference in intake air amount (situation determination condition)" is met at this moment. More specifically, at step 814, the CPU 81 determines that the situation determination condition is met when the condition S-1 is satisfied. In other words, the CPU 81 determines that the situation determination condition is not met when the condition S-1 is not satisfied.

(Condition S-1) A combination of the NOx concentration difference $\Delta$NOx and the target value Qtgt of the fuel injection amount where the target value Qtgt is within a predetermined range is obtained as a data. At least two of the data has been obtained.

The "predetermined range" corresponds to "the predetermined range (A$\leq$Qtgt$\leq$B)" in the first method for situation determination. If at least two of the data where the target value Qtgt is within this predetermined range has been obtained, then the situation of the difference in fuel injection amount and the situation of the difference in intake air amount can be determined in accordance with the first method for situation determination.

When the situation determination condition is "met", the CPU 81 makes the "Yes" determination at step 814 and proceeds to step 816. Then, the CPU 81 determines the situation of the difference in fuel injection amount and the situation of the difference in intake air amount by the treatments indicated in step 816 to step 842. To the contrary, when the situation determination condition is "not met", the CPU 81 makes the "No" determination at step 814 and proceeds to step 895 so as to end this routine once. As described above, the situation of the difference in fuel injection amount and the situation of the difference in intake air amount are not determined when the situation determination condition is not met.

Hereinafter, it is presupposed that the situation determination condition is "met". The treatments in indicated in step 816 to step 842 are explained in detail.

Regarding the following explanation, the data where the target value of the fuel injection amount is "first target value Qtgt1" and the data where the target value thereof is "second target value Qtgt2 that is larger than the first target value Qtgt1" are employed as the data of the condition S-1. Hereinafter, the NOx concentration difference $\Delta$NOx when the target value Qtgt of the fuel injection amount is the first target value Qtgt1 is referred to as "first NOx concentration difference $\Delta$NOx(Qtgt1)", and the NOx concentration difference $\Delta$NOx when the target value Qtgt of the fuel injection amount is the second target value Qtgt2 is referred to as "second NOx concentration difference $\Delta$NOx(Qtgt2)". In addition, the first target value Qtgt1 and the second target value Qtgt2 are determined to be appropriate values in view of the determination on the situation of the difference in fuel injection amount and the situation of the difference in intake air amount, based on the model for estimating NOx concentration.

(Case 1-1) in the Case that the Difference in Fuel Injection Amount is "Positive".

In this case, as described above, the amount of change of the NOx concentration difference $\Delta$NOx is "negative" when the target value Qtgt of the fuel injection amount increases, and the amount of the NOx concentration difference $\Delta$NOx is "positive" when the target value Qtgt of the fuel injection amount is the predetermined value. That is, the value of the first NOx concentration difference $\Delta$NOx(Qtgt1) is "larger" than the value of the second NOx concentration difference $\Delta$NOx(Qtgt2). Furthermore, when the second target value Qtgt2 is employed as the predetermined value, the value of the second NOx concentration difference $\Delta$NOx(Qtgt2) is "positive".

At step 816, the CPU 81 determines whether or not the value of the first NOx concentration difference $\Delta$NOx(Qtgt1) is larger than the value of the second NOx concentration difference $\Delta$NOx(Qtgt2). As described above, the value of the first NOx concentration difference $\Delta$NOx(Qtgt1) is larger than the value of the second NOx concentration difference $\Delta$NOx(Qtgt2) in this case, and then the CPU 81 makes the "Yes" determination at step 816 to proceed to step 818.

At step 818, the CPU 81 determines whether or not the value of the second NOx concentration difference $\Delta$NOx(Qtgt2) is larger than zero. As described above, the value of the second NOx concentration difference $\Delta$NOx(Qtgt2) is "positive" in this case, the CPU 81 makes the "Yes" determination at step 818 to proceed to step 820.

At step 820, the CPU 81 stores "1" as the value of the first fuel-excess-injection flag XQP1. After that, the CPU 81 proceeds to step 895 so as to end this routine once.

Figure 10:
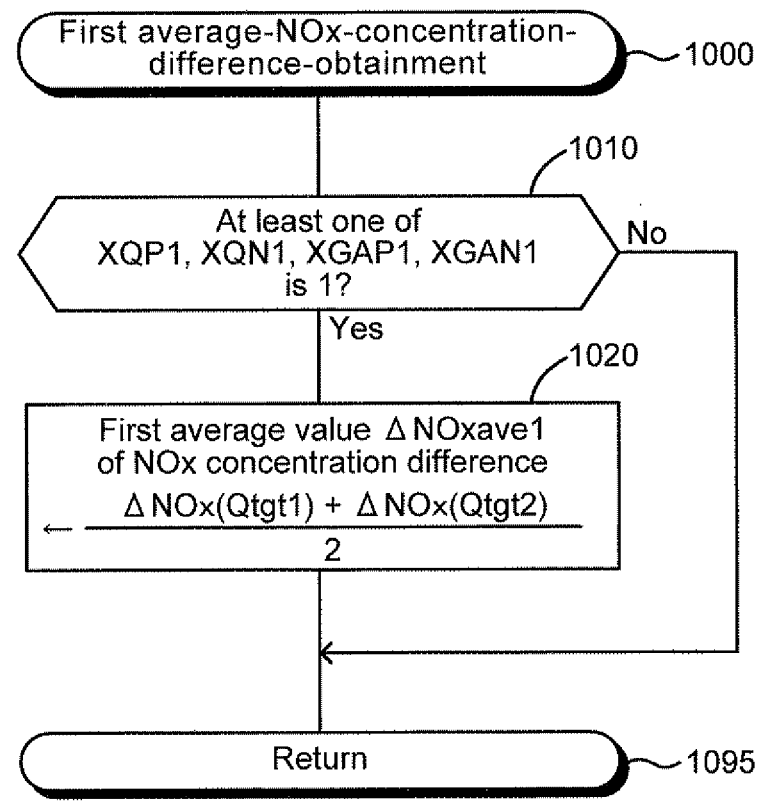
FIG. 10 is a flowchart illustrating a routine executed by CPU of a control device according to second embodiment of the present invention.

Next, the CPU 81 is configured to repeatedly perform the "first average-NOx-concentration-difference-obtaining routine", which is indicated by the flowchart in FIG. 10, every time a predetermined time period elapses. By this routine, the CPU 81 obtains the average value of the value of the first NOx concentration difference $\Delta$NOx(Qtgt1) and the value of the second NOx concentration difference $\Delta$NOx(Qtgt2). Hereinafter, this average value is referred to as "first average value $\Delta$NOxave1 of the NOx concentration difference".

Specifically, the CPU 81 starts a process at step 1000 of FIG. 10 and then proceeds toward step 1010 at a predetermined timing to determine whether or not "1" is set on at least one of the values of the following flags: the first fuel-excess-injection flag XQP1, the first fuel-deficient-injection flag XQN1, the first intake-air-excess-measurement flag XGAP1, and the first intake-air-deficient-measurement flag XGAN1. The value of the first fuel-excess-injection flag XQP1 is "1" at this moment, the CPU 81 makes the "Yes" determination at step 1010 to proceed to step 1020.

At step 1020, the CPU 81 obtains the first average value $\Delta$NOxave1 of the NOx concentration difference by applying the value of the first NOx concentration difference $\Delta$NOx(Qtgt1) and the value of the second NOx concentration difference $\Delta$NOx(Qtgt2) to the following formula (7).

$$\Delta NOxave1=\{\Delta NOx(Qtgt1)+\Delta NOx(Qtgt2)\}/2 \quad (7)$$

After that, the CPU 81 proceeds to step 1095 so as to end this routine once.

In addition, when "0" is set on all of the values of the following flags: the first fuel-excess-injection flag XQP1, the first fuel-deficient-injection flag XQN1, the first intake-air-excess-measurement flag XGAP1, and the first intake-airdeficient-measurement flag XGAN1, the CPU 81 makes the "No" determination at step 1010 to proceed to step 1095 so as to end this routine once. That is, the first average value ΔNOxave1 of the NOx concentration difference is not obtained.

Turning back to the explanation 1-1, the CPU 81 starts a process at step 500 of FIG. 5 and then proceeds toward step 520 through step 510. The value of the first fuel-excess-injection flag XQP1 is "1" at this moment, then the CPU 81 makes the "Yes" determination at step 520 to proceed to step 550.

At step 550, the CPU 81 obtains the correction amount Qc of the fuel injection amount to correct the fuel injection amount by applying the first average value ΔNOxave1 of the NOx concentration difference to the following formula (8). Regarding the formula (8), K1 represents the predetermined negative coefficient. Therefore, the correction amount Qc of the fuel injection amount will be negative number.

$$Qc = K1 \cdot |\Delta NOxave1| \qquad (8)$$

Next, the CPU 81 proceeds to step 560 to add the correction amount Qc of the fuel injection amount to the target value Qtgt of the fuel injection amount. In fact, the correction amount Qc of the fuel injection amount is negative number, then the target value Qtgt of the fuel injection amount is decreased by the correction amount Qc actually.

Next, the CPU 81 proceeds to step 570 to add (actually, subtract since the Qc is negative number) the correction amount Qc of the fuel injection amount to (actually, from) the accumulated value Qcsum of the correction amount and then to obtain (renew) new accumulated value Qcsum of the correction amount. The value of the obtained (renewed) accumulated value Qcsum of the correction amount is stored to the back-up RAM 84.

Next, the CPU 81 proceeds to step 580 to set the value of the first fuel-excess-injection flag XQP1 as "0" and to set the value of the first fuel-deficient-injection flag XQN1 as "0".

Next, the CPU 81 proceeds to step 540 to send the instruction for injecting fuel from the fuel injecting device 22 into the fuel injection cylinder in the amount of the corrected target value Qtgt. The instruction is sent to the fuel injecting device 22. That is, the fuel in the amount of the corrected target value Qtgt is injected into the fuel injection cylinder. After that, the CPU 81 proceeds to step 595 so as to end this routine once.

As described above, when the difference in fuel injection amount is positive (that is, the value of the first fuel-excess-injection flag XQP1 is "1"), the target value Qtgt of the fuel injection amount is corrected (decreased) by the correction amount Qc of the fuel injection amount. As a result thereof, the actual value Qact of the fuel injection amount will get close to the target value Qtgt, and therefore the amount of the difference in fuel injection amount is decreased. These are the treatment carried out when the difference in fuel injection amount is positive.

(Case 1-2) in the Case that at Least the Difference in Intake Air Amount is "Positive".

In this case, as described above, the amount of change of the NOx concentration difference ΔNOx is "negative" when the target value Qtgt of the fuel injection amount increases, and the amount of the NOx concentration difference ΔNOx is "negative" when the target value Qtgt of the fuel injection amount is the predetermined value. That is, the value of the first NOx concentration difference ΔNOx(Qtgt1) is "larger" than the value of the second NOx concentration difference ΔNOx(Qtgt2). Furthermore, when the second target value Qtgt2 is employed as the predetermined value, the value of the second NOx concentration difference ΔNOx(Qtgt2) is "negative".

Therefore, in this case, the CPU 81 makes the "Yes" determination at step 816 to proceed to step 818 in FIG. 9. Then, the CPU 81 makes the "No" determination at step 818 to proceed to step 822.

At step 822, the CPU 81 stores "1" as the value of the first intake-air-excess-measurement flag XGAP1. After that, the CPU 81 proceeds to step 895 so as to end this routine once.

Then, the CPU 81 starts a process at step 1000 of FIG. 10 and then proceeds toward step 1010 at a predetermined timing. The value of the first fuel-excess-injection flag XQP1 is "1" at this moment, the CPU 81 makes the "Yes" determination at step 1010 to proceed to step 1020. The CPU 81 obtains the first average value ΔNOxave1 of the NOx concentration difference at step 1020 and proceed to step 1095 so as to end this routine once.

Furthermore, the CPU 81 starts a process at step 600 of FIG. 6 and then proceeds toward step 620 through step 610. The value of the first intake-air-excess-measurement flag XGAP1 is "1" at this moment, the CPU 81 makes the "Yes" determination at step 620 to proceed to step 640.

At step 640, the CPU 81 obtains the correction amount Gac of the intake air amount to correct the intake air amount by applying the first average value ΔNOxave1 of the NOx concentration difference to the following formula (9). Regarding the formula (9), K3 represents the predetermined negative coefficient. Therefore, the correction amount Gac of the intake air amount will be negative number.

$$Gac = K3 \cdot |\Delta NOxave1| \qquad (9)$$

Next, the CPU 81 proceeds to step 650 to add the correction amount Gac of the intake air amount to the measured value Gamsr of the intake air amount. In fact, the correction amount Gac of the intake air amount is negative number, then the measured value Gamsr of the intake air amount is decreased by the correction amount Gac actually.

Next, the CPU 81 proceeds to step 660 to add (actually, subtract since the Gac is negative number) the correction amount Gac of the intake air amount to (actually, from) the accumulated value Gacsum of the correction amount and then to obtain (renew) new accumulated value Gacsum of the correction amount. The value of the obtained (renewed) accumulated value Gacsum of the correction amount is stored to the back-up RAM 84.

Next, the CPU 81 proceeds to step 670 to set the value of the first intake-air-excess-measurement flag XGAP1 as "0" and to set the value of the first intake-air-deficient-measurement flag XGAN1 as "0". After that, the CPU 81 proceeds to step 695 so as to end this routine once.

As described above, when at least the difference in intake air amount is positive (that is, the value of the first intake-air-excess-measurement flag XGAP1 is "1"), the measured value Gamsr of the intake air amount is corrected (decreased) by the correction amount Gac of the intake air amount. As a result thereof, the measured value Gamsr of the intake air amount will get close to the actual value Gaact, and therefore the amount of the difference in intake air amount is decreased. These are the treatment carried out when the difference in intake air amount is positive.

(Case 1-3) in the Case that at Least the Difference in Intake Air Amount is "Negative".

In this case, as described above, the amount of change of the NOx concentration difference ΔNOx is "positive" when the target value Qtgt of the fuel injection amount increases, and the amount of the NOx concentration difference ΔNOx is "positive" when the target value Qtgt of the fuel injection amount is the predetermined value. That is, the value of the first NOx concentration difference ΔNOx(Qtgt1) is "smaller" than the value of the second NOx concentration difference ΔNOx(Qtgt2). Furthermore, when the second target value Qtgt2 is employed as the predetermined value, the value of the second NOx concentration difference ΔNOx(Qtgt2) is "positive".

Therefore, in this case, the CPU 81 makes the "No" determination at step 816 to proceed to step 824. At step 824, the CPU 81 determines whether or not the value of the first NOx concentration difference ΔNOx(Qtgt1) is smaller than the value of the second NOx concentration difference ΔNOx (Qtgt2). As described above, the value of the first NOx concentration difference ΔNOx(Qtgt1) is smaller than the value of the second NOx concentration difference ΔNOx(Qtgt2) in this case, and therefore the CPU 81 makes the "Yes" determination at step 824 to proceed to step 826.

At step 826, the CPU 81 the value of the second NOx concentration difference ΔNOx(Qtgt2) is larger than zero. As described above, the value of the second NOx concentration difference ΔNOx(Qtgt2) is "positive" in this case, and therefore the CPU 81 makes the "Yes" determination at step 826 to proceed to step 828.

At step 828, the CPU 81 stores "1" as the value of the first intake-air-deficient-measurement flag XGAN1. After that, the CPU 81 proceeds to step 895 so as to end this routine once.

Then, the CPU 81 starts a process at step 1000 of FIG. 10 and then proceeds toward step 1010 at a predetermined timing. The value of the first intake-air-deficient-measurement flag XGAN1 is "1" at this moment, the CPU 81 makes the "Yes" determination at step 1010 to proceed to step 1020. The CPU 81 obtains the first average value ΔNOxave1 of the NOx concentration difference at step 1020 and proceed to step 1095 so as to end this routine once.

Furthermore, the CPU 81 starts a process at step 600 of FIG. 6 and then proceeds toward step 620 through step 610. The value of the first intake-air-excess-measurement flag XGAP1 is "0" at this moment according to the first precondition for default setting, the CPU 81 makes the "No" determination at step 620 to proceed to step 630.

The value of the first intake-air-deficient-measurement flag XGAN1 is "1" at this moment, and therefore the CPU 81 makes the "Yes" determination at step 630 to proceed to step 680.

At step 680, the CPU 81 obtains the correction amount Gac of the intake air amount to correct the intake air amount by applying the first average value ΔNOxave1 of the NOx concentration difference to the following formula (10). Regarding the formula (10), K4 represents the predetermined positive coefficient. Therefore, the correction amount Gac of the intake air amount will be positive number.

$$Gac = K4 \cdot |\Delta NOxave1| \quad (10)$$

Next, the CPU 81 proceeds to step 650 to add the correction amount Gac of the intake air amount to the measured value Gamsr of the intake air amount. The correction amount Gac of the intake air amount is positive number, and therefore the measured value Gamsr of the intake air amount is increased by the correction amount Gac.

Next, the CPU 81 proceeds to step 660 to add (actually, add since the Gac is positive number) the correction amount Gac of the intake air amount to the accumulated value Gacsum of the correction amount and then to obtain (renew) new accumulated value Gacsum of the correction amount. The value of the obtained (renewed) accumulated value Gacsum of the correction amount is stored to the back-up RAM 84.

Next, the CPU 81 proceeds to step 670 to set the value of the first intake-air-excess-measurement flag XGAP1 as "0" and to set the value of the first intake-air-deficient-measurement flag XGAN1 as "0". After that, the CPU 81 proceeds to step 695 so as to end this routine once.

As described above, when at least the difference in intake air amount is negative (that is, the value of first intake-air-deficient-measurement flag XGAN1 is "1"), the measured value Gamsr of the intake air amount is corrected (increased) by the correction amount Gac of the intake air amount. As a result thereof, the measured value Gamsr of the intake air amount will get close to the actual value Gaact, and therefore the amount of the difference in intake air amount is decreased. These are the treatment carried out when the difference in intake air amount is positive.

(Case 1-4) in the Case that the Difference in Fuel Injection Amount is "Negative".

In this case, as described above, the amount of change of the NOx concentration difference ΔNOx is "positive" when the target value Qtgt of the fuel injection amount increases, and the amount of the NOx concentration difference ΔNOx is "negative" when the target value Qtgt of the fuel injection amount is the predetermined value. That is, the value of the first NOx concentration difference ΔNOx(Qtgt1) is "smaller" than the value of the second NOx concentration difference ΔNOx(Qtgt2). Furthermore, when the second target value Qtgt2 is employed as the predetermined value, the value of the second NOx concentration difference ΔNOx(Qtgt2) is "negative".

Therefore, in this case, the CPU 81 proceeds to step 826 through step 816 and step 824 in FIG. 9. At step 826, the CPU 81 makes the "No" determination to proceed to step 830.

At step 830, the CPU 81 stores "1" as the value of the first fuel-deficient-injection flag XQN1. After that, the CPU 81 proceeds to step 895 so as to end this routine once.

Then, the CPU 81 starts a process at step 1000 of FIG. 10 and then proceeds toward step 1010 at a predetermined timing. The value of the first fuel-deficient-injection flag XQN1 is "1" at this moment, the CPU 81 makes the "Yes" determination at step 1010 to proceed to step 1020. The CPU 81 obtains the first average value ΔNOxave1 of the NOx concentration difference at step 1020 and proceed to step 1095 so as to end this routine once.

Furthermore, the CPU 81 starts a process at step 500 of FIG. 5 and then proceeds toward step 520 through step 510. The value of the first fuel-excess-injection flag XQP1 is "0" at this moment according to the first precondition for default setting, the CPU 81 makes the "No" determination at step 520 to proceed to step 530.

The value of the first fuel-deficient-injection flag XQN1 is "1" at this moment, and therefore the CPU 81 makes the "Yes" determination at step 530 to proceed to step 590.

At step 590, the CPU 81 obtains the correction amount Qc of the fuel injection amount to correct the fuel injection amount by applying the first average value ΔNOxave1 of the NOx concentration difference to the following formula (11). Regarding the formula (11), K2 represents the predetermined positive coefficient. Therefore, the correction amount Qc of the fuel injection amount will be positive number.

$$Qc = K2 \cdot |\Delta NOxave1| \quad (11)$$

Next, the CPU 81 proceeds to step 560 to add the correction amount Qc of the fuel injection amount to the target value Qtgt of the fuel injection amount. The correction amount Qc of the fuel injection amount is positive number, and therefore the target value Qtgt of the fuel injection amount is increased by the correction amount Qc.

Next, the CPU 81 proceeds to step 570 to add (actually, add since the Qc is positive number) the correction amount Qc of the fuel injection amount to the accumulated value Qcsum of the correction amount and then to obtain (renew) new accumulated value Qcsum of the correction amount. The value of the obtained (renewed) accumulated value Qcsum of the correction amount is stored to the back-up RAM 84.

Next, the CPU 81 proceeds to step 580 to set the value of the first fuel-excess-injection flag XQP1 as "0" and to set the value of the first fuel-deficient-injection flag XQN1 as "0".

Next, the CPU 81 proceeds to step 540 to send an instruction for injecting fuel from the fuel injecting device 22 into the fuel injection cylinder in the amount of the corrected target value Qtgt. The instruction is sent to the fuel injecting device 22. That is, the fuel in the amount of the corrected target value Qtgt is injected into the fuel injection cylinder. After that, the CPU 81 proceeds to step 595 so as to end this routine once.

As described above, when the difference in fuel injection amount is negative (that is, the value of first fuel-deficient-injection flag XQN1 is "1"), the target value Qtgt of the fuel injection amount is corrected (increased) by the correction amount Qc of the fuel injection amount. As a result thereof, the actual value Qact of the fuel injection amount will get close to the target value Qtgt, and therefore the amount of the difference in fuel injection amount is decreased. These are the treatment carried out when the difference in fuel injection amount is negative.

(Case 1-5) in the Case that Difference in Intake Air Amount is "Zero" and the Difference in Fuel Injection Amount is "Zero.

In this case, as described above, the amount of change of the NOx concentration difference ΔNOx is "zero" when the target value Qtgt of the fuel injection amount increases, and the amount of the NOx concentration difference ΔNOx is "zero" when the target value Qtgt of the fuel injection amount is the predetermined value. That is, the value of the first NOx concentration difference ΔNOx(Qtgt1) is "zero", and the value of the second NOx concentration difference ΔNOx(Qtgt2) is "zero".

Therefore, in this case, the CPU 81 proceeds to step 832 through step 816 and step 824. At step 832, the CPU 81 determines whether or not the value of the first NOx concentration difference ΔNOx(Qtgt1) is zero and the value of the second NOx concentration difference ΔNOx(Qtgt2) is zero. The value of the first NOx concentration difference ΔNOx(Qtgt1) is "zero" and the value of the second NOx concentration difference ΔNOx(Qtgt2) is "zero" in this case, and therefore the CPU 81 makes the "Yes" determination At step 832 to proceed to step 834.

Next, the CPU 81 carries out the treatments indicated in step 834 to step 840 in this order. Specifically, the CPU 81 stores the following values as the following flags: "0" as the value of the first fuel-excess-injection flag XQP1 at step 834, "0" as the value of the first fuel-deficient-injection flag XQN1 at step 836, "0" as the value of the first intake-air-excess-measurement flag XGAP1 at step 838, and "0" as the value of the first intake-air-deficient-measurement flag XGAN1 at step 840. After that, the CPU 81 proceeds to step 895 so as to end this routine once.

Then, the CPU 81 starts a process at step 1000 of FIG. 10 and then proceeds toward step 1010 at a predetermined timing. According to the first precondition for default setting, setting "zero" is done at this moment to all of the values of the flags: the value of the first fuel-excess-injection flag XQP1; the value of the first fuel-deficient-injection flag XQN1; the value of the first intake-air-excess-measurement flag XGAP1; and the value of the first intake-air-deficient-measurement flag XGAN1, and therefore the CPU 81 makes the "No" determination at step 1010 to proceed to step 1095 so as to end this routine once.

Furthermore, the CPU 81 starts a process at step 500 of FIG. 5 and then proceeds toward step 595 so as to end this routine once, through step 510, step 520, step 530 and step 540, since the value of the first fuel-excess-injection flag XQP1 is "0" and the value of the first fuel-deficient-injection flag XQN1 is "0" at this moment.

Furthermore, the CPU 81 starts a process at step 600 of FIG. 6 and then proceeds toward step 695 so as to end this routine once, through step 610, step 620 and step 630, since the value of the first intake-air-excess-measurement flag XGAP1 is "0" and the value of the first intake-air-deficient-measurement flag XGAN1 is "0" at this moment.

As described above, when the difference in fuel injection amount is "zero" and the difference in intake air amount is "zero" (that is, the value of the first fuel-excess-injection flag XQP1 is "0" and the value of the first fuel-deficient-injection flag XQN1 is "0"), the target value Qtgt of the fuel injection amount and the measured value Gamsr of the intake air amount are not corrected. These are the treatment carried out when the difference in intake air amount is zero and the difference in fuel injection amount is zero.

(Case 1-6) In the Case that a Difference(s) Other than the Difference in Fuel Injection Amount and the Difference in Intake Air Amount Occur(s).

In this case, as described above, the amount of change of the NOx concentration difference ΔNOx is "zero" when the target value Qtgt of the fuel injection amount increases, and the amount of the NOx concentration difference ΔNOx is "positive" or "negative" when the target value Qtgt of the fuel injection amount is the predetermined value. That is, the value of the first NOx concentration difference ΔNOx(Qtgt1) is "the same" as the value of the second NOx concentration difference ΔNOx(Qtgt2). Furthermore, the value of the first NOx concentration difference ΔNOx(Qtgt1) is not zero, and the value of the second NOx concentration difference ΔNOx(Qtgt2) is not zero.

Therefore, in this case, the CPU 81 proceeds to step 832 through step 816 and step 824. At step 832, the CPU 81 makes the "No" determination At step 832 to proceed to step 842.

At step 842, the CPU 81 stores "1" as the value of the first other-abnormality-occurrence flag XOTH1. After that, the CPU 81 proceeds to step 895 so as to end this routine once, through step 834 to step 840. Therefore, in this case, the value of the first fuel-excess-injection flag XQP1 is "0", the value of the first fuel-deficient-injection flag XQN1 is "0", the value of the first intake-air-excess-measurement flag XGAP1 is "0", and the value of the first intake-air-deficient-measurement flag XGAN1 is "0".

Then, the CPU 81 starts a process at step 1000 of FIG. 10, proceeds to step 1010 followed by step 1000 to makes the "No" determination, and then proceeds to step 1095 so as to end this routine once.

Furthermore, the CPU 81 starts a process at step 500 of FIG. 5 and then proceeds toward step 595 so as to end this routine once, through step 510, step 520, step 530 and step 540.

Furthermore, the CPU 81 starts a process at step 600 of FIG. 6 and then proceeds toward step 695 so as to end this routine once, through step 610, step 620 and step 630.

As described above, when a difference(s) other than the difference in fuel injection amount and the difference in intake air amount occur(s) (that is, the value of the first other-abnormality-occurrence flag XOTH1 is "1"), the target value Qtgt of the fuel injection amount and the measured value Gamsr of the intake air amount are not corrected. These are the treatment carried out when a difference(s) other than the difference in fuel injection amount and the difference in intake air amount occur(s).

As explained in the case 1-1 to the case 1-6, the first device determines the situation of the difference in fuel injection amount and the situation of the difference in intake air amount, based on "the amount of change of the NOx concentration difference ΔNOx when the target value Qtgt of the fuel injection amount increases" and "the value of the NOx concentration difference ΔNOx when the target value Qtgt of the fuel injection amount is a predetermined value". Furthermore, the first device corrects the measured value Gamsr of the intake air amount and the target value Qtgt of the fuel injection amount, depending on the situation of the difference in fuel injection amount and the situation of the difference in intake air amount.

Figure 11:
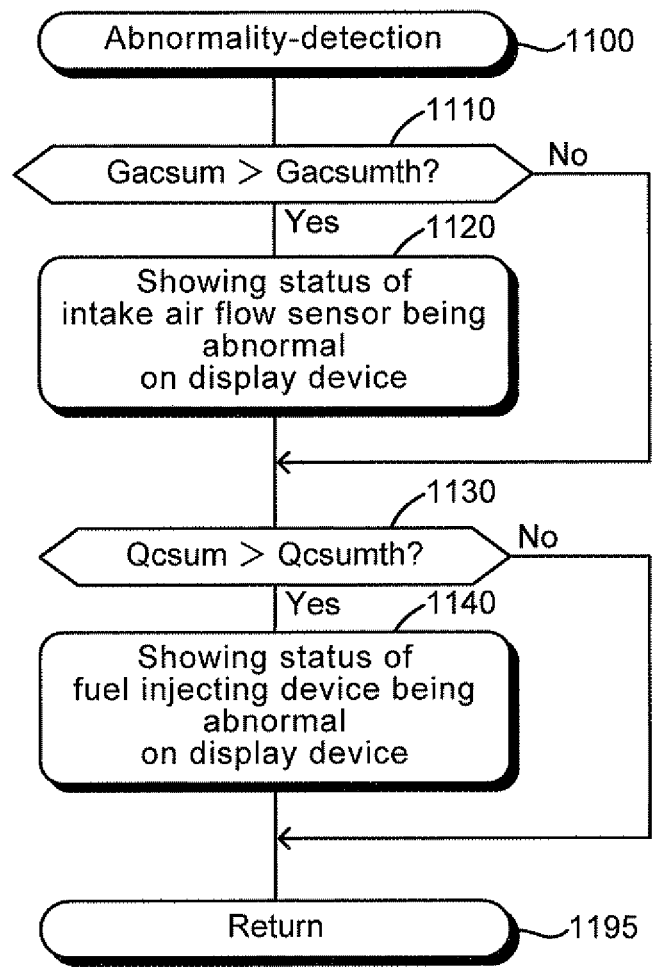
FIG. 11 is a flowchart illustrating a routine executed by CPU of the control device according to the second embodiment of the present invention.

Furthermore, the CPU 81 is configured to repeatedly perform the "abnormality-detection routine", which is indicated by the flowchart in FIG. 11, every time a predetermined time period elapses. By this routine, the CPU 81 shows the status that "the intake air flow sensor (air flow meter) 71 is abnormal" on a display device (not illustrated) by turning on a caution-advisory indicator, etc., when the degree of the difference in intake air amount is larger than a predetermined degree. Furthermore, by this routine, the CPU 81 shows the status that "the fuel injecting device (injector) 22 is abnormal" in a similar way, when the degree of the difference in fuel injection amount is larger than a predetermined degree.

Specifically, the CPU 81 starts a process at step 1100 of FIG. 11 and then proceeds toward step 1110 at a predetermined timing to determine whether or not the accumulated value Gacsum of the correction amount is larger than the predetermined threshold value Gacsumth.

If the accumulated value Gacsum of the correction amount is larger than the predetermined threshold value Gacsumth, then the CPU 81 makes the "Yes" determination at step 1110 to proceed to step 1120. At step 1120, the CPU 81 shows the status that "the intake air flow sensor 71 is abnormal" on the display device (not illustrated), and proceeds to step 1130.

To the contrary, if the accumulated value Gacsum of the correction amount is equal to or smaller than the predetermined threshold value Gacsumth, then the CPU 81 makes the "No" determination at step 1110 to directly proceed to step 1130. That is, the status that "the intake air flow sensor 71 is abnormal" is not shown on the display device.

At step 1130, the CPU 81 determines whether or not the accumulated value Qcsum of the correction amount is larger than a predetermined threshold value Qcsumth.

If the accumulated value Qcsum of the correction amount is larger than the predetermined threshold value Qcsumth, then the CPU 81 makes the "Yes" determination at step 1130 to proceed to step 1140. At step 1140, the CPU 81 shows the status that "the fuel injecting device 22 is abnormal" on the display device (not illustrated), and proceeds to step 1195 so as to end this routine once.

To the contrary, if the accumulated value Qcsum of the correction amount is equal to or smaller than the predetermined threshold value Qcsumth, then the CPU 81 makes the "No" determination at step 1130 to directly proceed to step 1195 so as to end this routine once. That is, the status that "the fuel injecting device 22 is abnormal" is not shown on the display device.

By the way, as described above, the value of the first fuel-excess-injection flag XQP1 and the value of the first fuel-deficient-injection flag XQN1 are re-set to "0" after the target value Qtgt of the fuel injection amount is corrected (see step 580 in FIG. 5). Therefore, in the case, for example, that "only" the difference in fuel injection amount occurs, if the difference in fuel injection amount is not sufficiently corrected (that is, if the difference in fuel injection amount does not become zero) by the above treatments carried out at one time point, then the value of the first fuel-excess-injection flag XQP1 or the value of the first fuel-deficient-injection flag XQN1 is set to "1" again when the first situation-determination routine is carried out at the another time period that is after the one time period. As a result thereof, the target value Qtgt of the fuel injection amount is also corrected at the another time period.

On the other hand, if the difference in fuel injection amount is sufficiently corrected at the one time point, then the value of the first fuel-excess-injection flag XQP1 and the value of the first fuel-deficient-injection flag XQN1 is not set to "1" when the first situation-determination routine is carried out at the another time period. As a result thereof, the target value Qtgt of the fuel injection amount is not corrected at the another time period. As described above, in the case that "only" the difference in fuel injection amount occurs, the first device repeatedly corrects the target value Qtgt of the fuel injection amount until the difference in fuel injection amount is sufficiently decreased.

Furthermore, the value of the first intake-air-excess-measurement flag XGAP1 and the value of the first intake-air-deficient-measurement flag XGAN1 are re-set to "0" after the measured value Gamsr of the intake air amount is corrected (see step 670 in FIG. 6). As will be appreciated from the above descriptions, in the case that "only" the difference in intake air amount occurs, the first device repeatedly corrects the measured value Gamsr of the intake air amount until the difference in intake air amount is sufficiently decreased.

On the other hand, in the case that "both" of the difference in intake air amount and the difference in fuel injection amount occur, if it is determined, for example, that "at least the difference in intake air amount occurs" at the one time point, then the value of the first intake-air-excess-measurement flag XGAP1 and the value of the first intake-air-deficient-measurement flag XGAN1 are re-set to "0" after the measured value Gamsr of the intake air amount is corrected. If the difference in intake air amount is not sufficiently corrected by this correction, then it is determined that "at least the difference in intake air amount occurs" again at the another time point, and the measured value Gamsr of the intake air amount is corrected.

On the other hand, if the difference in intake air amount is sufficiently corrected by the correction carried out at the one time point, then it is determined that "the difference in fuel injection amount occurs" at the another time point, and the target value Qtgt of the fuel injection amount is corrected. After that, the target value Qtgt of the fuel injection amount will be repeatedly corrected until the difference in fuel injection amount is sufficiently decreased.

As described above, the first device repeatedly carries out the correction until the difference in fuel injection amount and the difference in intake air amount is sufficiently decreased, either in the case that "one" of the difference in intake air amount and the difference in fuel injection amount occurs or "both" of them occur. As a result thereof, the amount of the NOx concentration difference ΔNOx is decreased.

<Function and Effect of the Device>

The first device obtains the NOx concentration difference ΔNOx by comparing the measured value NOxmsr of the NOx concentration of exhaust gas with the NOx referential concentration NOxref that is defined based on the operating conditions of the engine 10. Furthermore, the first device determines whether the difference in fuel injection amount is zero, positive or negative; or whether the difference in intake air amount is zero, positive or negative, based on the relationship between the NOx concentration difference ΔNOx and the target value Qtgt of the fuel injection amount (the first relationship R1(Qtgt, ΔNOx) described above). That is, the first device can determine how different the target value Qtgt of the fuel injection amount and the actual value Qact are, when the NOx concentration difference ΔNOx occurs. Furthermore, the first device can determine how different the measured value Gamsr of the intake air amount and the actual value Gaact are, when the NOx concentration difference ΔNOx occurs.

Furthermore, the first device corrects the target value Qtgt of the fuel injection amount depending on the amount of the NOx concentration difference ΔNOx (i.e., the average value ΔNOxave of the first NOx concentration difference ΔNOx (Qtgt1) and the second NOx concentration difference ΔNOx (Qtgt2)), when the difference in fuel injection amount occurs. On the other hand, the first device corrects the measured value Gamsr of the intake air amount depending on the amount of the NOx concentration difference ΔNOxave, when the difference in intake air amount occurs. Furthermore, the first device repeatedly carries out these corrections until the difference in fuel injection amount and the difference in intake air amount are sufficiently corrected. Thereby, the amount of the difference in fuel injection amount and the amount of the difference in intake air amount are appropriately decreased. As a result thereof, the NOx concentration difference is decreased.

Additionally, in the case that the accumulated value Qcsum of the correction amount employed when the difference in fuel injection amount is corrected is larger than the predetermined threshold value Qcsumth, the first device shows the status that "the fuel injecting device 22 is abnormal" on the display device. On the other hand, in the case that the accumulated value Gacsum of the correction amount employed when the difference in intake air amount is corrected is larger than the predetermined threshold value Gacsumth, the first device shows the status that "the intake air flow sensor 71 is abnormal" on the display device.

(Second Embodiment)

Next, second embodiment of the control device for internal combustion engine of the present invention (hereinafter referred to as "second device") will be described below.

<Outline of Device>

The second device is applied to an internal combustion engine that has the same configuration as the engine 10 that the first device is applied to (see FIG. 1. For convenience, the internal combustion engine is hereinafter referred to as "engine 10".) Therefore, detailed description is omitted regarding the outline of the device that the second device is applied to.

<Outline of Operation of Device>

Hereinafter, the outline of the operation of the second device configured as described above will be described.

The second device is different from the first device only in a respect that the second device determines the situation of the difference in fuel injection amount and the situation of the difference in intake air amount based on "the relationship between the intake oxygen concentration Ocon and the NOx concentration difference ΔNOx", instead of the relationship between the target value Qtgt of the fuel injection amount and the NOx concentration difference ΔNOx (i.e., the first relationship R1(Qtgt, ΔNOx)).

The second device obtains "the intake oxygen concentration Ocon" and "the NOx concentration difference ΔNOx" by the same method as the first device. And, during the engine 10 is being driven, the second device continues to obtain the intake oxygen concentration Ocon and the NOx concentration difference ΔNOx together with matching them each other. Furthermore, the second device determines the situation of the difference in fuel injection amount and the situation of the difference in intake air amount based on the obtained values.

The second device corrects the target value Qtgt of the fuel injection amount by a predetermined correction amount so as to decrease the amount of the difference in fuel injection amount depending on the result of the situation determination. Furthermore, the second device corrects the measured value Gamsr of the intake air amount by a predetermined correction amount so as to decrease the amount of the difference in intake air amount depending on the result of the situation determination. Additionally, the second device repeats the correction until the difference in fuel injection amount becomes zero and the difference in intake air amount becomes zero.

The second device shows the status that "the fuel injecting device 22 is abnormal" on a display device (not illustrated in FIG. 1) etc., when the accumulated value of the correction amounts of the target value Qtgt of the fuel injection amount becomes larger than a predetermined threshold value. Furthermore, the second device shows the status that "the intake air flow sensor 71 is abnormal" on the display device etc., when the accumulated value of the correction amounts of the measured value Gamsr of the intake air amount becomes larger than a predetermined threshold value. These are the outline of operation of the second device.

<Method for Controlling Internal Combustion Engine>

Subsequently, the method employed in the second device for controlling the engine 10 will be described, before descriptions of the specific operation of the second device. The second device employs the same model for estimating NOx concentration as the first device. Therefore, the explanation for a model for estimating NOx concentration (see the explanation 1-1) and the explanation for reasons why the NOx concentration difference results when at least one of the difference in intake air amount and the difference in fuel injection amount occurs (see the explanation 1-2) are omitted. The control method employed in the second device will be described according to the following order of explanations 1-1 to 1-2.

(Explanation 2-1)

Explanation for a method for determining the situation of the difference in fuel injection amount and the situation of the difference in intake air amount.

(Explanation 2-2)

Explanation for corrections depending on results of the situation determinations.

(Explanation 2-1) Explanation for a Method for Determining the Situation of the Difference in Fuel Injection Amount and the Situation of the Difference in Intake Air Amount.

The description below is "the relationship between the intake oxygen concentration Ocon and the NOx concentration difference ΔNOx" in the case that "one or plural" of the following conditions 2-A to 2-D are met, with the model for estimating NOx concentration.

(Condition 2-A)

The actual value Gaact of the intake air amount is smaller than the measured value Gamsr.

(Condition 2-B)

The actual value Gaact of the intake air amount is larger than the measured value Gamsr.

(Condition 2-C)

The actual value Qact of the fuel injection amount is smaller than the target value Qtgt.

(Condition 2-D)
The actual value Qact of the fuel injection amount is larger than the target value Qtgt.

hereinafter, the situation represented by the condition 2-A is referred to as "the difference in intake air amount is negative", the situation represented by the condition 2-B is referred to as "the difference in intake air amount is positive", the situation represented by the condition 2-C is referred to as "the difference in fuel injection amount is negative", and the situation represented by the condition 2-D is referred to as "the difference in fuel injection amount is positive." Furthermore, the relationship between the intake oxygen concentration Ocon and the NOx concentration difference $\Delta$NOx is hereinafter referred to as "second relationship R2(Ocon, $\Delta$NOx)".

Furthermore, it is presupposed in this explanation 2-1 that operating parameter(s) "other than" the intake air amount and the fuel injection amount that may have effects on the NOx concentration is(are) fixed at a(each) predetermined value(s). Examples of such operating parameter includes parameters that have effects on the total amount Gcyl of gas introduced into the cylinder, such as the engine rotation speed NE and the supercharging pressure Pim; the target value Regrtgt of the EGR ratio; and the timing of injecting fuel into the cylinder, fuel injection timing. That is, it is deemed that the NOx concentration difference $\Delta$NOx is affected by "only" the difference in intake air amount and the difference in fuel injection amount.

First, the description below is the second relationship R2(Ocon, $\Delta$NOx) when "one" of the conditions 2-A to 2-D is met.

Figure 12A:
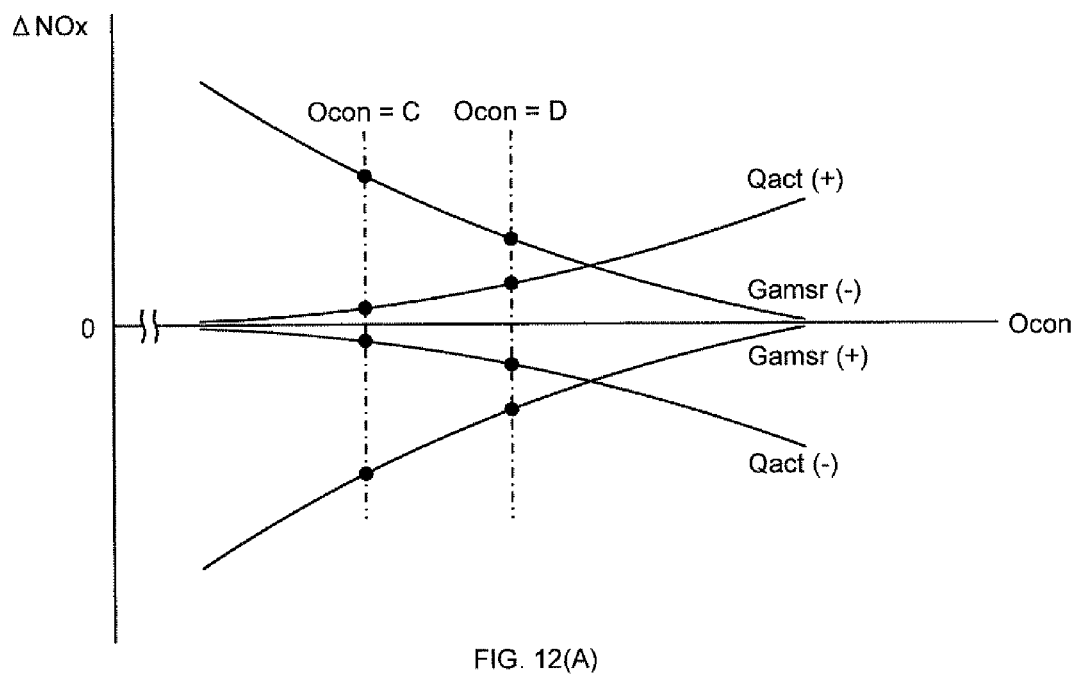
FIG. 12 is a graph illustrating the relationship between the oxygen concentration of intake air, the NOx concentration difference, situation of the difference in fuel injection amount, and situation of the difference in intake air amount, regarding the internal combustion engine that employs a control device according to the second embodiment of the invention.

FIG. 12(A) is a graph illustrating the second relationship R2(Ocon, $\Delta$NOx), which is illustrated by using "the model for estimating NOx concentration", when one of the conditions 2-A to 2-D is met. The index numbers A, B and C (see the formula (5)) are determined based on the experiments carried out with "an engine that has the same configuration as the engine 10 and that has been confirmed to perform so that the target value Qtgt of the fuel injection amount coincides with the actual value Qact thereof and the measured value Gamsr of the intake air amount coincides with the actual value Gaact thereof."

In FIG. 12(A), Gamsr(−) indicates the curved line that represents the second relationship R2(Ocon, $\Delta$NOx) in the case that the condition 2-A is met (that is, the case that the difference in intake air amount is negative). Gamsr(+) indicates the curved line that represents the second relationship R2(Ocon, $\Delta$NOx) in the case that the condition 2-B is met (that is, the case that the difference in intake air amount is positive). Qact(−) indicates the curved line that represents the second relationship R2(Ocon, $\Delta$NOx) in the case that the condition 2-C is met (that is, the case that the difference in fuel injection amount is negative). Qact(+) indicates the curved line that represents the second relationship R2(Ocon, $\Delta$NOx) in the case that the condition 2-D is met (that is, the case that the difference in fuel injection amount is positive).

First, in the case that "only the condition 2-A" is met, the amount of the NOx concentration difference $\Delta$NOx decreases with the increasing amount of the intake oxygen concentration Ocon within at least the range of the intake oxygen concentration Ocon from the predetermined value C to the predetermined value D (C≤Ocon≤D), as shown by the curved line Gamsr(−). That is, the amount of change of the NOx concentration difference $\Delta$NOx is "negative" when the intake oxygen concentration Ocon increases. Furthermore, in this case, the NOx concentration difference $\Delta$NOx is "positive" when the intake oxygen concentration Ocon is the predetermined value C.

Furthermore, in the case that "only the condition 2-B" is met, the amount of the NOx concentration difference $\Delta$NOx increases with the increasing amount of the intake oxygen concentration Ocon within at least the above range (C≤Ocon≤D), as shown by the curved line Gamsr(+). That is, the amount of change of the NOx concentration difference $\Delta$NOx is "positive" when the intake oxygen concentration Ocon increases. Furthermore, in this case, the NOx concentration difference $\Delta$NOx is "negative" when the intake oxygen concentration Ocon is the predetermined value C.

Additionally, in the case that "only the condition 2-C" is met, the amount of the NOx concentration difference $\Delta$NOx decreases with the increasing amount of the intake oxygen concentration Ocon within at least the above range (C≤Ocon≤D), as shown by the curved line Qact(−). That is, the amount of change of the NOx concentration difference $\Delta$NOx is "negative" when the intake oxygen concentration Ocon increases. Furthermore, in this case, the NOx concentration difference $\Delta$NOx is "negative" when the intake oxygen concentration Ocon is the predetermined value C.

More additionally, in the case that "only the condition 2-D" is met, the amount of the NOx concentration difference $\Delta$NOx increases with the increasing amount of the intake oxygen concentration Ocon within at least the above range (C≤Ocon≤D), as shown by the curved line Qact(+). That is, the amount of change of the NOx concentration difference $\Delta$NOx is "positive" when the intake oxygen concentration Ocon increases. Furthermore, in this case, the NOx concentration difference $\Delta$NOx is "positive" when the intake oxygen concentration Ocon is the predetermined value C.

As described above, the second relationship R2(Ocon, $\Delta$NOx) in the case that the condition 2-A is met, the second relationship R2(Ocon, $\Delta$NOx) in the case that the condition 2-B is met, the second relationship R2(Ocon, $\Delta$NOx) in the case that the condition 2-C is met, and the second relationship R2(Ocon, $\Delta$NOx) in the case that the condition 2-D is met are different from each other.

Each of the predetermined value C and the predetermined value D may be set at an appropriate value that results in a difference between: one second relationship R2(Ocon, $\Delta$NOx) obtained when one of the conditions 2-A to 2-D is met; and the other second relationship R2(Ocon, $\Delta$NOx) obtained when the other of the conditions, which are different from the one of the conditions, is met.

As above, the second relationship R2(Ocon, $\Delta$NOx) in the case that "one" of the conditions 2-A to 2-D is met (that is, "one" of the difference in intake air amount and the difference in fuel injection amount occurs) is described.

Next, the description below is the second relationship R2(Ocon, $\Delta$NOx) when "plural" of the conditions 2-A to 2-D are met (that is, when "both" of the difference in intake air amount and the difference in fuel injection amount occur").

Figure 12B:
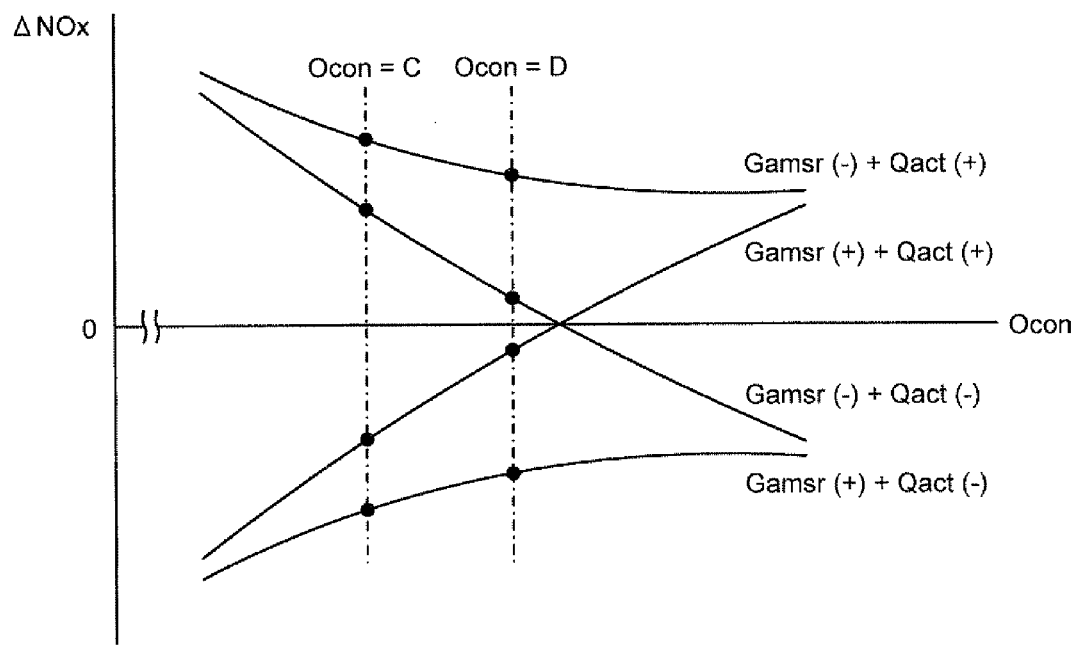
Figure 13:
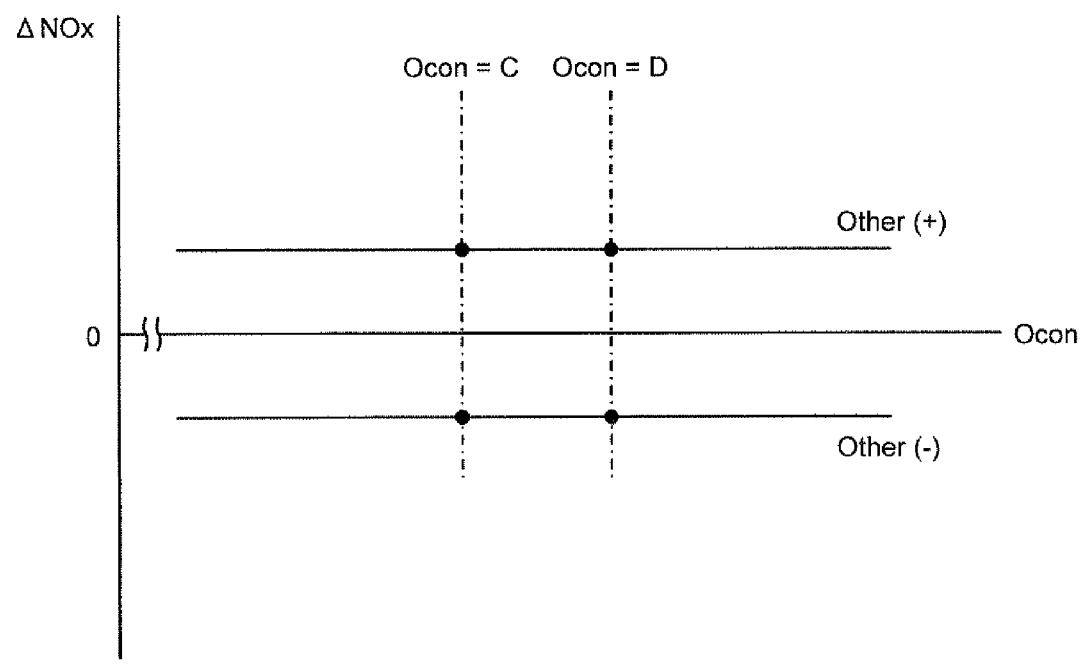
FIG. 13 is a graph illustrating the relationship between the oxygen concentration of intake air, the NOx concentration difference, situation of the difference in fuel injection amount, and situation of the difference in intake air amount, regarding the internal combustion engine that employs the control device according to the second embodiment of the invention.

FIG. 12(B) is a graph illustrating the second relationship R2(Ocon, $\Delta$NOx), which is illustrated by using "the model for estimating NOx concentration", when plural of the conditions 2-A to 2-D are met.

In FIG. 12(B), Gamsr(−)+Qact(+) indicates the curved line that represents the second relationship R2(Ocon, $\Delta$NOx) in the case that the condition 2-A and the condition 2-D are met (that is, the case that the difference in intake air amount is negative and the difference in fuel injection amount is positive). Gamsr(−)+Qact(−) indicates the curved line that represents the second relationship R2(Ocon, $\Delta$NOx) in the case that the condition 2-A and the condition 2-C are met (that is, the case that the difference in intake air amount is negative and the difference in fuel injection amount is negative). Gamsr(+)+Qact(+) indicates the curved line that represents the second relationship R2(Ocon, ΔNOx) in the case that the condition 2-B and the condition 2-D are met (that is, the case that the difference in intake air amount is positive and the difference in fuel injection amount is positive). Gamsr(+)+Qact(−) indicates the curved line that represents the second relationship R2(Ocon, ΔNOx) in the case that the condition 2-B and the condition 2-C are met (that is, the case that the difference in intake air amount is positive and the difference in fuel injection amount is negative).

in addition, the condition 2-A (where the difference in intake air amount is negative) and the condition 2-B (where the difference in intake air amount is positive) cannot be met at the same time. Furthermore, the condition 2-C (where the difference in fuel injection amount is negative) and the condition 2-D (where the difference in fuel injection amount is positive) cannot be met at the same time. Therefore, all possible combinations are the four combinations shown in FIG. 12(B).

First, in the case that "the condition 2-A and the condition 2-D" are met, the amount of the NOx concentration difference ΔNOx decreases with the increasing amount of the intake oxygen concentration Ocon within at least the range of the intake oxygen concentration Ocon from the predetermined value A to the predetermined value C (C≤Ocon≤D), as shown by the curved line Gamsr(−)+Qact(+). That is, the amount of change of the NOx concentration difference ΔNOx is "negative" when the intake oxygen concentration Ocon increases. Furthermore, in this case, the NOx concentration difference ΔNOx is "positive" when the intake oxygen concentration Ocon is the predetermined value C.

Furthermore, in the case that "the condition 2-A and the condition 2-C" are met, the amount of the NOx concentration difference ΔNOx decreases with the increasing amount of the intake oxygen concentration Ocon within at least the above range (C≤Ocon≤D), as shown by the curved line Gamsr(−)+Qact(−). That is, the amount of change of the NOx concentration difference ΔNOx is "negative" when the intake oxygen concentration Ocon increases. Furthermore, in this case, the NOx concentration difference ΔNOx is "positive" when the intake oxygen concentration Ocon is the predetermined value C.

Additionally, in the case that "the condition 2-B and the condition 2-D" are met, the amount of the NOx concentration difference ΔNOx increases with the increasing amount of the intake oxygen concentration Ocon within at least the above range (C≤Ocon≤D), as shown by the curved line Gamsr(+)+Qact(+). That is, the amount of change of the NOx concentration difference ΔNOx is "positive" when the intake oxygen concentration Ocon increases. Furthermore, in this case, the NOx concentration difference ΔNOx is "negative" when the intake oxygen concentration Ocon is the predetermined value C.

More additionally, in the case that "the condition 2-B and the condition 2-C" are met, the amount of the NOx concentration difference ΔNOx increases with the increasing amount of the intake oxygen concentration Ocon within at least the above range (C≤Ocon≤D), as shown by the curved line Gamsr(+)+Qact(−). That is, the amount of change of the NOx concentration difference ΔNOx is "positive" when the intake oxygen concentration Ocon increases. Furthermore, in this case, the NOx concentration difference ΔNOx is "negative" when the intake oxygen concentration Ocon is the predetermined value C.

As described above, the second relationship R2(Ocon, ΔNOx) in the case that the condition 2-A and the condition 2-D are met is the same as the second relationship R2(Ocon, ΔNOx) in the case that the condition 2-A and the condition 2-C are met, except for the amount of the NOx concentration difference ΔNOx within the above range. Furthermore, the second relationship R2(Ocon, ΔNOx) in the case that the condition 2-B) and the condition 2-D are met is the same as the second relationship R2(Ocon, ΔNOx) in the case that the condition 2-B and the condition 2-C are met, except for the amount of the NOx concentration difference ΔNOx within the above range. Additionally, the second relationship R2(Ocon, ΔNOx) in the case that the set of the condition 2-A and the condition 2-D or the set of the condition 2-A and the condition 2-C are met is different from the second relationship R2(Ocon, ΔNOx) in the case that the set of the condition 2-B and the condition 2-D or the set of the condition 2-B and the condition 2-C are met.

As above, the second relationship R2(Ocon, ΔNOx) in the case that "plural" of the conditions 2-A to 2-D are met (that is, "both" of the difference in intake air amount and the difference in fuel injection amount occur").

In addition, in the case that "any of the condition 2-A to 2-D is not met" (that is, in the case that the difference in intake air amount is "zero" and the difference in fuel injection amount is "zero"), the actual NOx concentration NOxcon coincides with the NOx concentration NOxcon. Therefore, the NOx concentration difference ΔNOx is zero in this case regardless of the target value Qtgt of the fuel injection amount. That is, the amount of change of the NOx concentration difference ΔNOx is "zero" when the intake oxygen concentration Ocon increases, and the NOx concentration difference ΔNOx is "zero" when the intake oxygen concentration Ocon is the predetermined value C.

By the way, the NOx concentration difference ΔNOx may be occur in the case that "some members that are not related to the intake air amount and the fuel injection amount" do not operate normally. For example, in the case that the NOx concentration sensor 75 do not work normally (in the case that the sensor outputs an output value indicating a different NOx concentration other than the actual NOx concentration), the NOx concentration difference ΔNOx will occur even if the difference in intake air amount is zero and the difference in fuel injection amount is zero. Hereinafter, the above situation is referred to as the situation where "a difference(s) other than the difference in fuel injection amount and the difference in intake air amount occur(s)".

In the above case, the amount of the NOx concentration difference ΔNOx does not change regardless of the intake oxygen concentration Ocon, as shown by the curved line Other(+) or the curved line Other(−). That is, the amount of change of the NOx concentration difference ΔNOx is "zero" within at least the above range (C≤Ocon≤D). Furthermore, in this case, the NOx concentration difference ΔNOx is "positive" or "negative" when the intake oxygen concentration Ocon is the predetermined value C.

As described above, the second relationship R2(Ocon, ΔNOx) results to be different depending on: the difference in intake air amount is "zero", "positive" or "negative" (see the condition 2-A and the condition 2-B); or the difference in fuel injection amount is "zero", "positive" or "negative" (see the condition 2-C and the condition 2-D). In other words, it can be determined based on the second relationship R2(Ocon, ΔNOx) that: whether the difference in intake air amount is "zero", "positive" or "negative"; or whether the difference in fuel injection amount is "zero", "positive" or "negative". Furthermore, it can be determined based on the second relationship R2(Ocon, ΔNOx) that whether or not "a difference (s) other than the difference in fuel injection amount and the difference in intake air amount occur(s)."

Specifically, regarding the second relationship R2(Ocon, ΔNOx), if the amount of change of the NOx concentration difference ΔNOx is "negative" when the intake oxygen concentration Ocon increases within "the predetermined range (C≤Ocon≤D)" and the NOx concentration difference ΔNOx is "positive" when the intake oxygen concentration Ocon is the predetermined value C, then the relationship corresponds to a relationship represented as the curved line Gamsr(−) in FIG. 12(A), the curved line Gamsr(−)+Qact(+) and the curved line Gamsr(−)+Qact(−) in FIG. 12(B). That is, in this case, it can be determined that "at least the difference in intake air amount is negative."

Furthermore, regarding the second relationship R2(Ocon, ΔNOx), if the amount of change of the NOx concentration difference ΔNOx is "positive" when the intake oxygen concentration Ocon increases within "the predetermined range (C≤Ocon≤D)" and the NOx concentration difference ΔNOx is "negative" when the intake oxygen concentration Ocon is the predetermined value C, then the relationship corresponds to a relationship represented as the curved line Gamsr(+) in FIG. 12(A), the curved line Gamsr(+)+Qact(+) and the curved line Gamsr(+)+Qact(−) in FIG. 12(B). That is, in this case, it can be determined that "at least the difference in intake air amount is positive."

Additionally, regarding the second relationship R2(Ocon, ΔNOx), if the amount of change of the NOx concentration difference ΔNOx is "positive" when the intake oxygen concentration Ocon increases within "the predetermined range (C≤Ocon≤D)" and the NOx concentration difference ΔNOx is "positive" when the intake oxygen concentration Ocon is the predetermined value C, then the relationship corresponds to a relationship represented as the curved line Qact(+) in FIG. 12(A). That is, in this case, it can be determined that "the difference in fuel injection amount is positive."

More additionally, regarding the second relationship R2(Ocon, ΔNOx), if the amount of change of the NOx concentration difference ΔNOx is "negative" when the intake oxygen concentration Ocon increases within "the predetermined range (C≤Ocon≤D)" and the NOx concentration difference ΔNOx is "negative" when the intake oxygen concentration Ocon is the predetermined value C, then the relationship corresponds to a relationship represented as the curved line Qact(−) in FIG. 12(A). That is, in this case, it can be determined that "the difference in fuel injection amount is negative."

In addition, regarding the second relationship R2(Ocon, ΔNOx), if the amount of change of the NOx concentration difference ΔNOx is "zero" when the intake oxygen concentration Ocon increases within "the predetermined range (C≤Ocon≤D)" and the NOx concentration difference ΔNOx is "zero" when the intake oxygen concentration Ocon is the predetermined value C, then it can be determined that "the difference in intake air amount is zero and the difference in fuel injection amount is zero."

Furthermore, regarding the second relationship R2(Ocon, ΔNOx), if the amount of change of the NOx concentration difference ΔNOx is "zero" when the intake oxygen concentration Ocon increases within "the predetermined range (C≤Ocon≤D)" and the NOx concentration difference ΔNOx is "positive" or "negative" when the intake oxygen concentration Ocon is the predetermined value C, then it can be determined that "a difference(s) other than the difference in fuel injection amount and the difference in intake air amount occur(s)".

As described above, the second device can determine the situation of the difference in intake air amount and the situation of the difference in fuel injection amount based on the second relationship R2(Ocon, ΔNOx). Hereinafter, the above method to determine the situation of the difference in intake air amount and the situation of the difference in fuel injection amount is referred to as "second method for situation determination".

(Explanation 2-2) Explanation for Corrections Depending on Results of the Situation Determinations.

The second device corrects the measured value Gamsr of the intake air amount so as to decrease the amount of the difference in intake air amount and the target value Qtgt of the fuel injection amount so as to decrease the amount of the difference in fuel injection amount, depending on the result of the about situation determination.

Specifically, if the second device determines that the difference in intake air amount is "positive", then the second device corrects the measured value Gamsr of the intake air amount so as to "decrease" the value by a predetermined correction amount. On the other hand, if the second device determines that the difference in intake air amount is "negative", then the second device corrects the measured value Gamsr of the intake air amount so as to "increase" the value by a predetermined correction amount. The "correction amounts" used in the above correction are determined depending on the amount of the NOx concentration difference ΔNOx.

Figure 14A:
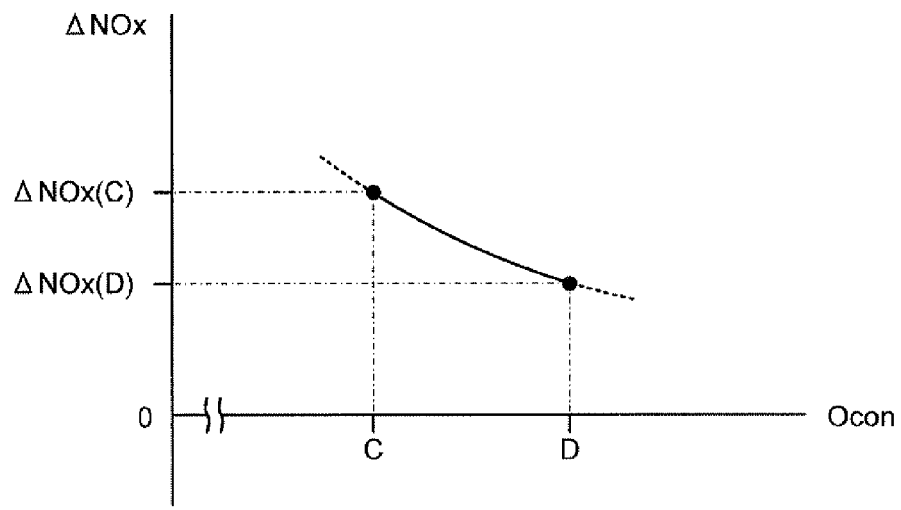
FIG. 14 is a graph illustrating the relationship between the oxygen concentration of intake air, the NOx concentration difference, situation of the difference in fuel injection amount, and situation of the difference in intake air amount, regarding the internal combustion engine that employs the control device according to the second embodiment of the invention.

For example, as shown in FIG. 14(A), if: both of the NOx concentration difference ΔNOx(C) when the intake oxygen concentration Ocon is the predetermined value C and the NOx concentration difference ΔNOx(D) when the target value Qtgt of the fuel injection amount is the predetermined value D are "positive"; and the NOx concentration difference ΔNOx(D) is smaller than the NOx concentration difference ΔNOx(C), then the second device determines that "at least the difference in intake air amount is negative" as described in the explanation 2-1.

In the above case, the second device determines the "correction amount" based on the average value of the NOx concentration difference ΔNOx(C) and the NOx concentration difference ΔNOx(D), etc. Then, the second device corrects the measured value Gamsr of the intake air amount so as to "increase" the value by the correction amount. Specifically, as an example, the second device changes(studies) the relationship(map) between the output value (output voltage) of the intake air flow sensor 71 and the measured value Gamsr of the intake air amount so that the measured value Gamsr is increased depending on a value obtained by multiplying the above average value by a predetermined coefficient. Thereby, the difference in intake air amount will be decreased.

Furthermore, if the second device determines that the difference in fuel injection amount is "positive", then the second device corrects the target value Qtgt of the fuel injection amount so as to "decrease" the value by a predetermined correction amount. On the other hand, if the second device determines that the difference in fuel injection amount is "negative", then the second device corrects the target value Qtgt of the fuel injection amount so as to "increase" the value by a predetermined correction amount. The "correction amounts" used in the above correction are determined depending on the amount of the NOx concentration difference ΔNOx.

Figure 14B:
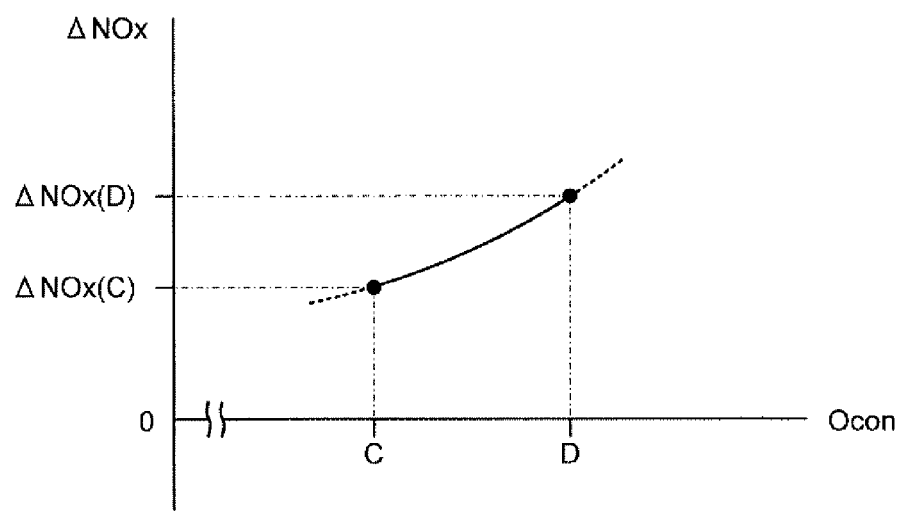

For example, as shown in FIG. 14(B), if: both of the NOx concentration difference ΔNOx(C) when the intake oxygen concentration Ocon is the predetermined value C and the NOx concentration difference ΔNOx(D) when the intake oxygen concentration Ocon is the predetermined value D are "positive"; and the NOx concentration difference ΔNOx(D) is larger than the NOx concentration difference ΔNOx(C), then the second device determines that "the difference in fuel injection amount is positive" as described in the explanation 2-1.

In the above case, the second device determines the "correction amount" based on the average value of the NOx concentration difference ΔNOx(C) and the NOx concentration difference ΔNOx(D), etc. Then, the second device corrects the target value Qtgt of the fuel injection amount so as to "decrease" the value by the correction amount. Specifically, as an example, the second device changes (studies) the relationship (map) between the time period of fuel injection of the fuel injecting device 22 and target value Qtgt of the fuel injection amount so that the target value Qtgt of the fuel injection amount is decreased depending on a value obtained by multiplying the above average value by a predetermined coefficient. Thereby, the difference in fuel injection amount will be decreased.

As described above, the amount of NOx concentration difference ΔNOx is decreased by correcting the target value Qtgt of the fuel injection amount and the measured value Gamsr of the intake air amount.

By the way, the second device determines that "at least" the difference in intake air amount is negative if the predetermined condition is met (i.e., if the condition 2-A is met, if the condition 2-A and the condition 2-C are met, or if the condition 2-A and the condition 2-D are met), as described in the explanation 2-1. In this case, the second device makes the above determination without distinguishing between "the difference in intake air amount is negative", "the difference in intake air amount is negative and the difference in fuel injection amount is positive", and "the difference in intake air amount is negative and the difference in fuel injection amount is negative." That is, the second device does not determine whether or not "only" the difference in intake air amount occurs and whether or not "both" the difference in intake air amount and the difference in fuel injection amount occur.

However, the second device corrects the measured value Gamsr of the intake air amount so as to decrease "the difference in intake air amount" even when any condition of the above conditions are met, as described in the explanation 2-2. Therefore, in the case that "only" the difference in intake air amount occurs, the difference in intake air amount is decreased by this correction. As a result thereof, the amount of NOx concentration difference ΔNOx is decreased. On the other hand, in the case that "both" of the difference in intake air amount and the difference in fuel injection amount occur, the difference in intake air amount among the both is decreased by this correction. For example, when the difference in intake air amount is sufficiently decreased by being repeatedly carried out the above correction, "only" the difference in fuel injection amount among the "both" will remain. Then, in the case that "only" the difference in fuel injection amount remains, the second device determines that the difference in fuel injection amount occurs and corrects the target value Qtgt of the fuel injection amount so as to decrease the difference in intake air amount. As a result thereof, the amount of NOx concentration difference ΔNOx is decreased.

As described above, even in either of the above cases (in the case that "only" the difference in intake air amount occurs, and in the case that "both" of the difference in intake air amount and the difference in fuel injection amount occur), the NOx concentration difference ΔNOx will be decreased by the treatment that the second device repeatedly carries out the above correction. In addition, as will be appreciated from the above descriptions, in the case that the second device determines that "at least the difference in intake air amount is 'positive'", the NOx concentration difference ΔNOx will be decreased by the treatment that the second device repeatedly carries out the above correction in the same manner.

In addition, the second device does not correct the target value Qtgt of the fuel injection amount and the measured value Gamsr of the intake air amount, in the case that it determines that "the difference in fuel injection amount is zero and the difference in intake air amount is zero." Furthermore, the second device also does not correct the target value Qtgt of the fuel injection amount and the measured value Gamsr of the intake air amount, in the case that it determines that "a difference(s) other than the difference in fuel injection amount and the difference in intake air amount occur(s)."

As described in the explanation 2-1 to 2-2, the second device determines the condition of the difference in fuel injection amount and the difference in intake air amount, and the second device controls the engine 10 to decrease the amount of NOx concentration difference ΔNOx depending on the result of the determination.

By the way, the intake oxygen concentration Ocon employed in the second method for situation determination is "a calculated value of the intake oxygen concentration that is calculated by the formula (1) (i.e., an apparent intake oxygen concentration)". Therefore, when at least one of the difference in intake air amount and the difference in fuel injection amount causes, this apparent intake oxygen concentration does not coincide with the actual value Oconact of the intake oxygen concentration (see the explanation 1-2 described above). Therefore, in this case, some kind of difference occur in "the second relationship R2(Ocon, ΔNOx) itself". Then, it could be thought that the situation determination might be carried out more appropriately if the apparent intake oxygen concentration Ocon is replaced with "the actual value Oconact of the intake oxygen concentration" regarding the second relationship R2(Ocon, ΔNOx).

Figure 15:
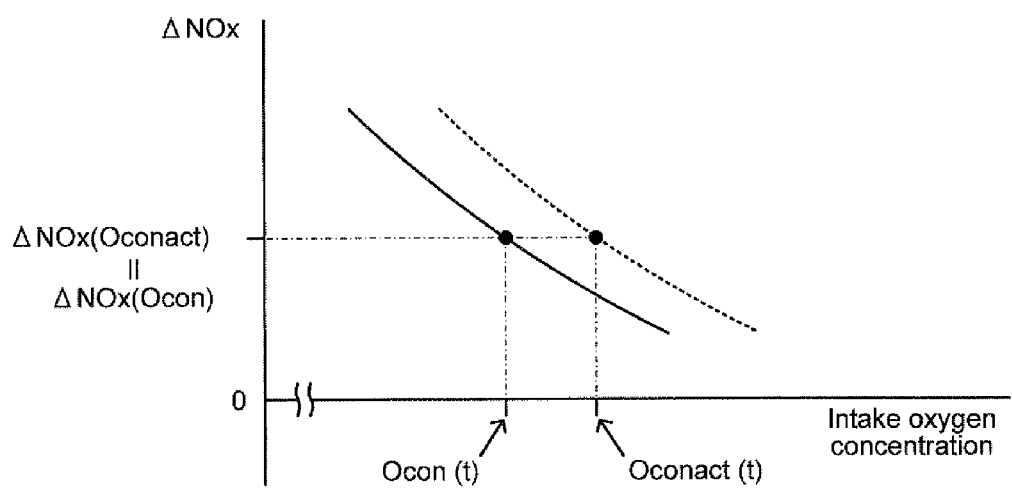
FIG. 15 is a graph illustrating the relationship between the oxygen concentration of intake air, the NOx concentration difference, situation of the difference in fuel injection amount, and situation of the difference in intake air amount, regarding the internal combustion engine that employs the control device according to the second embodiment of the invention.

However, as described above, "the NOx concentration difference ΔNOx" is determined based on the measured value NOxmsr of the NOx concentration and the NOx referential concentration NOxref defined depending on the operating conditions of the engine 10, regarding the second relationship R2(Ocon, ΔNOx). Therefore, as explained in FIG. 15, both of the NOx concentration difference ΔNOx(Ocon) and the NOx concentration difference ΔNOx(Oconact) coincides with each other. Here, the NOx concentration difference ΔNOx (Ocon) is the difference where the apparent intake oxygen concentration Ocon(t) at the time point t is used as an index of the determination, and the NOx concentration difference ΔNOx(Oconact) is the difference where the actual value Oconact(t) of the intake oxygen concentration at the time point t is used as an index of the determination. Therefore, the relationship between the apparent intake oxygen concentration Ocon and the NOx concentration difference ΔNOx (the solid line in the figure) and the relationship between the actual value Oconact of the intake oxygen concentration and the NOx concentration difference ΔNOx (the dashed line in the figure) are only different in location with respect to the horizontal axis in the figure. Accordingly, as will be appreciated from the above explanations 2-1 to 2-2, if the predetermined range (C≤Ocon≤D) is appropriately selected, then the same results are obtained by the both situation determination: the situation determination in the case that the apparent intake oxygen concentration Ocon is used as an index of the determination; and the situation determination in that case that the actual value Oconact of the intake oxygen concentration is used as an index of the determination.

As described above, if the predetermined range (C≤Ocon≤D) is appropriately selected, then the situation determination can be properly carried out even the apparent intake oxygen concentration Ocon is used as an index of the determination or the actual value Oconact of the intake oxygen concentration is used as an index of the determination. Therefore, the apparent intake oxygen concentration Ocon is used as an index of the determination in the second device.

On the other hand, the index numbers A, B and C are determined according to the situation (s) such as configurations of the internal combustion engine that the model for estimating NOx concentration is applied to. Therefore, when the model for estimating NOx concentration is applied to other engine having a different configuration from that of the engine 10, the index numbers A, B and C regarding the other engine may be different from those of the engine 10. In this case, the second relationship R2(Ocon, ΔNOx) regarding the engine 10 is different from the second relationship R2(Ocon, ΔNOx) regarding the other engine. However, as will be appreciated from the above descriptions, the situation of the difference in fuel injection amount and the difference in intake air amount can be determined based on similar considerations above.

<Actual Operation>

Hereinafter, an actual operation of the second device will be described.

Figure 16:
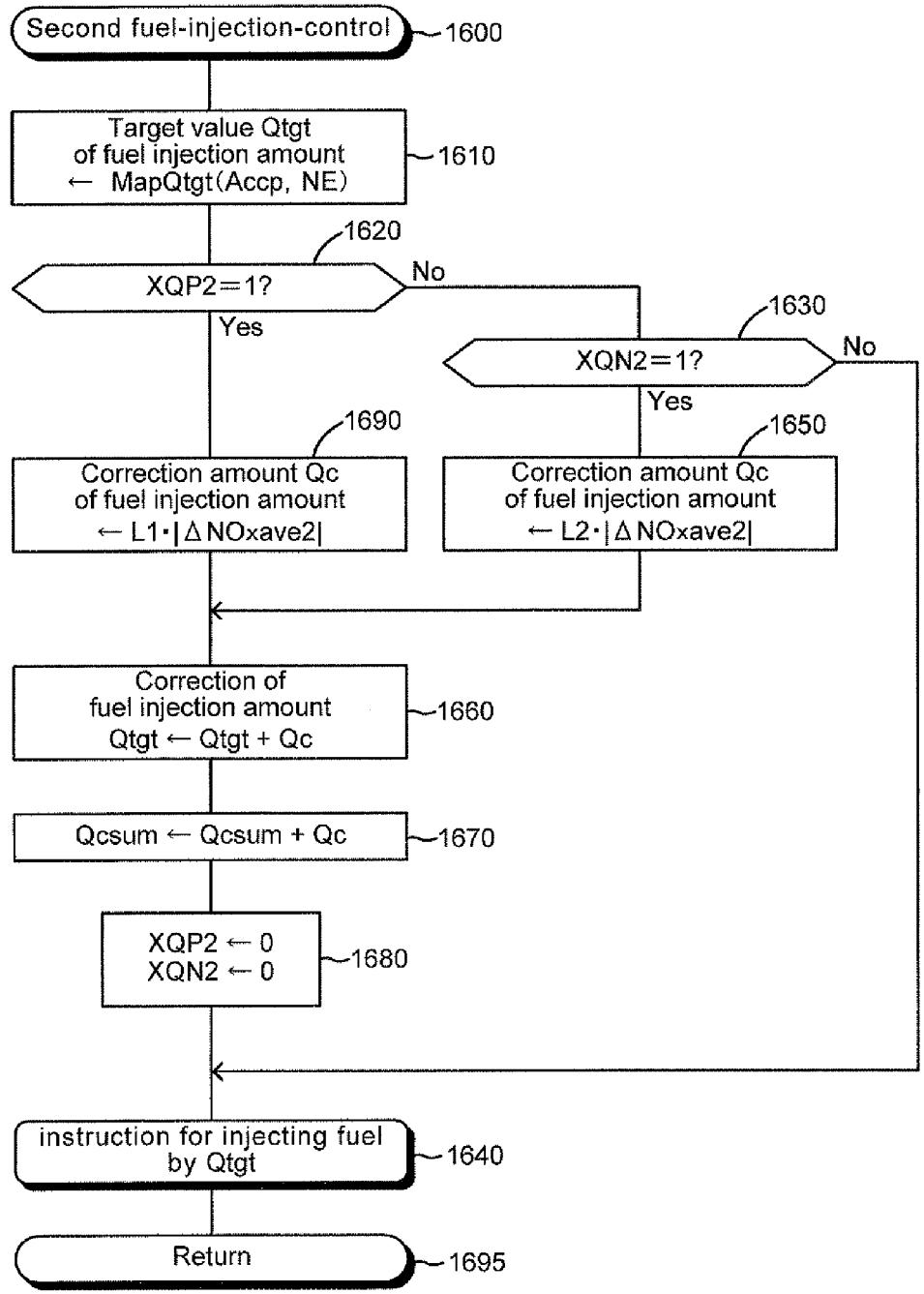
FIG. 16 is a flowchart illustrating a routine executed by CPU of the control device according to the second embodiment of the present invention.
Figure 17:
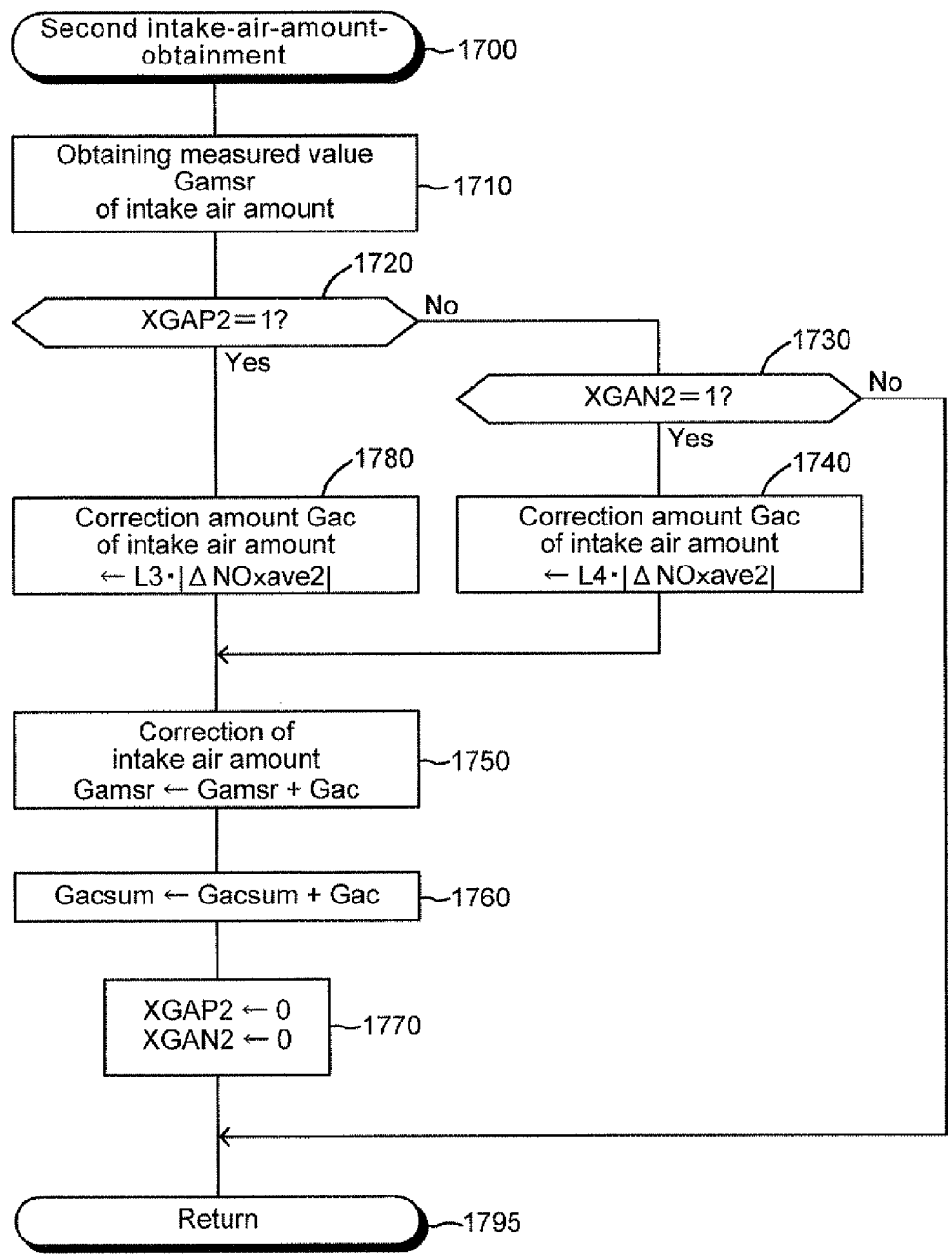
FIG. 17 is a flowchart illustrating a routine executed by CPU of the control device according to the second embodiment of the present invention.
Figure 18:
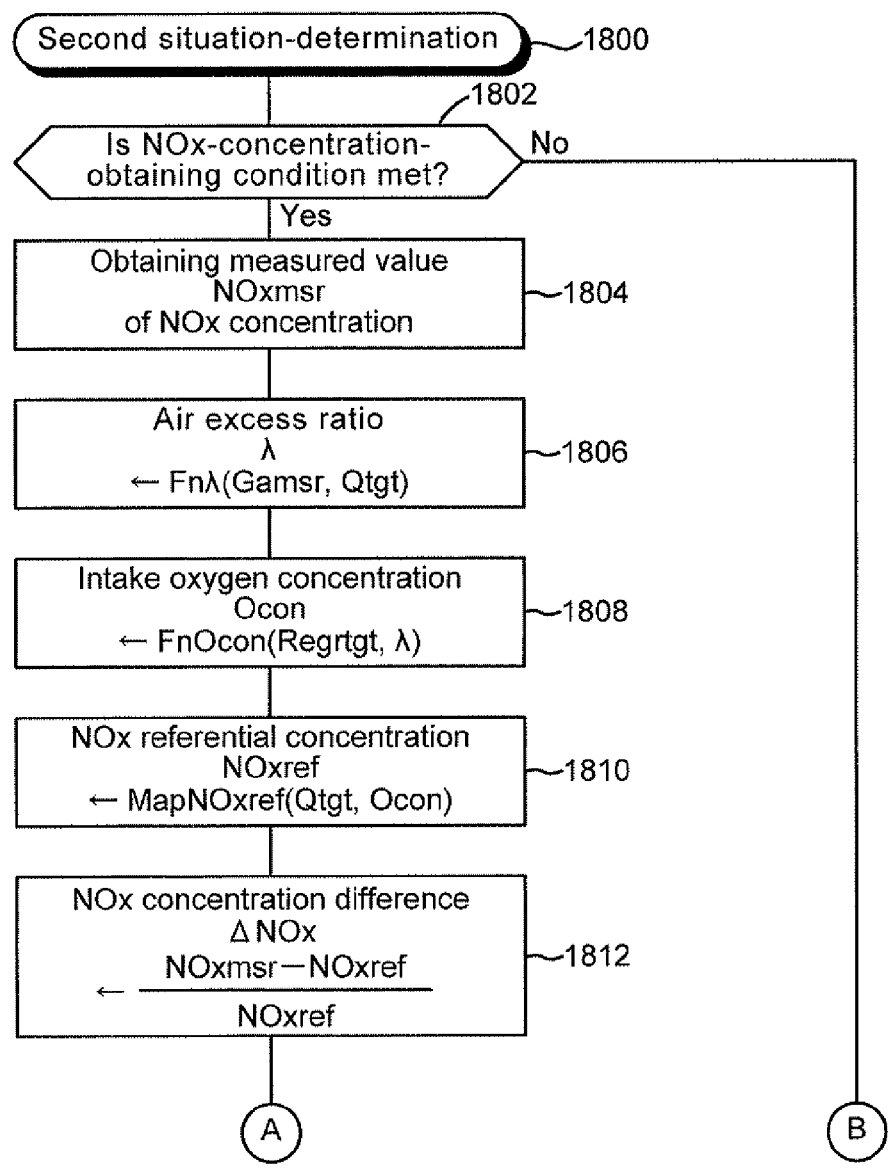
FIG. 18 is a flowchart illustrating a routine executed by CPU of the control device according to the second embodiment of the present invention.
Figure 19:
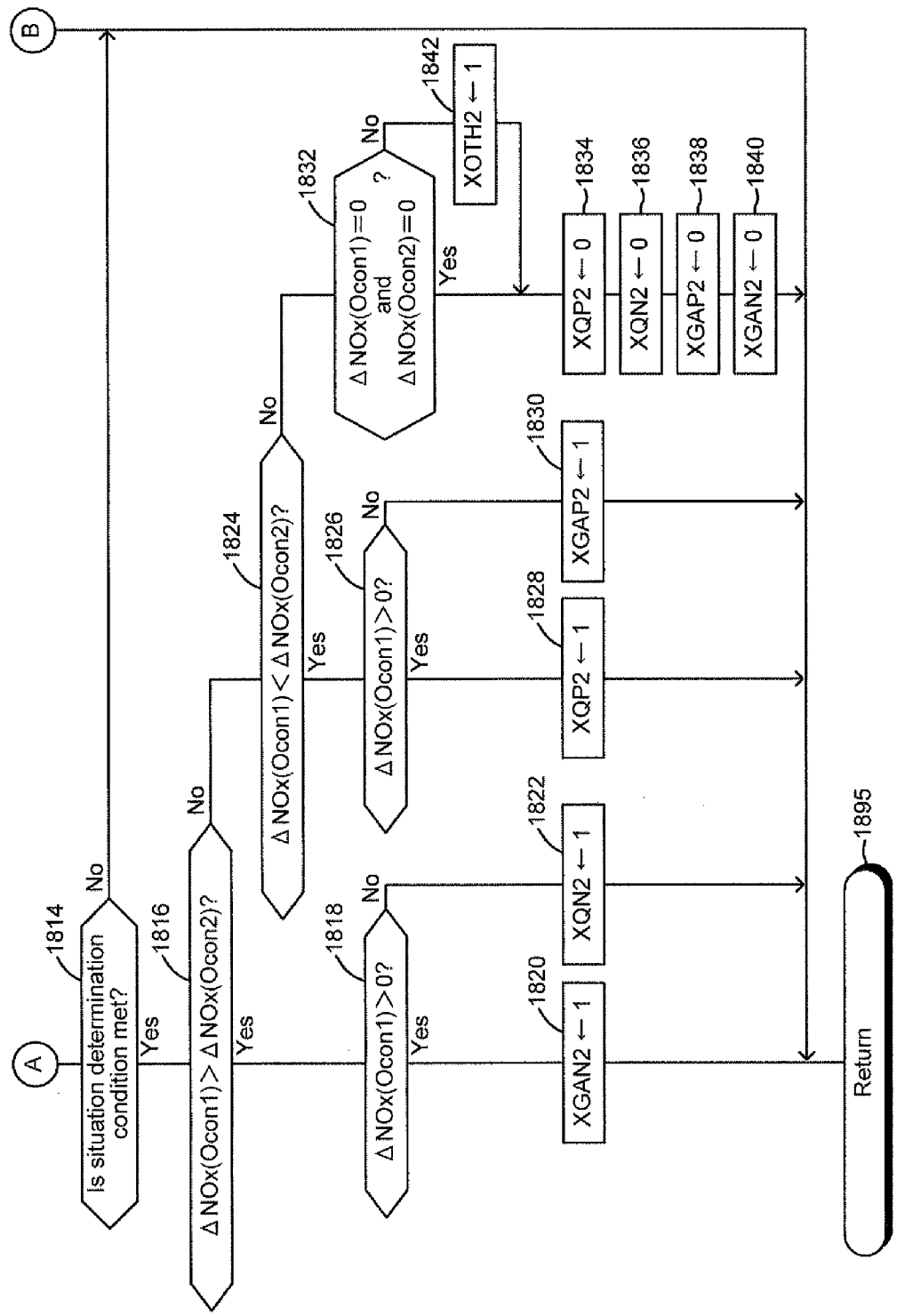
FIG. 19 is a flowchart illustrating a routine executed by CPU of the control device according to the second embodiment of the present invention.
Figure 20:
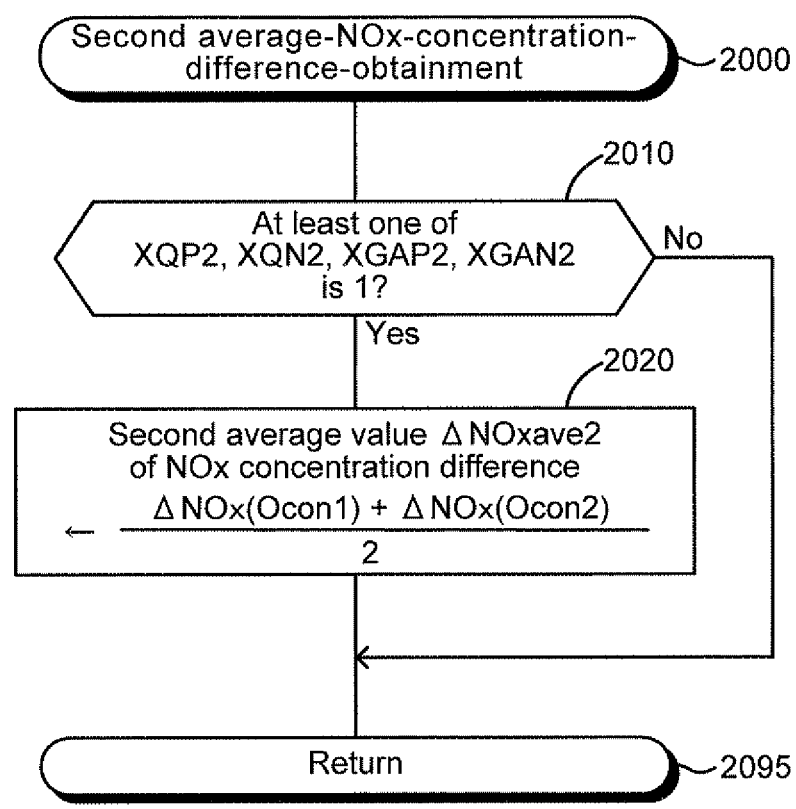
FIG. 20 is a flowchart illustrating a routine executed by CPU of the control device according to the second embodiment of the present invention.

The second device and the first device are different in the way that "the treatments indicated by the flowcharts in FIG. 16 and FIG. 17" are carried out instead of the treatments indicated by the flowcharts in FIG. 5 and FIG. 6; and "the treatments indicated by the flowcharts in FIG. 18 to FIG. 20" are carried out instead of the treatments indicated by the flowcharts in FIG. 8 to FIG. 10. Therefore, the following descriptions will be mainly concerning these differences.

Regarding the second device, the CPU 81 is configured to perform the respective routines indicated by the flowcharts in FIG. 7, FIG. 11, and FIG. 16 to FIG. 20 at every predetermined timing. In these routines, the CPU 81 uses following flags: a second fuel-excess-injection flag XQP2; a second fuel-deficient-injection flag XQN2; a second intake-air-excess-measurement flag XGAP2; a second intake-air-deficient-measurement flag XGAN2; and a second other-abnormality-occurrence flag XOTH2.

When the second fuel-excess-injection flag XQP2 is "0", it indicates that the actual value Qact of the fuel injection amount is not larger than the target value Qtgt thereof (that is, Qact≤Qtgt). On the other hand, when the second fuel-excess-injection flag XQP2 is "1", it indicates that the actual value Qact of the fuel injection amount is larger than the target value Qtgt thereof (that is, Qact>Qtgt).

When the second fuel-deficient-injection flag XQN2 is "0", it indicates that the actual value Qact of the fuel injection amount is not smaller than the target value Qtgt thereof (that is, Qact≥Qtgt). On the other hand, when the second fuel-deficient-injection flag XQN2 is "1", it indicates that the actual value Qact of the fuel injection amount is smaller than the target value Qtgt thereof (that is, Qact<Qtgt).

When the second intake-air-excess-measurement flag XGAP2 is "0", it indicates that the measured value Gamsr of the intake air amount is not larger than the actual value Gaact thereof (that is, Gamsr≤Gaact). On the other hand, when the second intake-air-excess-measurement flag XGAP2 is "1", it indicates that the measured value Gamsr of the intake air amount is larger than the actual value Gaact thereof (that is, Gamsr>Gaact).

When the second intake-air-deficient-measurement flag XGAN2 is "0", it indicates that the measured value Gamsr of the intake air amount is not smaller than the actual value Gaact thereof (that is, Gamsr≥Gaact). On the other hand, when the second intake-air-deficient-measurement flag XGAN2 is "1", it indicates that the measured value Gamsr of the intake air amount is smaller than the actual value Gaact thereof (that is, Gamsr<Gaact).

When the second other-abnormality-occurrence flag XOTH2 is "0", it indicates that a difference(s) other than the difference in fuel injection amount and the difference in intake air amount does(do) not occur. On the other hand, when the second other-abnormality-occurrence flag XOTH2 is "1", it indicates that a difference(s) other than the difference in fuel injection amount and the difference in intake air amount occurs.

The back-up RAM 84 stores the following values of the flags: the value of the second fuel-excess-injection flag XQP2; the value of the second fuel-deficient-injection flag XQN2; the value of the second intake-air-excess-measurement flag XGAP2; the value of the second intake-air-deficient-measurement flag XGAN2; and the value of the second other-abnormality-occurrence flag XOTH2. Furthermore, when a predetermined operation is performed on the electric control device 80 after it is verified that no abnormality occurs in the fuel injecting device 22 and the intake air flow sensor 71 through a factory default setting of a vehicle equipped with the engine 10 and a service maintenance, etc., setting "zero" is done to a part of the values of the flags: the value of the second fuel-excess-injection flag XQP2; the value of the second fuel-deficient-injection flag XQN2; the value of the second intake-air-excess-measurement flag XGAP2; and the value of the second intake-air-deficient-measurement flag XGAN2. Additionally, when a predetermined operation is performed on the electric control device 80 after a treatment to resolve the cause for the occurrence of the difference(s) other than the difference in fuel injection amount and the difference in intake air amount through a factory default setting of a vehicle equipped with the engine 10 and a service maintenance, etc., setting "zero" is done to the other value of the flags: the value of the second other-abnormality-occurrence flag XOTH2.

Hereinafter, the respective routines performed by the CPU 81 will be described in detail.

First, it is presupposed that setting "zero" is done at this moment to all of the values of the flags: the value of the second fuel-excess-injection flag XQP2; the value of the second fuel-deficient-injection flag XQN2; the value of the second intake-air-excess-measurement flag XGAP2; the value of the second intake-air-deficient-measurement flag XGAN2; and the value of the second other-abnormality-occurrence flag XOTH2. Hereinafter, this setting is referred to as "second precondition for default setting".

The CPU 81 is configured to repeatedly perform the "first fuel-injection-control routine", which is indicated by the flowchart in FIG. 16, every time the crank angle of arbitrary cylinder becomes equal to a predetermined crank angle before the compression top dead center (for example, the crank angle of 90 degrees before the compression top dead center) θf. By this routine, the CPU 81 determines the target value Qtgt of the fuel injection amount and sends an instruction for injecting fuel into the respective cylinder in the amount of the target value Qtgt. Furthermore, by this routine, the CPU 81 corrects the target value Qtgt of the fuel injection amount in the case that the actual value Qact thereof does not coincide with the target value Qtgt thereof, and the CPU 81 send an instruction for injecting fuel into the respective cylinder in the amount of the corrected target value Qtgt.

Specifically, the CPU 81 determines the target value Qtgt of the fuel injection amount depending on the operating conditions of the engine 10 by this routine. Furthermore, in the case that the CPU 81 determines that the actual value Qact of the fuel injection amount is larger than the target value Qtgt, the CPU 81 decreases the target value Qtgt of the fuel injection amount by a correction amount Qc of the fuel injection amount. On the other hand, in the case that the CPU 81 determines that the actual value Qact of the fuel injection amount is smaller than the target value Qtgt, the CPU 81 increases the target value Qtgt of the fuel injection amount by a correction amount Qc of the fuel injection amount.

The CPU 81 calculates an accumulated value Qcsum of the correction amount Qc by the routine in FIG. 16. It is configured that the value of the accumulated value Qcsum is set at "zero" when a predetermined operation is performed on the electric control device 80 after it is verified that no abnormality occurs in the fuel injecting device 22 through a factory default setting of a vehicle equipped with the engine 10 and a service maintenance, etc.

More specifically, the CPU 81 starts a process at step 1600 of FIG. 16 and then proceeds toward step 1610 at a predetermined timing to determine the target value Qtgt of the fuel injection amount by applying an accelerator opening degree Accp and an engine rotation speed NE at this moment to a table MapQtgt(Accp, NE) for defining the target value of the fuel injection amount. The table defines "the relationship between the accelerator opening degree Accp, the engine rotation speed NE, and the target value Qtgt of the fuel injection amount" in advance. Regarding this table MapQtgt (Accp, NE) for defining the target value of the fuel injection amount, the target value Qtgt of the fuel injection amount is designed to be an appropriate value that is set depending on a required torque determined based on the accelerator opening degree Accp and the engine rotation speed NE.

Next, the CPU 81 proceeds to step 1620 to determine whether or not the value of the second fuel-excess-injection flag XQP2 is "1" at this moment. According to the second precondition for default setting, the value of the second fuel-excess-injection flag XQP2 is "0", then the CPU 81 makes the "No" determination at step 1620 and proceeds to step 1630.

At step 1630, the CPU 81 determines whether or not the value of the second fuel-deficient-injection flag XQN2 is "1" at this moment. According to the second precondition for default setting, the value of the second fuel-deficient-injection flag XQN2 is "0", then the CPU 81 makes the "No" determination at step 1630 and proceeds to step 1640.

At step 1640, the CPU 81 sends an instruction for injecting fuel from the fuel injecting device 22 into the fuel injection cylinder in the amount of the target value Qtgt. The instruction is sent to the fuel injecting device 22. That is, the fuel in the amount of the target value Qtgt is injected into the fuel injection cylinder. After that, the CPU 81 proceeds to step 1695 so as to end this routine once.

Furthermore, the CPU 81 is configured to repeatedly perform the "second intake-air-amount-obtaining routine", which is indicated by the flowchart in FIG. 17, every time a predetermined time period elapses. By this routine, the CPU 81 determines the measured value Gamsr of the intake air amount. Furthermore, by this routine, the CPU 81 corrects the measured value Gamsr of the intake air amount in the case that the actual value Gaact thereof does not coincide with the measured value Gamsr thereof.

Specifically, the CPU 81 obtains the measured value Gamsr of the intake air amount based on an output value of the intake air flow sensor 71 by this routine. Furthermore, in the case that the CPU 81 determines that the actual value Gaact of the intake air amount is larger than the measured value Gamsr, the CPU 81 decreases the measured value Gamsr by a correction amount Gac of the intake air amount. On the other hand, in the case that the CPU 81 determines that the actual value Gaact of the intake air amount is smaller than the measured value Gamsr, the CPU 81 increases the measured value Gamsr by a correction amount Gac of the intake air amount.

The CPU 81 calculates an accumulated value Gacsum of the correction amount Gac by the routine indicated in FIG. 17. It is configured that the value of the accumulated value Gacsum is set at "zero" when a predetermined operation is performed on the electric control device 80 after it is verified that no abnormality occurs in the intake air flow sensor 71 through a factory default setting of a vehicle equipped with the engine 10 and a service maintenance, etc.

More specifically, the CPU 81 starts a process at step 1700 of FIG. 17 and then proceeds toward step 1710 at a predetermined timing to obtain the measured value Gamsr of the intake air amount based on the output value of the intake air flow sensor 71.

Next, the CPU 81 proceeds to step 1720 to determine whether or not the value of the second intake-air-excess-measurement flag XGAP2 is "1" at this moment. According to the second precondition for default setting, the value of the second intake-air-excess-measurement flag XGAP2 is "0", then the CPU 81 makes the "No" determination at step 1720 and proceeds to step 1730.

At step 1730, the CPU 81 determines whether or not the value of the second intake-air-deficient-measurement flag XGAN2 is "1" at this moment. According to the second precondition for default setting, the value of the second intake-air-deficient-measurement flag XGAN2 is "0", then the CPU 81 makes the "No" determination at step 1730 and proceeds to step 1795 so as to end this routine once.

Furthermore, the CPU 81 starts a process at step 700 of FIG. 7 and then proceeds toward step 795 through step 710 and step 720 so as to end this routine once. Thereby, the CPU 81 determines the target value Regrtgt of the EGR ratio, and the CPU 81 controls the throttle valve 33 and the EGR control valve 53 so that the actual value Regract of the EGR ratio coincides with the target value Regrtgt.

Furthermore, the CPU 81 is configured to repeatedly perform the "second situation-determination routine", which is indicated by the flowcharts in FIG. 18 and FIG. 19, every time a predetermined time period elapses. By this routine, the CPU 81 continues to obtain the target value Qtgt of the fuel injection amount and the NOx concentration difference together with matching them each other during a predetermined condition is met. Furthermore, by this routine, the CPU 81 determines the situation of the difference in fuel injection amount and the situation of the difference in intake air amount during a predetermined condition is met, based on the relationship between the target value Qtgt of the fuel injection amount and the NOx concentration difference $\Delta NOx$ (that is, the above second relationship R2(Ocon, $\Delta NOx$)).

Specifically, the CPU 81 starts a process at step 1800 of FIG. 18 and then proceeds toward step 1802 at a predetermined timing to determine whether or not "a condition for obtaining the NOx concentration (NOx-concentration-obtaining condition)" is met at this moment. The NOx-concentration-obtaining condition at step 1802 is the same as that of the first device (see step 802 in FIG. 8). Therefore, detailed description is omitted regarding the NOx-concentration-obtaining condition.

When the NOx-concentration-obtaining condition is "not met", the CPU 81 makes the "No" determination at step 1802 and proceeds directly toward step 1895 in FIG. 19 through the connecting index B so as to end this routine once. As described above, the measured value NOxmsr of the NOx concentration is not obtained when the NOx-concentration-obtaining condition is "not" met.

To the contrary, when the NOx-concentration-obtaining condition is "met", the CPU 81 makes the "Yes" determination at step 1802 and proceeds to step 1804. At step 1804, the CPU 81 obtains the measured value NOxmsr of the NOx concentration based on the output value of the NOx concentration sensor 75 and proceeds to step 1806.

At step 1806, the CPU 81 calculates the air excess ratio $\lambda$ by applying the measured value Gamsr of the intake air amount and the target value Qtgt of the fuel injection amount at this moment to a function Fn$\lambda$(Gamsr, Qtgt) for calculating air excess ratio (see the formula (2) and the formula (3) described above).

Next, the CPU 81 proceeds to step 1808 to calculate the intake oxygen concentration Ocon by applying the target value Regrtgt of the EGR ratio and the air excess ratio $\lambda$ at this moment to a function FnOcon(Regrtgt, $\lambda$) for calculating intake oxygen concentration (see the formula (1) described above).

Next, the CPU 81 proceeds to step 1810 to calculate a value by applying the target value Qtgt of the fuel injection amount and the intake oxygen concentration Ocon at this moment to a table MapNOxref(Qtgt, Ocon) that defines "the relationship between the target value Qtgt of the fuel injection amount, the intake oxygen concentration Ocon, and the NOx concentration regarding an engine that has been confirmed to perform so that the target value Qtgt of the fuel injection amount coincides with the actual value Qact and the measured value Gamsr of the intake air amount coincides with the actual value Gaact" as the NOx referential concentration NOxref" in advance. The CPU 81 obtains the value as the NOx referential concentration NOxref.

Next, the CPU 81 proceeds to step 1812 to obtain the NOx concentration difference $\Delta$NOx by applying the measured value NOxmsr of the NOx concentration and the NOx referential concentration NOxref to the following formula (6) which is the same as the first device. That is, at step 1812, "the ratio of the value calculated by subtracting the NOx referential concentration NOxref from the measured value NOxmsr of the NOx concentration against the NOx referential concentration NOxref" is obtained as the NOx concentration difference $\Delta$NOx.

Furthermore, the CPU 81 stores the NOx concentration difference $\Delta$NOx and the intake oxygen concentration Ocon together with matching them each other (that is, the data of combination of the NOx concentration difference $\Delta$NOx and the intake oxygen concentration Ocon) to the ROM 82.

Next, the CPU 81 proceeds to step 1814 in FIG. 9 through the connecting index A to determine whether or not "a condition for determining the situation of the difference in fuel injection amount and the situation of the difference in intake air amount (situation determination condition)" is met at this moment. More specifically, at step 1814, the CPU 81 determines that the situation determination condition is met when the condition S-2 is satisfied. In other words, the CPU 81 determines that the situation determination condition is not met when the condition S-2 is not satisfied.

(Condition S-2)
A combination of the NOx concentration difference $\Delta$NOx and the intake oxygen concentration Ocon where the target value Qtgt is within a predetermined range is obtained as a data. At least two of the data has been obtained.

The "predetermined range" corresponds to "the predetermined range (C$\leq$Ocon$\leq$D)" in the second method for situation determination. If at least two of the data where the intake oxygen concentration Ocon is within this predetermined range has been obtained, then the situation of the difference in fuel injection amount and the situation of the difference in intake air amount can be determined in accordance with the second method for situation determination.

When the situation determination condition is "met", the CPU 81 makes the "Yes" determination at step 1814 and proceeds to step 1816. Then, the CPU 81 determines the situation of the difference in fuel injection amount and the situation of the difference in intake air amount by the treatments indicated in step 1816 to step 1842. To the contrary, when the situation determination condition is "not met", the CPU 81 makes the "No" determination at step 1814 and proceeds to step 1895 so as to end this routine once. As described above, the situation of the difference in fuel injection amount and the situation of the difference in intake air amount are not determined when the situation determination condition is not met.

Hereinafter, it is presupposed that the situation determination condition is "met". The treatments in indicated in step 1816 to step 1842 are explained in detail.

Regarding the following explanation, the data where the target value of the fuel injection amount is "first intake oxygen concentration Ocon1" and the data where the target value thereof is "second intake oxygen concentration Ocon2 that is larger than the first intake oxygen concentration Ocon1" are employed as the data of the condition S-2. Hereinafter, the NOx concentration difference $\Delta$NOx when the intake oxygen concentration Ocon of the fuel injection amount is the first intake oxygen concentration Ocon1 is referred to as "first NOx concentration difference $\Delta$NOx(Ocon1)", and the NOx concentration difference $\Delta$NOx when the intake oxygen concentration Ocon of the fuel injection amount is the second intake oxygen concentration Ocon2 is referred to as "second NOx concentration difference $\Delta$NOx(Ocon2)". In addition, the first intake oxygen concentration Ocon1 and the second intake oxygen concentration Ocon2 are determined to be appropriate values in view of the determination on the situation of the difference in fuel injection amount and the situation of the difference in intake air amount, based on the model for estimating NOx concentration.

(Case 2-1) in the Case that at Least the Difference in Intake Air Amount is "Negative".

In this case, as described above, the amount of change of the NOx concentration difference $\Delta$NOx is "negative" when the intake oxygen concentration Ocon increases, and the amount of the NOx concentration difference $\Delta$NOx is "positive" when the intake oxygen concentration Ocon is the predetermined value. That is, the value of the first NOx concentration difference $\Delta$NOx(Ocon1) is "larger" than the value of the second NOx concentration difference $\Delta$NOx(Ocon2). Furthermore, when the first target value Qtgt1 is employed as the predetermined value, the value of the first NOx concentration difference $\Delta$NOx(Ocon1) is "positive".

At step 1816, the CPU 81 determines whether or not the value of the first NOx concentration difference $\Delta$NOx(Ocon1) is larger than the value of the second NOx concentration difference $\Delta$NOx(Ocon2). As described above, the value of the first NOx concentration difference $\Delta$NOx(Ocon1) is larger than the value of the second NOx concentration difference $\Delta$NOx(Ocon2) in this case, and then the CPU 81 makes the "Yes" determination at step 1816 to proceed to step 1818.

At step 1818, the CPU 81 determines whether or not the value of the first NOx concentration difference $\Delta$NOx(O- con1) is larger than zero. As described above, the value of the first NOx concentration difference ΔNOx(Ocon1) is "positive" in this case, the CPU 81 makes the "Yes" determination at step 1818 to proceed to step 1820.

At step 1820, the CPU 81 stores "1" as the value of the second fuel-excess-injection flag XQP2. After that, the CPU 81 proceeds to step 1895 so as to end this routine once.

Next, the CPU 81 is configured to repeatedly perform the "first average-NOx-concentration-difference-obtaining routine", which is indicated by the flowchart in FIG. 20, every time a predetermined time period elapses. By this routine, the CPU 81 obtains the average value of the value of the first NOx concentration difference ΔNOx(Ocon1) and the value of the second NOx concentration difference ΔNOx(Ocon2). Hereinafter, this average value is referred to as "second average value ΔNOxave2 of the NOx concentration difference".

Specifically, the CPU 81 starts a process at step 2000 of FIG. 20 and then proceeds toward step 2010 at a predetermined timing to determine whether or not "1" is set on at least one of the values of the following flags: the second fuel-excess-injection flag XQP2, the second fuel-deficient-injection flag XQN2, the second intake-air-excess-measurement flag XGAP2, and the second intake-air-deficient-measurement flag XGAN2. The value of the second fuel-excess-injection flag XQP2 is "1" at this moment, the CPU 81 makes the "Yes" determination at step 2010 to proceed to step 2020.

At step 2020, the CPU 81 obtains the second average value ΔNOxave2 of the NOx concentration difference by applying the value of the first NOx concentration difference ΔNOx(Ocon1) and the value of the second NOx concentration difference ΔNOx(Ocon2) to the following formula (12).

$$\Delta NOxave1 = \{\Delta NOx(Ocon1) + \Delta NOx(Ocon2)\}/2 \qquad (12)$$

After that, the CPU 81 proceeds to step 2095 so as to end this routine once.

In addition, when "0" is set on all of the values of the following flags: the second fuel-excess-injection flag XQP2, the second fuel-deficient-injection flag XQN2, the second intake-air-excess-measurement flag XGAP2, and the second intake-air-deficient-measurement flag XGAN2, the CPU 81 makes the "No" determination at step 2010 to proceed to step 2095 so as to end this routine once. That is, the second average value ΔNOxave2 of the NOx concentration difference is not obtained.

Turning back to the explanation 2-1, the CPU 81 starts a process at step 1700 of FIG. 17 and then proceeds toward step 1720 through step 1710. The value of the second intake-air-excess-measurement flag XGAP2 is "1" at this moment according to the second precondition for default setting, then the CPU 81 makes the "Yes" determination at step 1720 to proceed to step 1730.

The value of the second intake-air-deficient-measurement flag XGAN2 is "1" at this moment, then the CPU 81 makes the "Yes" determination at step 1730 to proceed to step 1740.

At step 1740, the CPU 81 obtains the correction amount Gac of the intake air amount to correct the intake air amount by applying the second average value ΔNOxave2 of the NOx concentration difference to the following formula (13). Regarding the formula (13), L4 represents the predetermined positive coefficient. Therefore, the correction amount Gac of the intake air amount will be positive number.

$$Gac = L4 \cdot |\Delta NOxave2| \qquad (13)$$

Next, the CPU 81 proceeds to step 1750 to add the correction amount Gac of the intake air amount to the measured value Gamsr of the intake air amount. In fact, the correction amount Gac of the intake air amount is positive number, then the measured value Gamsr of the intake air amount is increased by the correction amount Gac actually.

Next, the CPU 81 proceeds to step 1760 to add (actually, add since the Gac is positive number) the correction amount Gac of the intake air amount to the accumulated value Gacsum of the correction amount and then to obtain (renew) new accumulated value Gacsum of the correction amount. The value of the obtained (renewed) accumulated value Gacsum of the correction amount is stored to the back-up RAM 84.

Next, the CPU 81 proceeds to step 1770 to set the value of the second fuel-excess-injection flag XQP2 as "0" and to set the value of the second fuel-deficient-injection flag XQN2 as "0".

As described above, when at least the difference in intake air amount is negative (that is, the value of the second intake-air-deficient-measurement flag XGAN2 is "1"), the measured value Gamsr of the intake air amount is corrected (increased) by the correction amount Gac of the intake air amount. As a result thereof, the measured value Gamsr of the intake air amount will get close to the actual value Gaact, and therefore the amount of the difference in intake air amount is decreased. These are the treatment carried out when at least the difference in intake air amount is negative.

(Case 2-2) In the Case that the Difference in Fuel Injection Amount is "Negative".

In this case, as described above, the amount of change of the NOx concentration difference ΔNOx is "negative" when the intake oxygen concentration Ocon increases, and the amount of the NOx concentration difference ΔNOx is "negative" when the intake oxygen concentration Ocon is the predetermined value. That is, the value of the first NOx concentration difference ΔNOx(Ocon1) is "larger" than the value of the second NOx concentration difference ΔNOx(Ocon2). Furthermore, when the first intake oxygen concentration Ocon1 is employed as the predetermined value, the value of the first NOx concentration difference ΔNOx(Ocon1) is "negative".

Therefore, in this case, the CPU 81 makes the "Yes" determination at step 1816 to proceed to step 1818 in FIG. 19. Then, the CPU 81 makes the "No" determination at step 1818 to proceed to step 1822.

At step 1822, the CPU 81 stores "1" as the value of the second fuel-deficient-injection flag XQN2. After that, the CPU 81 proceeds to step 1895 so as to end this routine once.

Then, the CPU 81 starts a process at step 2000 of FIG. 20 and then proceeds toward step 2010 at a predetermined timing. The value of the second fuel-deficient-injection flag XQN2 is "1" at this moment, the CPU 81 makes the "Yes" determination at step 2010 to proceed to step 2020. The CPU 81 obtains the second average value ΔNOxave2 of the NOx concentration difference at step 2020 and proceed to step 2095 so as to end this routine once.

Furthermore, the CPU 81 starts a process at step 1600 of FIG. 16 and then proceeds toward step 1620 through step 1610. The value of the second fuel-excess-injection flag XQP2 is "1" at this moment, the CPU 81 makes the "Yes" determination at step 1620 to proceed to step 1630.

The value of the second fuel-excess-injection flag XQP2 is "1" at this moment, then the CPU 81 makes the "Yes" determination at step 1630 to proceed to step 1650.

At step 1650, the CPU 81 obtains the correction amount Qc of the fuel injection amount to correct the fuel injection amount by applying the second average value ΔNOxave2 of the NOx concentration difference to the following formula (14). Regarding the formula (14), L2 represents the predetermined positive coefficient. Therefore, the correction amount Qc of the fuel injection amount will be positive number.

$$Qc = L2 \cdot |\Delta NOxave2| \qquad (14)$$

Next, the CPU 81 proceeds to step 1660 to add the correction amount Qc of the fuel injection amount to the target value Qtgt of the fuel injection amount. In fact, the correction amount Qc of the fuel injection amount is positive number, then the target value Qtgt of the fuel injection amount is increased by the correction amount Qc actually.

Next, the CPU 81 proceeds to step 1670 to add (actually, add since the Qc is positive number) the correction amount Qc of the fuel injection amount to the accumulated value Qcsum of the correction amount and then to obtain (renew) new accumulated value Qcsum of the correction amount. The value of the obtained (renewed) accumulated value Qcsum of the correction amount is stored to the back-up RAM 84.

Next, the CPU 81 proceeds to step 1680 to set the value of the second fuel-excess-injection flag XQP2 as "0" and to set the value of the second intake-air-deficient-measurement flag XGAN2 as "0".

Next, the CPU 81 proceeds to step 1640 to send an instruction for injecting fuel from the fuel injecting device 22 into the fuel injection cylinder in the amount of the corrected target value Qtgt. The instruction is sent to the fuel injecting device 22. That is, the fuel in the amount of the corrected target value Qtgt is injected into the fuel injection cylinder. After that, the CPU 81 proceeds to step 1695 so as to end this routine once.

As described above, when the difference in fuel injection amount is negative (that is, the value of the second fuel-deficient-injection flag XQN2 is "1"), the target value Qtgt of the fuel injection amount is corrected (increased) by the correction amount Qc of the fuel injection amount. As a result thereof, the target value Qtgt of the fuel injection amount will get close to the target value Qtgt, and therefore the amount of the difference in fuel injection amount is decreased. These are the treatment carried out when the difference in fuel injection amount is negative.

(Case 2-3) In the Case that the Difference in Fuel Injection Amount is "Positive".

In this case, as described above, the amount of change of the NOx concentration difference ΔNOx is "positive" when the intake oxygen concentration Ocon increases, and the amount of the NOx concentration difference ΔNOx is "positive" when the intake oxygen concentration Ocon is the predetermined value. That is, the value of the first NOx concentration difference ΔNOx(Ocon1) is "smaller" than the value of the second NOx concentration difference ΔNOx(Ocon2). Furthermore, when the first intake oxygen concentration Ocon1 is employed as the predetermined value, the value of the first NOx concentration difference ΔNOx(Ocon1) is "positive".

Therefore, in this case, the CPU 81 makes the "No" determination at step 1816 to proceed to step 1824. At step 1824, the CPU 81 determines whether or not the value of the first NOx concentration difference ΔNOx(Ocon1) is smaller than the value of the second NOx concentration difference ΔNOx(Ocon2). As described above, the value of the first NOx concentration difference ΔNOx(Ocon1) is smaller than the value of the second NOx concentration difference ΔNOx(Ocon2) in this case, and therefore the CPU 81 makes the "Yes" determination at step 1824 to proceed to step 1826.

At step 1826, the CPU 81 the value of the first NOx concentration difference ΔNOx(Ocon1) is larger than zero. As described above, the value of the first NOx concentration difference ΔNOx(Ocon1) is "positive" in this case, and therefore the CPU 81 makes the "Yes" determination at step 1826 to proceed to step 1828.

At step 1828, the CPU 81 stores "1" as the value of the second fuel-excess-injection flag XQP2. After that, the CPU 81 proceeds to step 1895 so as to end this routine once.

Then, the CPU 81 starts a process at step 2000 of FIG. 20 and then proceeds toward step 2010 at a predetermined timing. The value of the second fuel-excess-injection flag XQP2 is "1" at this moment, the CPU 81 makes the "Yes" determination at step 2010 to proceed to step 2020. The CPU 81 obtains the second average value ΔNOxave2 of the NOx concentration difference at step 2020 and proceed to step 2095 so as to end this routine once.

Furthermore, the CPU 81 starts a process at step 1600 of FIG. 16 and then proceeds toward step 1620 through step 1610. The value of the second fuel-excess-injection flag XQP2 is "1" at this moment, the CPU 81 makes the "Yes" determination at step 1620 to proceed to step 1690.

At step 1690, the CPU 81 obtains the correction amount Qc of the fuel injection amount to correct the fuel injection amount by applying the second average value ΔNOxave2 of the NOx concentration difference to the following formula (15). Regarding the formula (15), L1 represents the predetermined negative coefficient. Therefore, the correction amount Qc of the fuel injection amount will be negative number.

$$Qc = L1 \cdot |\Delta NOxave2| \tag{15}$$

Next, the CPU 81 proceeds to step 1660 to add the correction amount Qc of the fuel injection amount to the target value Qtgt of the fuel injection amount. The correction amount Qc of the fuel injection amount is negative number, and therefore the target value Qtgt of the fuel injection amount is decreased by the correction amount Qc.

Next, the CPU 81 proceeds to step 1670 to add (actually, add since the Gac is positive number) the correction amount Qc of the fuel injection amount to the accumulated value Qcsum of the correction amount and then to obtain (renew) new accumulated value Qcsum of the correction amount. The value of the obtained (renewed) accumulated value Qcsum of the correction amount is stored to the back-up RAM 84.

Next, the CPU 81 proceeds to step 1680 to set the value of the second fuel-excess-injection flag XQP2 as "0" and to set the value of the second fuel-excess-injection flag XQP2 as "0".

Next, the CPU 81 proceeds to step 1640 to send an instruction for injecting fuel from the fuel injecting device 22 into the fuel injection cylinder in the amount of the corrected target value Qtgt. The instruction is sent to the fuel injecting device 22. That is, the fuel in the amount of the corrected target value Qtgt is injected into the fuel injection cylinder. After that, the CPU 81 proceeds to step 1695 so as to end this routine once.

As described above, when the difference in fuel injection amount is positive (that is, the value of second fuel-excess-injection flag XQP2 is "1"), the target value Qtgt of the fuel injection amount is corrected (decreased) by the correction amount Qc of the fuel injection amount. As a result thereof, the target value Qtgt of the fuel injection amount will get close to the target value Qtgt, and therefore the amount of the difference in fuel injection amount is decreased. These are the treatment carried out when the difference in fuel injection amount is positive.

(Case 2-4) in the Case that at Least the Difference in Intake Air Amount is "Positive".

In this case, as described above, the amount of change of the NOx concentration difference ΔNOx is "positive" when the intake oxygen concentration Ocon increases, and the amount of the NOx concentration difference ΔNOx is "negative" when the intake oxygen concentration Ocon is the predetermined value. That is, the value of the first NOx concentration difference ΔNOx(Ocon1) is "smaller" than the value of the second NOx concentration difference ΔNOx(Ocon2). Furthermore, when the first intake oxygen concentration Ocon1 is employed as the predetermined value, the value of the first NOx concentration difference ΔNOx(Ocon1) is "negative".

Therefore, in this case, the CPU 81 proceeds to step 1826 through step 1816 and step 1824 in FIG. 19. At step 1826, the CPU 81 makes the "No" determination to proceed to step 1830.

At step 1830, the CPU 81 stores "1" as the value of the second intake-air-excess-measurement flag XGAP2. After that, the CPU 81 proceeds to step 1895 so as to end this routine once.

Then, the CPU 81 starts a process at step 2000 of FIG. 20 and then proceeds toward step 2010 at a predetermined timing. The value of the second intake-air-excess-measurement flag XGAP2 is "1" at this moment, the CPU 81 makes the "Yes" determination at step 2010 to proceed to step 2020. The CPU 81 obtains the second average value ΔNOxave2 of the NOx concentration difference at step 2020 and proceed to step 2095 so as to end this routine once.

Furthermore, the CPU 81 starts a process at step 1700 of FIG. 17 and then proceeds toward step 1720 through step 1710. The value of the second intake-air-excess-measurement flag XGAP2 is "1" at this moment, the CPU 81 makes the "Yes" determination at step 1720 to proceed to step 1780.

At step 1780, the CPU 81 obtains the correction amount Gac of the intake air amount to correct the intake air amount by applying the second average value ΔNOxave2 of the NOx concentration difference to the following formula (16). Regarding the formula (16), L3 represents the predetermined negative coefficient. Therefore, the correction amount Gac of the intake air amount will be negative number.

$$Gac = L3 \cdot |\Delta NOxave2| \tag{16}$$

Next, the CPU 81 proceeds to step 1750 to add the correction amount Gac of the intake air amount to the measured value Gamsr of the intake air amount. The correction amount Gac of the intake air amount is negative number, and therefore the measured value Gamsr of the intake air amount is decreased by the correction amount Gac.

Next, the CPU 81 proceeds to step 1760 to add (actually, subtract since the Gac is negative number) the correction amount Gac of the intake air amount to (from) the accumulated value Gacsum of the correction amount and then to obtain (renew) new accumulated value Gacsum of the correction amount. The value of the obtained (renewed) accumulated value Gacsum of the correction amount is stored to the back-up RAM 84.

Next, the CPU 81 proceeds to step 1770 to set the value of the second intake-air-excess-measurement flag XGAP2 as "0" and to set the value of the second intake-air-deficient-measurement flag XGAN2 as "0".

As described above, when the difference in intake air amount is positive (that is, the value of second intake-air-excess-measurement flag XGAP2 is "1"), the measured value Gamsr of the intake air amount is corrected (decreased) by the correction amount Gac of the intake air amount. As a result thereof, the measured value Gamsr of the intake air amount will get close to the actual value Gaact, and therefore the amount of the difference in intake air amount is decreased. These are the treatment carried out when at least the difference in intake air amount is positive.

(Case 2-5) In the Case that Difference in Intake Air Amount is "Zero" and the Difference in Fuel Injection Amount is "Zero.

In this case, as described above, the amount of change of the NOx concentration difference ΔNOx is "zero" when the intake oxygen concentration Ocon increases, and the amount of the NOx concentration difference ΔNOx is "zero" when the intake oxygen concentration Ocon is the predetermined value. That is, the value of the first NOx concentration difference ΔNOx(Ocon1) is "zero", and the value of the second NOx concentration difference ΔNOx(Ocon2) is "zero".

Therefore, in this case, the CPU 81 proceeds to step 1832 through step 1816 and step 1824. At step 1832, the CPU 81 determines whether or not the value of the first NOx concentration difference ΔNOx(Ocon1) is zero and the value of the second NOx concentration difference ΔNOx(Ocon2) is zero. The value of the first NOx concentration difference ΔNOx (Ocon1) is "zero" and the value of the second NOx concentration difference ΔNOx(Ocon2) is "zero" in this case, and therefore the CPU 81 makes the "Yes" determination at step 1832 to proceed to step 1834.

Next, the CPU 81 carries out the treatments indicated in step 1834 to step 1840 in this order. Specifically, the CPU 81 stores the following values as the following flags: "0" as the value of the second fuel-excess-injection flag XQP2 at step 1834, "0" as the value of the second fuel-deficient-injection flag XQN2 at step 1836, "0" as the value of the second intake-air-excess-measurement flag XGAP2 at step 1838, and "0" as the value of the second intake-air-deficient-measurement flag XGAN2 at step 1840. After that, the CPU 81 proceeds to step 1895 so as to end this routine once.

Then, the CPU 81 starts a process at step 2000 of FIG. 20 and then proceeds toward step 2010 at a predetermined timing. According to the second precondition for default setting, setting "zero" is done at this moment to all of the values of the flags: the value of the second fuel-excess-injection flag XQP2; the value of the second fuel-deficient-injection flag XQN2; the value of the second intake-air-excess-measurement flag XGAP2; and the value of the second intake-air-deficient-measurement flag XGAN2, and therefore the CPU 81 makes the "No" determination at step 2010 to proceed to step 2095 so as to end this routine once.

Furthermore, the CPU 81 starts a process at step 1600 of FIG. 16 and then proceeds toward step 1695 so as to end this routine once, through step 1610, step 1620, step 1630 and step 1640, since the value of the second fuel-excess-injection flag XQP2 is "0" and the value of the second fuel-deficient-injection flag XQN2 is "0" at this moment.

Furthermore, the CPU 81 starts a process at step 1700 of FIG. 17 and then proceeds toward step 1795 so as to end this routine once, through step 1710, step 1720 and step 1730, since the value of the second intake-air-excess-measurement flag XGAP2 is "0" and the value of the second intake-air-deficient-measurement flag XGAN2 is "0" at this moment.

As described above, when the difference in fuel injection amount is "zero" and the difference in intake air amount is "zero" (that is, the value of the second fuel-excess-injection flag XQP2 is "0" and the value of the second fuel-deficient-injection flag XQN2 is "0"), the target value Qtgt of the fuel injection amount and the measured value Gamsr of the intake air amount are not corrected. These are the treatment carried out when the difference in intake air amount is zero and the difference in fuel injection amount is zero.

(Case 2-6) In the Case that a Difference(s) Other than the Difference in Fuel Injection Amount and the Difference in Intake Air Amount Occur(s).

In this case, as described above, the amount of change of the NOx concentration difference ΔNOx is "zero" when the intake oxygen concentration Ocon increases, and the amount of the NOx concentration difference ΔNOx is "positive" or "negative" when the intake oxygen concentration Ocon is the predetermined value. That is, the value of the first NOx concentration difference ΔNOx(Ocon1) is "the same" as the value of the second NOx concentration difference ΔNOx(Ocon2). Furthermore, the value of the first NOx concentration difference ΔNOx(Ocon1) is not zero, and the value of the second NOx concentration difference ΔNOx(Ocon2) is not zero.

Therefore, in this case, the CPU 81 proceeds to step 1832 through step 1816 and step 1824. At step 1832, the CPU 81 makes the "No" determination At step 1832 to proceed to step 1842.

At step 1842, the CPU 81 stores "1" as the value of the second other-abnormality-occurrence flag XOTH2. After that, the CPU 81 proceeds to step 1895 so as to end this routine once, through step 1834 to step 1840. Therefore, in this case, the value of the second fuel-excess-injection flag XQP2 is "0", the value of the second fuel-deficient-injection flag XQN2 is "0", the value of the second intake-air-excess-measurement flag XGAP2 is "0", and the value of the second intake-air-deficient-measurement flag XGAN2 is "0".

Then, the CPU 81 starts a process at step 2000 of FIG. 20, proceeds to step 2010 followed by step 2000 to makes the "No" determination, and then proceeds to step 2095 so as to end this routine once.

Furthermore, the CPU 81 starts a process at step 1600 of FIG. 16 and then proceeds toward step 1695 so as to end this routine once, through step 1610, step 1620, step 1630 and step 1640.

Furthermore, the CPU 81 starts a process at step 1700 of FIG. 17 and then proceeds toward step 1795 so as to end this routine once, through step 1710, step 1720 and step 1730.

As described above, when a difference(s) other than the difference in fuel injection amount and the difference in intake air amount occur(s) (that is, the value of the second other-abnormality-occurrence flag XOTH2 is "1"), the target value Qtgt of the fuel injection amount and the measured value Gamsr of the intake air amount are not corrected. These are the treatment carried out when a difference(s) other than the difference in fuel injection amount and the difference in intake air amount occur(s).

As explained in the Case 2-1 to the Case 2-6, the second device determines the situation of the difference in fuel injection amount and the situation of the difference in intake air amount, based on "the amount of change of the NOx concentration difference ΔNOx when the intake oxygen concentration Ocon increases" and "the value of the NOx concentration difference ΔNOx when the intake oxygen concentration Ocon is a predetermined value". Furthermore, the second device corrects the measured value Gamsr of the intake air amount and the target value Qtgt of the fuel injection amount, depending on the situation of the difference in fuel injection amount and the situation of the difference in intake air amount.

Furthermore, the CPU 81 starts a process at step 1100 of FIG. 11 and then proceeds toward step 1110 at a predetermined timing to determine whether or not the accumulated value Gacsum of the correction amount is larger than the predetermined threshold value Gacsumth.

If the accumulated value Gacsum of the correction amount is larger than the predetermined threshold value Gacsumth, then the CPU 81 makes the "Yes" determination at step 1110 to proceed to step 1120. At step 1120, the CPU 81 shows the status that "the intake air flow sensor 71 is abnormal" on the display device (not illustrated), and proceeds to step 1130.

To the contrary, if the accumulated value Gacsum of the correction amount is equal to or smaller than the predetermined threshold value Gacsumth, then the CPU 81 makes the "No" determination at step 1110 to directly proceed to step 1130. That is, the status that "the intake air flow sensor 71 is abnormal" is not shown on the display device.

At step 1130, the CPU 81 determines whether or not the accumulated value Gacsum of the correction amount is larger than a predetermined threshold value Qcsumth.

If the accumulated value Gacsum of the correction amount is larger than the predetermined threshold value Qcsumth, then the CPU 81 makes the "Yes" determination at step 1130 to proceed to step 1140. At step 1140, the CPU 81 shows the status that "the fuel injecting device 22 is abnormal" on the display device (not illustrated), and proceeds to step 1195 so as to end this routine once.

To the contrary, if the accumulated value Qcsum of the correction amount is equal to or smaller than the predetermined threshold value Qcsumth, then the CPU 81 makes the "No" determination at step 1130 to directly proceed to step 1195 so as to end this routine once. That is, the status that "the fuel injecting device 22 is abnormal" is not shown on the display device.

By the way, as described above, the value of the second fuel-excess-injection flag XQP2 and the value of the second fuel-deficient-injection flag XQN2 are re-set to "0" after the target value Qtgt of the fuel injection amount is corrected (see step 1680 in FIG. 16). Therefore, in the case, for example, that "only" the difference in fuel injection amount occurs, if the difference in fuel injection amount is not sufficiently corrected (that is, if the difference in fuel injection amount does not become zero) by the above treatments carried out at one time point, then the value of the second fuel-excess-injection flag XQP2 or the value of the second fuel-deficient-injection flag XQN2 is set to "1" again when the second situation-determination routine is carried out at another time period that is after the one time period. As a result thereof, the target value Qtgt of the fuel injection amount is also corrected at the another time period.

On the other hand, if the difference in fuel injection amount is sufficiently corrected at the one time point, then the value of the second fuel-excess-injection flag XQP2 and the value of the second fuel-deficient-injection flag XQN2 is not set to "1" when the second situation-determination routine is carried out at the another time period. As a result thereof, the target value Qtgt of the fuel injection amount is not corrected at the another time period. As described above, in the case that "only" the difference in fuel injection amount occurs, the second device repeatedly corrects the target value Qtgt of the fuel injection amount until the difference in fuel injection amount is sufficiently decreased.

Furthermore, the value of the second intake-air-excess-measurement flag XGAP2 and the value of the second intake-air-deficient-measurement flag XGAN2 are re-set to "0" after the measured value Gamsr of the intake air amount is corrected (see step 1770 in FIG. 17). As will be appreciated from the above descriptions, in the case that "only" the difference in intake air amount occurs, the second device repeatedly corrects the measured value Gamsr of the intake air amount until the difference in intake air amount is sufficiently decreased.

On the other hand, in the case that "both" of the difference in intake air amount and the difference in fuel injection amount occur, if it is determined, for example, that "at least the difference in intake air amount occurs" at the one time point, then the value of the second intake-air-excess-measurement flag XGAP2 and the value of the second intake-air-deficient-measurement flag XGAN2 are re-set to "0" after the measured value Gamsr of the intake air amount is corrected.

If the difference in intake air amount is not sufficiently corrected by this correction, then it is determined that "at least the difference in intake air amount occurs" again at the another time point, and the measured value Gamsr of the intake air amount is corrected.

On the other hand, if the difference in intake air amount is sufficiently corrected by the correction carried out at the one time point, then it is determined that "the difference in fuel injection amount occurs" at the another time point, and the target value Qtgt of the fuel injection amount is corrected. After that, the target value Qtgt of the fuel injection amount will be repeatedly corrected until the difference in fuel injection amount is sufficiently decreased.

As described above, the second device repeatedly carries out the correction until the difference in fuel injection amount and the difference in intake air amount is sufficiently decreased, either in the case that "one" of the difference in intake air amount and the difference in fuel injection amount occurs or "both" of them occur. As a result thereof, the amount of the NOx concentration difference ΔNOx is decreased.

<Function and Effect of the Device>

The second device obtains the NOx concentration difference ΔNOx by comparing the measured value NOxmsr of the NOx concentration of exhaust gas with the NOx referential concentration NOxref that is defined based on the operating conditions of the engine 10. Furthermore, the second device determines whether the difference in fuel injection amount is zero, positive or negative; or whether the difference in intake air amount is zero, positive or negative, based on the relationship between the NOx concentration difference ΔNOx and the intake oxygen concentration Ocon (the second relationship R2(Ocon, ΔNOx) described above). That is, the second device can determine how different the target value Qtgt of the fuel injection amount and the actual value Qact are, when the NOx concentration difference ΔNOx occurs. Furthermore, the second device can determine how different the measured value Gamsr of the intake air amount and the actual value Gaact are, when the NOx concentration difference ΔNOx occurs.

Furthermore, the second device corrects the target value Qtgt of the fuel injection amount depending on the amount of the NOx concentration difference ΔNOx (i.e., the average value ΔNOxave of the first NOx concentration difference ΔNOx(Ocon1) and the second NOx concentration difference ΔNOx(Ocon2)), when the difference in fuel injection amount occurs. On the other hand, the second device corrects the measured value Gamsr of the intake air amount depending on the amount of the NOx concentration difference ΔNOxave, when the difference in intake air amount occurs. Furthermore, the second device repeatedly carries out these corrections until the difference in fuel injection amount and the difference in intake air amount are sufficiently corrected. Thereby, the amount of the difference in fuel injection amount and the amount of the difference in intake air amount are appropriately decreased. As a result thereof, the NOx concentration difference is decreased.

Additionally, in the case that the accumulated value Qcsum of the correction amount employed when the difference in fuel injection amount is corrected is larger than the predetermined threshold value Qcsumth, the second device shows the status that "the fuel injecting device 22 is abnormal" on the display device. On the other hand, in the case that the accumulated value Gacsum of the correction amount employed when the difference in intake air amount is corrected is larger than the predetermined threshold value Gacsumth, the second device shows the status that "the intake air flow sensor 71 is abnormal" on the display device.

(Third Embodiment)

Next, third embodiment of the control device for internal combustion engine of the present invention (hereinafter referred to as "third device") will be described below.

<Outline of Device>

The third device is applied to an internal combustion engine that has the same configuration as the engine 10 that the first device is applied to (see FIG. 1. For convenience, the internal combustion engine is hereinafter referred to as "engine 10".) Therefore, detailed description is omitted regarding the outline of the device that the third device is applied to.

<Outline of Operation of Device>

Hereinafter, the outline of the operation of the third device configured as described above will be described.

The third device is different from the first device and the second device only in a respect that the third device determines the situation of the difference in fuel injection amount and the situation of the difference in intake air amount based on "both" of the relationship between the target value Qtgt of the fuel injection amount and the NOx concentration difference ΔNOx (i.e., the first relationship R1(Qtgt, ΔNOx)) of the first device and the relationship between the intake oxygen concentration Ocon and the NOx concentration difference ΔNOx (i.e., the second relationship R2(Ocon, ΔNOx)) of the second device.

The third device carries out a preliminary determinations regarding the situation of the difference in fuel injection amount and the situation of the difference in intake air amount in accordance with the first method for situation determination, by the same method as the first device. Furthermore, the third device carries out preliminary determinations regarding the situation of the difference in fuel injection amount and the situation of the difference in intake air amount in accordance with the second method for situation determination, by the same method as the second device. Then, the third device finally determines the situation of the difference in fuel injection amount and the situation of the difference in intake air amount based on both of the preliminary determinations.

The third device corrects the target value Qtgt of the fuel injection amount and the measured value Gamsr of the intake air amount as same as the first device and the second device. Furthermore, the third device shows the status that "the fuel injecting device 22 is abnormal" and the status that "the intake air flow sensor 71 is abnormal" on a display device etc. These are the outline of operation of the third device.

<Method for Controlling Internal Combustion Engine>

As indicated above, the third device carries out the situation determination according to the first method for situation determination and the second method for situation determination, and the third device corrects the target value Qtgt of the fuel injection amount and the measured value Gamsr of the intake air amount as same as the first device and the second device. Therefore, detailed description is omitted regarding the method for controlling the internal combustion engine.

<Actual Operation>

Hereinafter, an actual operation of the third device will be described.

The third device carries out the treatments indicated by the flowcharts in FIG. 7 to FIG. 11 (the treatments carried out by the first device), the treatments indicated by the flowcharts in FIG. 18 to FIG. 20 (the treatments carried out by the second device), and furthermore the treatments indicated by the flowcharts in FIG. 21 to FIG. 24.

In these routines, the CPU 81 uses following flags: the first fuel-excess-injection flag XQP1, the first fuel-deficient-injection flag XQN1, the first intake-air-excess-measurement flag XGAP1, the first intake-air-deficient-measurement flag XGAN1, and the first other-abnormality-occurrence flag XOTH1, which are the same as those of the first device; and the second fuel-excess-injection flag XQP2, the second fuel-deficient-injection flag XQN2, the second intake-air-excess-measurement flag XGAP2, the second intake-air-deficient-measurement flag XGAN2, and the second other-abnormality-occurrence flag XOTH2, which are the same as those of the second device.

Furthermore, in these routines, the CPU 81 uses following flags: a third fuel-excess-injection flag XQP3; a third fuel-deficient-injection flag XQN3; a third intake-air-excess-measurement flag XGAP3; a third intake-air-deficient-measurement flag XGAN3; and a third other-abnormality-occurrence flag XOTH3.

When the third fuel-excess-injection flag XQP3 is "0", it indicates that the actual value Qact of the fuel injection amount is not larger than the target value Qtgt thereof (that is, Qact≤Qtgt). On the other hand, when the third fuel-excess-injection flag XQP3 is "1", it indicates that the actual value Qact of the fuel injection amount is larger than the target value Qtgt thereof (that is, Qact>Qtgt).

When the third fuel-deficient-injection flag XQN3 is "0", it indicates that the actual value Qact of the fuel injection amount is not smaller than the target value Qtgt thereof (that is, Qact≥Qtgt). On the other hand, when the third fuel-deficient-injection flag XQN3 is "1", it indicates that the actual value Qact of the fuel injection amount is smaller than the target value Qtgt thereof (that is, Qact<Qtgt).

When the third intake-air-excess-measurement flag XGAP3 is "0", it indicates that the measured value Gamsr of the intake air amount is not larger than the actual value Gaact thereof (that is, Gamsr≤Gaact). On the other hand, when the third intake-air-excess-measurement flag XGAP3 is "1", it indicates that the measured value Gamsr of the intake air amount is larger than the actual value Gaact thereof (that is, Gamsr>Gaact).

When the third intake-air-deficient-measurement flag XGAN3 is "0", it indicates that the measured value Gamsr of the intake air amount is not smaller than the actual value Gaact thereof (that is, Gamsr≥Gaact). On the other hand, when the third intake-air-deficient-measurement flag XGAN3 is "1", it indicates that the measured value Gamsr of the intake air amount is smaller than the actual value Gaact thereof (that is, Gamsr<Gaact).

When the third other-abnormality-occurrence flag XOTH3 is "0", it indicates that a difference(s) other than the difference in fuel injection amount and the difference in intake air amount does(do) not occur. On the other hand, when the third other-abnormality-occurrence flag XOTH3 is "1", it indicates that a difference(s) other than the difference in fuel injection amount and the difference in intake air amount occurs.

The back-up RAM 84 stores the following values of the flags: the value of the first fuel-excess-injection flag XQP1; the value of the first fuel-deficient-injection flag XQN1; the value of the first intake-air-excess-measurement flag XGAP1; the value of the first intake-air-deficient-measurement flag XGAN1; the value of the first other-abnormality-occurrence flag XOTH1; the value of the second fuel-excess-injection flag XQP2; the value of the second fuel-deficient-injection flag XQN2; the value of the second intake-air-excess-measurement flag XGAP2; the value of the second intake-air-deficient-measurement flag XGAN2; the value of the second other-abnormality-occurrence flag XOTH2; the value of the third fuel-excess-injection flag XQP3; the value of the third fuel-deficient-injection flag XQN3; the value of the third intake-air-excess-measurement flag XGAP3; the value of the third intake-air-deficient-measurement flag XGAN3; and the value of the third other-abnormality-occurrence flag XOTH3.

Furthermore, when a predetermined operation is performed on the electric control device 80 after it is verified that no abnormality occurs in the fuel injecting device 22 and the intake air flow sensor 71 through a factory default setting of a vehicle equipped with the engine 10 and a service maintenance, etc., setting "zero" is done to a part of the values of the flags: the value of the first fuel-excess-injection flag XQP1; the value of the first fuel-deficient-injection flag XQN1; the value of the first intake-air-excess-measurement flag XGAP1; the value of the first intake-air-deficient-measurement flag XGAN1; the value of the second fuel-excess-injection flag XQP2; the value of the second fuel-deficient-injection flag XQN2; the value of the second intake-air-excess-measurement flag XGAP2; the value of the second intake-air-deficient-measurement flag XGAN2; the value of the third fuel-excess-injection flag XQP3; the value of the third fuel-deficient-injection flag XQN3; the value of the third intake-air-excess-measurement flag XGAP3; and the value of the third intake-air-deficient-measurement flag XGAN3.

Additionally, when a predetermined operation is performed on the electric control device 80 after a treatment to resolve the cause for the occurrence of the difference(s) other than the difference in fuel injection amount and the difference in intake air amount through a factory default setting of a vehicle equipped with the engine 10 and a service maintenance, etc., setting "zero" is done to the other value of the flags: the value of the first other-abnormality-occurrence flag XOTH1; the value of the second other-abnormality-occurrence flag XOTH2; and the value of the third other-abnormality-occurrence flag XOTH3.

Hereinafter, the respective routines performed by the CPU 81 will be described in detail.

First, it is presupposed that setting "zero" is done at this moment to all of the values of the flags: the value of the third fuel-excess-injection flag XQP3; the value of the third fuel-deficient-injection flag XQN3; the value of the third intake-air-excess-measurement flag XGAP3; the value of the third intake-air-deficient-measurement flag XGAN3; and the value of the third other-abnormality-occurrence flag XOTH3. Hereinafter, this setting is referred to as "third precondition for default setting".

Figure 21:
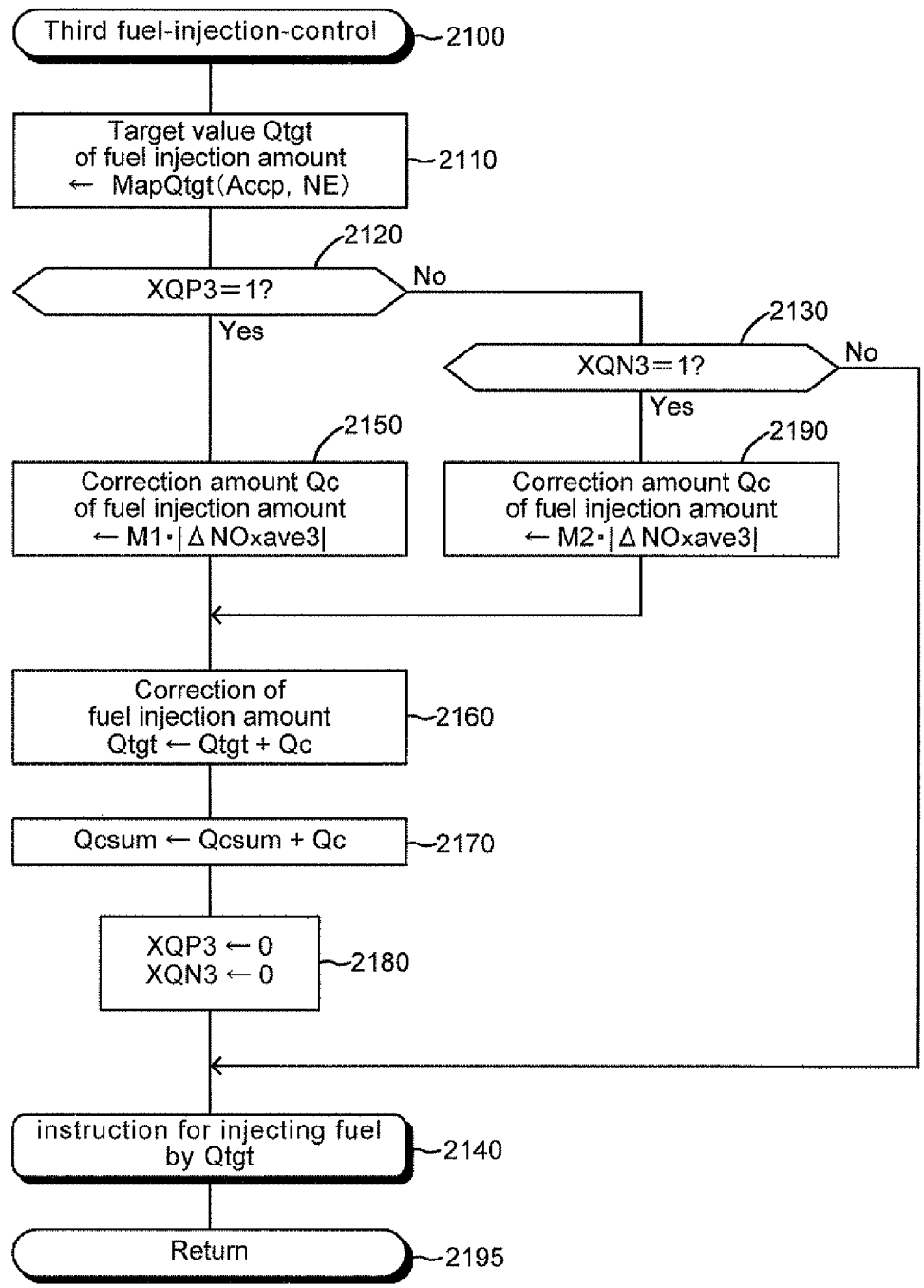
FIG. 21 is a flowchart illustrating a routine executed by CPU of a control device according to third embodiment of the present invention.

The CPU 81 is configured to repeatedly perform the "third fuel-injection-control routine", which is indicated by the flowchart in FIG. 21, every time the crank angle of arbitrary cylinder becomes equal to a predetermined crank angle before the compression top dead center (for example, the crank angle of 90 degrees before the compression top dead center) θf. By this routine, the CPU 81 determines the target value Qtgt of the fuel injection amount and sends an instruction for injecting fuel into the respective cylinder in the amount of the target value Qtgt. Furthermore, by this routine, the CPU 81 corrects the target value Qtgt of the fuel injection amount in the case that the actual value Qact thereof does not coincide with the target value Qtgt thereof, and the CPU 81 send an instruction for injecting fuel into the respective cylinder in the amount of the corrected target value Qtgt.

Specifically, the CPU 81 determines the target value Qtgt of the fuel injection amount depending on the operating conditions of the engine 10 by this routine. Furthermore, in the case that the CPU 81 determines that the actual value Qact of the fuel injection amount is larger than the target value Qtgt, the CPU 81 decreases the target value Qtgt of the fuel injection amount by a correction amount Qc of the fuel injection amount. On the other hand, in the case that the CPU 81 determines that the actual value Qact of the fuel injection amount is smaller than the target value Qtgt, the CPU 81 increases the target value Qtgt of the fuel injection amount by a correction amount Qc of the fuel injection amount.

The CPU 81 calculates an accumulated value Qcsum of the correction amount Qc by the routine in FIG. 21. It is configured that the value of the accumulated value Qcsum is set at "zero" when a predetermined operation is performed on the electric control device 80 after it is verified that no abnormality occurs in the fuel injecting device 22 through a factory default setting of a vehicle equipped with the engine 10 and a service maintenance, etc.

More specifically, the CPU 81 starts a process at step 2100 of FIG. 21 and then proceeds toward step 2110 at a predetermined timing to determine the target value Qtgt of the fuel injection amount by applying an accelerator opening degree Accp and an engine rotation speed NE at this moment to a table MapQtgt(Accp, NE) for defining the target value of the fuel injection amount. The table defines "the relationship between the accelerator opening degree Accp, the engine rotation speed NE, and the target value Qtgt of the fuel injection amount" in advance. Regarding this table MapQtgt (Accp, NE) for defining the target value of the fuel injection amount, the target value Qtgt of the fuel injection amount is designed to be an appropriate value that is set depending on a required torque determined based on the accelerator opening degree Accp and the engine rotation speed NE.

Next, the CPU 81 proceeds to step 2120 to determine whether or not the value of the third fuel-excess-injection flag XQP3 is "1" at this moment. According to the third precondition for default setting, the value of the third fuel-excess-injection flag XQP3 is "0", then the CPU 81 makes the "No" determination at step 2120 and proceeds to step 2130.

At step 2130, the CPU 81 determines whether or not the value of the third fuel-deficient-injection flag XQN3 is "1" at this moment. According to the third precondition for default setting, the value of the third fuel-deficient-injection flag XQN3 is "0", then the CPU 81 makes the "No" determination at step 2130 and proceeds to step 2140.

At step 2140, the CPU 81 sends an instruction for injecting fuel from the fuel injecting device 22 into the fuel injection cylinder in the amount of the target value Qtgt. The instruction is sent to the fuel injecting device 22. That is, the fuel in the amount of the target value Qtgt is injected into the fuel injection cylinder. After that, the CPU 81 proceeds to step 2195 so as to end this routine once.

Figure 22:
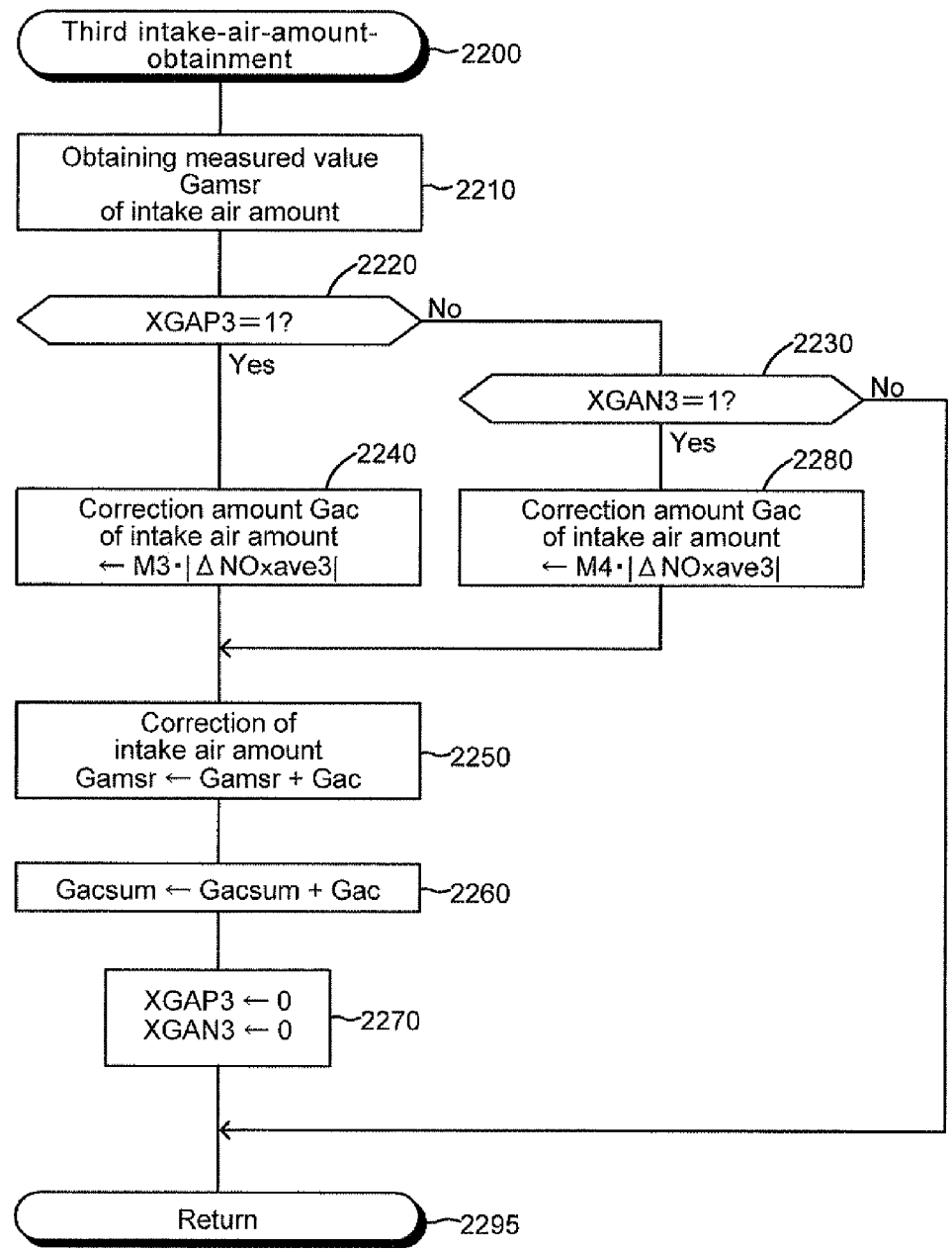
FIG. 22 is a flowchart illustrating a routine executed by CPU of the control device according to the third embodiment of the present invention.

Furthermore, the CPU 81 is configured to repeatedly perform the "third intake-air-amount-obtaining routine", which is indicated by the flowchart in FIG. 22, every time a predetermined time period elapses. By this routine, the CPU 81 determines the measured value Gamsr of the intake air amount. Furthermore, by this routine, the CPU 81 corrects the measured value Gamsr of the intake air amount in the case that the actual value Gaact thereof does not coincide with the measured value Gamsr thereof.

Specifically, the CPU 81 obtains the measured value Gamsr of the intake air amount based on an output value of the intake air flow sensor 71 by this routine. Furthermore, in the case that the CPU 81 determines that the actual value Gaact of the intake air amount is larger than the measured value Gamsr, the CPU 81 decreases the measured value Gamsr by a correction amount Gac of the intake air amount. On the other hand, in the case that the CPU 81 determines that the actual value Gaact of the intake air amount is smaller than the measured value Gamsr, the CPU 81 increases the measured value Gamsr by a correction amount Gac of the intake air amount.

The CPU 81 calculates an accumulated value Gacsum of the correction amount Gac by the routine indicated in FIG. 22. It is configured that the value of the accumulated value Gacsum is set at "zero" when a predetermined operation is performed on the electric control device 80 after it is verified that no abnormality occurs in the intake air flow sensor 71 through a factory default setting of a vehicle equipped with the engine 10 and a service maintenance, etc.

More specifically, the CPU 81 starts a process at step 2200 of FIG. 22 and then proceeds toward step 2210 at a predetermined timing to obtain the measured value Gamsr of the intake air amount based on the output value of the intake air flow sensor 71.

Next, the CPU 81 proceeds to step 2220 to determine whether or not the value of the third intake-air-excess-measurement flag XGAP3 is "1" at this moment. According to the third precondition for default setting, the value of the third intake-air-excess-measurement flag XGAP3 is "0", then the CPU 81 makes the "No" determination at step 2220 and proceeds to step 2230.

At step 2230, the CPU 81 determines whether or not the value of the third intake-air-deficient-measurement flag XGAN3 is "1" at this moment. According to the third precondition for default setting, the value of the third intake-air-deficient-measurement flag XGAN3 is "0", then the CPU 81 makes the "No" determination at step 2230 and proceeds to step 2295 so as to end this routine once.

Furthermore, the CPU 81 starts a process at step 700 of FIG. 7 and then proceeds toward step 795 through step 710 and step 720 so as to end this routine once. Thereby, the CPU 81 determines the target value Regrtgt of the EGR ratio, and the CPU 81 controls the throttle valve 33 and the EGR control valve 53 so that the actual value Regract of the EGR ratio coincides with the target value Regrtgt.

Furthermore, the CPU 81 is configured to repeatedly perform the "first situation-determination routine", which is indicated by the flowcharts in FIG. 8 and FIG. 9, every time a predetermined time period elapses, to determine the situation of the difference in fuel injection amount and the situation of the difference in intake air amount. Additionally, the CPU 81 is configured to repeatedly perform the "second situation-determination routine", which is indicated by the flowcharts in FIG. 18 and FIG. 19, every time a predetermined time period elapses, to determine the situation of the difference in fuel injection amount and the situation of the difference in intake air amount.

Regarding the descriptions below, it is deemed that "the situation determinations of the difference in fuel injection amount and the difference in intake air amount by the first situation-determination routine has already done, and the situation determinations of the difference in fuel injection amount and the difference in intake air amount by the second situation-determination routine has already done".

The CPU 81 is configured to repeatedly perform the "third situation-determination routine", which is indicated by the flowcharts in FIG. 17, every time a predetermined time period elapses. By this routine, the CPU 81 determines the situation of the difference in fuel injection amount and the situation of the difference in intake air amount, based on the results of the determination by the first situation-determination routine and the second situation-determination routine. Detailed explanation is described below.

(Case 3-1) In the Case that it is Determined by Both of the First Situation-Determination Routine and the Second Situation-Determination Routine that "the Difference in Fuel Injection Amount is Positive".

In this case, the first fuel-excess-injection flag XQP1 is set at "1" (see case 1-1 described above) and the second fuel-excess-injection flag XQP2 is set at "1" (see case 2-3 described above).

Figure 23:
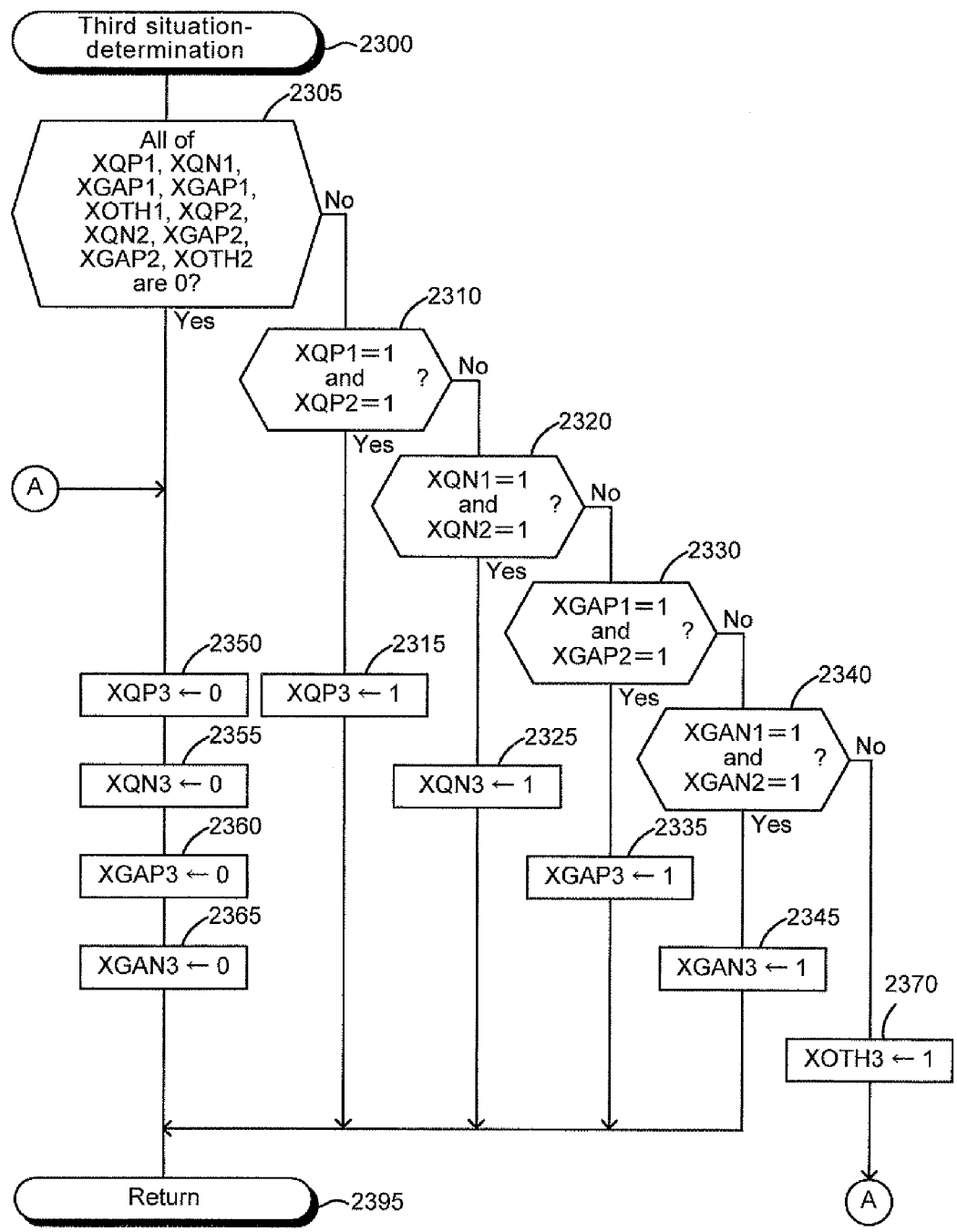
FIG. 23 is a flowchart illustrating a routine executed by CPU of the control device according to the third embodiment of the present invention.

The CPU 81 starts a process at step 2300 of FIG. 23 and then proceeds toward step 2305 at a predetermined timing to determine whether or not "0" is set on all of the values of the following flags: the first fuel-excess-injection flag XQP1, the first fuel-deficient-injection flag XQN1, the first intake-air-excess-measurement flag XGAP1, the first intake-air-deficient-measurement flag XGAN1, the first other-abnormality-occurrence flag XOTH1, the second fuel-excess-injection flag XQP2, the second fuel-deficient-injection flag XQN2, the second intake-air-excess-measurement flag XGAP2, the second intake-air-deficient-measurement flag XGAN2, and the second other-abnormality-occurrence flag XOTH2.

As described above, the value of the first fuel-excess-injection flag XQP1 is "1" at this moment, the CPU 81 makes the "No" determination at step 2305 to proceed to step 2310.

At step 2310, the CPU 81 determine whether or not "1" is set on the values of the following flags: the first fuel-excess-injection flag XQP1 and the second fuel-excess-injection flag XQP2. The value of the first fuel-excess-injection flag XQP1 is "1" and the value of the second fuel-excess-injection flag XQP2 is "1" at this moment, the CPU 81 makes the "Yes" determination at step 2310 to proceed to step 2315.

At step 2315, the CPU 81 sets the value of the third fuel-excess-injection flag XQP3 as "1". After that, the CPU 81 proceeds to step 2395 so as to end this routine once.

Figure 24:
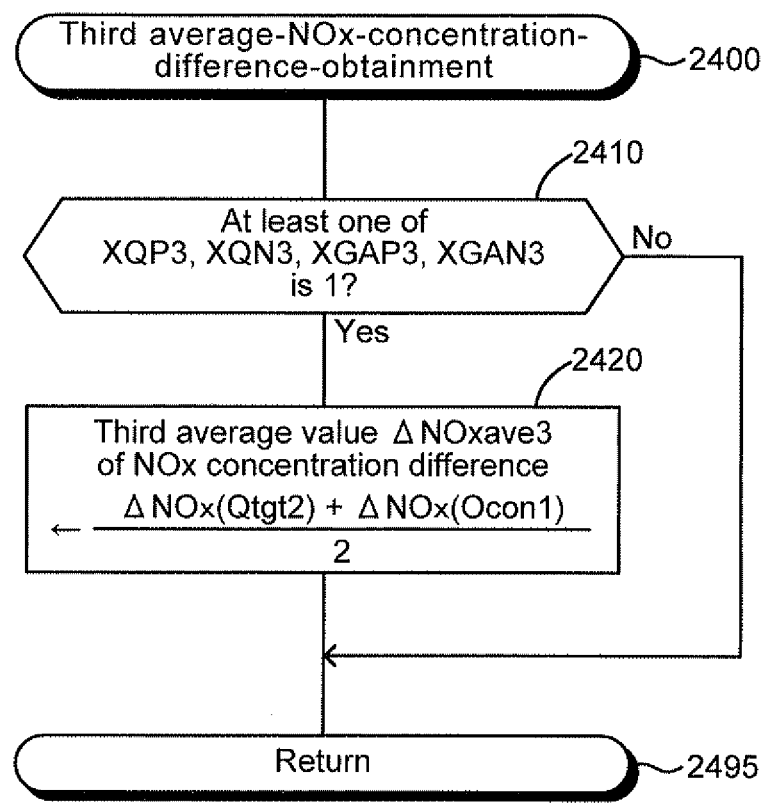
FIG. 24 is a flowchart illustrating a routine executed by CPU of the control device according to the third embodiment of the present invention.

Next, the CPU 81 is configured to repeatedly perform the "third average-NOx-concentration-difference-obtaining routine", which is indicated by the flowchart in FIG. 24, every time a predetermined time period elapses. By this routine, the CPU 81 obtains the average value of the value of the second NOx concentration difference ΔNOx(Qtgt2) of the first situation-determination routine and the value of the first NOx concentration difference ΔNOx(Ocon1) of the second situation-determination routine. Hereinafter, this average value is referred to as "third average value ΔNOxave3 of the NOx concentration difference".

Specifically, the CPU 81 starts a process at step 2400 of FIG. 24 and then proceeds toward step 2410 at a predetermined timing to determine whether or not "1" is set on at least one of the values of the following flags: the third fuel-excess-injection flag XQP3, the third fuel-deficient-injection flag XQN3, the third intake-air-excess-measurement flag XGAP3, and the third intake-air-deficient-measurement flag XGAN3. The value of the third fuel-excess-injection flag XQP3 is "1" at this moment, the CPU 81 makes the "Yes" determination at step 2410 to proceed to step 2420.

At step 2420, the CPU 81 obtains the third average value ΔNOxave3 of the NOx concentration difference by applying the value of the second NOx concentration difference ΔNOx(Qtgt2) of the first situation-determination routine and the value of the first NOx concentration difference ΔNOx(Ocon1) of the second situation-determination routine to the following formula (17).

$$\Delta NOxave3=\{\Delta NOx(Qtgt2)+\Delta NOx(Ocon1)\}/2 \quad (17)$$

After that, the CPU 81 proceeds to step 2495 so as to end this routine once.

The CPU 81 starts a process at step 2100 of FIG. 21 and then proceeds toward step 2120 through step 2110. The value of the third intake-air-excess-measurement flag XGAP3 is "1", then the CPU 81 makes the "Yes" determination at step 2120 to proceed to step 2150.

At step 2150, the CPU 81 obtains the correction amount Qc of the fuel injection amount to correct the fuel injection amount by applying the third average value ΔNOxave3 of the NOx concentration difference to the following formula (18). Regarding the formula (18), M1 represents the predetermined negative coefficient. Therefore, the correction amount Qc of the fuel injection amount will be negative number.

$$Qc=M1\cdot|\Delta NOxave3| \quad (18)$$

Next, the CPU 81 proceeds to step 2160 to add the correction amount Qc of the fuel injection amount to the target value Qtgt of the fuel injection amount. In fact, the correction amount Qc of the fuel injection amount is negative number, then the target value Qtgt of the fuel injection amount is decreased by the correction amount Qc actually.

Next, the CPU 81 proceeds to step 2170 to add (actually, subtract since the Qc is negative number) the correction amount Qc of the fuel injection amount to the accumulated value Qcsum of the correction amount and then to obtain (renew) new accumulated value Qcsum of the correction amount. The value of the obtained (renewed) accumulated value Qcsum of the correction amount is stored to the back-up RAM 84.

Next, the CPU 81 proceeds to step 2180 to set the value of the third fuel-excess-injection flag XQP3 as "0" and to set the value of the third fuel-deficient-injection flag XQN3 as "0".

Next, the CPU 81 proceeds to step 2140 to send an instruction for injecting fuel from the fuel injecting device 22 into the fuel injection cylinder in the amount of the corrected target value Qtgt. The instruction is sent to the fuel injecting device 22. That is, the fuel in the amount of the corrected target value Qtgt is injected into the fuel injection cylinder. After that, the CPU 81 proceeds to step 2195 so as to end this routine once.

As described above, when it is determined by both of the first situation-determination routine and the second situation-determination routine that "the difference in fuel injection amount is positive" (that is, the value of the third fuel-excess-injection flag XQP3 is "1"), the target value Qtgt of the fuel injection amount is corrected (decreased) by the correction amount Qc of the fuel injection amount. As a result thereof, the target value Qtgt of the fuel injection amount will get close to the target value Qtgt, and therefore the amount of the difference in intake air amount is decreased. These are the treatment carried out when it is determined by both of the first situation-determination routine and the second situation-determination routine that "the difference in fuel injection amount is positive".

(Case 3-2) In the Case that Both of the First Situation-Determination Routine and the Second Situation-Determination Routine that "the Difference in Fuel Injection Amount is Negative".

In this case, the first fuel-deficient-injection flag XQN1 is set at "1" (see case 1-4 described above) and the second fuel-deficient-injection flag XQN2 is set at "1" (see case 2-2 described above).

Therefore, in this case, the CPU 81 starts a process at step 2300 of FIG. 23 and then proceeds toward step 2320 through step 2305 and step 2310.

At step 2310, the CPU 81 determine whether or not "1" is set on the values of the following flags: the first fuel-deficient-injection flag XQN1 and the second fuel-deficient-injection flag XQN2. The value of the first fuel-deficient-injection flag XQN1 is "1" and the value of the second fuel-deficientinjection flag XQN2 is "1" at this moment, the CPU 81 makes the "No" determination at step 2320 to proceed to step 2325.

At step 2325, the CPU 81 sets the value of the third fuel-deficient-injection flag XQN3 as "1". After that, the CPU 81 proceeds to step 2395 so as to end this routine once.

Specifically, the CPU 81 starts a process at step 2400 of FIG. 24 and then proceeds toward step 2410 at a predetermined timing. The value of the third fuel-deficient-injection flag XQN3 is "1" at this moment, the CPU 81 makes the "Yes" determination at step 2410 to proceed to step 2420. the CPU 81 obtains the third average value ΔNOxave3 of the NOx concentration difference at step 2420 and proceeds to step 2495 so as to end this routine once.

The CPU 81 starts a process at step 2100 of FIG. 21 and then proceeds toward step 2120 through step 2110. The value of the third intake-air-excess-measurement flag XGAP3 is "1" according to the third precondition for default setting, then the CPU 81 makes the "No" determination at step 2120 to proceed to step 2130.

The value of the third fuel-deficient-injection flag XQN3 is "1" at this moment, then the CPU 81 makes the "Yes" determination at step 2130 to proceed to step 2190.

At step 2190, the CPU 81 obtains the correction amount Qc of the fuel injection amount to correct the fuel injection amount by applying the third average value ΔNOxave3 of the NOx concentration difference to the following formula (19). Regarding the formula (19), M2 represents the predetermined positive coefficient. Therefore, the correction amount Qc of the fuel injection amount will be positive number.

$$Qc = M2 \cdot |\Delta NOxave3| \tag{19}$$

Next, the CPU 81 proceeds to step 2160 to add the correction amount Qc of the fuel injection amount to the target value Qtgt of the fuel injection amount. In fact, the correction amount Qc of the fuel injection amount is positive number, then the target value Qtgt of the fuel injection amount is increased by the correction amount Qc actually.

Next, the CPU 81 proceeds to step 2170 to add (actually, add since the Qc is positive number) the correction amount Qc of the fuel injection amount to the accumulated value Qcsum of the correction amount and then to obtain (renew) new accumulated value Qcsum of the correction amount. The value of the obtained (renewed) accumulated value Qcsum of the correction amount is stored to the back-up RAM 84.

Next, the CPU 81 proceeds to step 2180 to set the value of the third fuel-excess-injection flag XQP3 as "0" and to set the value of the third fuel-deficient-injection flag XQN3 as "0".

Next, the CPU 81 proceeds to step 2140 to send an instruction for injecting fuel from the fuel injecting device 22 into the fuel injection cylinder in the amount of the corrected target value Qtgt. The instruction is sent to the fuel injecting device 22. That is, the fuel in the amount of the corrected target value Qtgt is injected into the fuel injection cylinder. After that, the CPU 81 proceeds to step 2195 so as to end this routine once.

As described above, when it is determined by both of the first situation-determination routine and the second situation-determination routine that "the difference in fuel injection amount is negative" (that is, the value of the third fuel-deficient-injection flag XQN3 is "1"), the target value Qtgt of the fuel injection amount is corrected (increased) by the correction amount Qc of the fuel injection amount. As a result thereof, the target value Qtgt of the fuel injection amount will get close to the target value Qtgt, and therefore the amount of the difference in intake air amount is decreased. These are the treatment carried out when it is determined by both of the first situation-determination routine and the second situation-determination routine that "the difference in fuel injection amount is negative".

(Case 3-3) In the Case that it is Determined by Both of the First Situation-Determination Routine and the Second Situation-Determination Routine that "at Least the Difference in Intake Air Amount is Positive".

In this case, the first intake-air-excess-measurement flag XGAP1 is set at "1" (see case 1-2 described above) and the second intake-air-excess-measurement flag XGAP2 is set at "1" (see case 2-4 described above).

Therefore, in this case, the CPU 81 starts a process at step 2300 of FIG. 23 and then proceeds toward step 2330 through step 2305, step 2310 and step 2320.

At step 2330, the CPU 81 determine whether or not "1" is set on the values of the following flags: the first intake-air-excess-measurement flag XGAP1 and the second intake-air-excess-measurement flag XGAP2. The value of the first intake-air-excess-measurement flag XGAP1 is "1" and the value of the second intake-air-excess-measurement flag XGAP2 is "1" at this moment, the CPU 81 makes the "Yes" determination at step 2330 to proceed to step 2335.

At step 2335, the CPU 81 sets the value of the third intake-air-excess-measurement flag XGAP3 as "1". After that, the CPU 81 proceeds to step 2395 so as to end this routine once.

And, the CPU 81 starts a process at step 2400 of FIG. 24 and then proceeds toward step 2410 at a predetermined timing. The value of the third intake-air-excess-measurement flag XGAP3 is "1" at this moment, the CPU 81 makes the "Yes" determination at step 2410 to proceed to step 2420. the CPU 81 obtains the third average value ΔNOxave3 of the NOx concentration difference at step 2420 and proceeds to step 2495 so as to end this routine once.

The CPU 81 starts a process at step 2200 of FIG. 22 and then proceeds toward step 2220 through step 2210. The value of the third intake-air-excess-measurement flag XGAP3 is "1" according to the third precondition for default setting, then the CPU 81 makes the "Yes" determination at step 2220 to proceed to step 2240.

At step 2240, the CPU 81 obtains the correction amount Gac of the intake air amount to correct the intake air amount by applying the third average value ΔNOxave3 of the NOx concentration difference to the following formula (20). Regarding the formula (20), M3 represents the predetermined negative coefficient. Therefore, the correction amount Gac of the intake air amount will be negative number.

$$Gac = M3 \cdot |\Delta NOxave3| \tag{20}$$

Next, the CPU 81 proceeds to step 2250 to add the correction amount Gac of the intake air amount to the measured value Gamsr of the intake air amount. In fact, the correction amount Gac of the intake air amount is negative number, then the measured value Gamsr of the intake air amount is decreased by the correction amount Gac actually.

Next, the CPU 81 proceeds to step 2260 to add (actually, subtract since the Gac is negative number) the correction amount Gac of the intake air amount to the accumulated value Gacsum of the correction amount and then to obtain (renew) new accumulated value Gacsum of the correction amount. The value of the obtained (renewed) accumulated value Gacsum of the correction amount is stored to the back-up RAM 84.

Next, the CPU 81 proceeds to step 2270 to set the value of the third intake-air-excess-measurement flag XGAP3 as "0" and to set the value of the third intake-air-deficient-measurement flag XGAN3 as "0". After that, the CPU 81 proceeds to step 2195 so as to end this routine once.

As described above, when it is determined by both of the first situation-determination routine and the second situation-determination routine that "at least the difference in intake air amount is positive" (that is, the value of the third intake-air-excess-measurement flag XGAP3 is "1"), the measured value Gamsr of the intake air amount is corrected (decreased) by the correction amount Gac of the intake air amount. As a result thereof, the measured value Gamsr of the intake air amount will get close to the actual value Gaact, and therefore the amount of the difference in intake air amount is decreased. These are the treatment carried out when it is determined by both of the first situation-determination routine and the second situation-determination routine that "at least the difference in intake air amount is positive".

(Case 3-4) In the Case that it is Determined by Both of the First Situation-Determination Routine and the Second Situation-Determination Routine that "at Least the Difference in Intake Air Amount is Negative".

In this case, the first intake-air-deficient-measurement flag XGAN1 is set at "1" (see case 1-3 described above) and the second intake-air-deficient-measurement flag XGAN2 is set at "1" (see case 2-1 described above).

Therefore, in this case, the CPU 81 starts a process at step 2300 of FIG. 23 and then proceeds toward step 2340 through step 2305, step 2310, step 2320 and step 2330.

At step 2340, the CPU 81 determine whether or not "1" is set on the values of the following flags: the first intake-air-deficient-measurement flag XGAN1 and the second intake-air-deficient-measurement flag XGAN2. The value of the first intake-air-deficient-measurement flag XGAN1 is "1" and the value of the second intake-air-deficient-measurement flag XGAN2 is "1" at this moment, the CPU 81 makes the "Yes" determination at step 2340 to proceed to step 2345.

At step 2345, the CPU 81 sets the value of the third intake-air-excess-measurement flag XGAP3 as "1". After that, the CPU 81 proceeds to step 2395 so as to end this routine once.

And, the CPU 81 starts a process at step 2400 of FIG. 24 and then proceeds toward step 2410 at a predetermined timing. The value of the third intake-air-deficient-measurement flag XGAN3 is "1" at this moment, the CPU 81 makes the "Yes" determination at step 2410 to proceed to step 2420. the CPU 81 obtains the third average value ΔNOxave3 of the NOx concentration difference at step 2420 and proceeds to step 2495 so as to end this routine once.

The CPU 81 starts a process at step 2200 of FIG. 22 and then proceeds toward step 2220 through step 2210. The value of the third intake-air-excess-measurement flag XGAP3 is "0" according to the third precondition for default setting, then the CPU 81 makes the "No" determination at step 2220 to proceed to step 2230.

The value of the third intake-air-deficient-measurement flag XGAN3 is "1" at this moment, then the CPU 81 makes the "Yes" determination at step 2230 to proceed to step 2280.

At step 2280, the CPU 81 obtains the correction amount Gac of the intake air amount to correct the intake air amount by applying the third average value ΔNOxave3 of the NOx concentration difference to the following formula (21). Regarding the formula (21), M4 represents the predetermined positive coefficient. Therefore, the correction amount Gac of the intake air amount will be positive number.

$$Gac = M4 \cdot |\Delta NOxave3| \quad (21)$$

Next, the CPU 81 proceeds to step 2250 to add the correction amount Gac of the intake air amount to the measured value Gamsr of the intake air amount. In fact, the correction amount Gac of the intake air amount is positive number, then the measured value Gamsr of the intake air amount is increased by the correction amount Gac actually.

Next, the CPU 81 proceeds to step 2260 to add (actually, add since the Gac is positive number) the correction amount Gac of the intake air amount to the accumulated value Gacsum of the correction amount and then to obtain (renew) new accumulated value Gacsum of the correction amount. The value of the obtained (renewed) accumulated value Gacsum of the correction amount is stored to the back-up RAM 84.

Next, the CPU 81 proceeds to step 2270 to set the value of the third intake-air-excess-measurement flag XGAP3 as "0" and to set the value of the third intake-air-deficient-measurement flag XGAN3 as "0". After that, the CPU 81 proceeds to step 2195 so as to end this routine once.

As described above, when it is determined by both of the first situation-determination routine and the second situation-determination routine that "at least the difference in intake air amount is negative" (that is, the value of the third intake-air-deficient-measurement flag XGAN3 is "1"), the measured value Gamsr of the intake air amount is corrected (increased) by the correction amount Gac of the intake air amount. As a result thereof, the measured value Gamsr of the intake air amount will get close to the actual value Gaact, and therefore the amount of the difference in intake air amount is decreased. These are the treatment carried out when it is determined by both of the first situation-determination routine and the second situation-determination routine that "at least the difference in intake air amount is negative".

(Case 3-5) In the Case that it is Determined by Both of the First Situation-Determination Routine and the Second Situation-Determination Routine that "the Difference in Intake Air Amount is Zero and the Difference in Fuel Injection Amount is Zero".

In this case, setting "zero" is done to all of the values of the flags: the value of the first fuel-excess-injection flag XQP1; the value of the first fuel-deficient-injection flag XQN1; the value of the first intake-air-excess-measurement flag XGAP1; the value of the first intake-air-deficient-measurement flag XGAN1; and the first other-abnormality-occurrence flag XOTH1 (see case 1-2 described above). Furthermore, in this case, setting "zero" is done to all of the values of the flags: the value of the second fuel-excess-injection flag XQP2; the value of the second fuel-deficient-injection flag XQN2; the value of the second intake-air-excess-measurement flag XGAP2; the value of the second intake-air-deficient-measurement flag XGAN2; and the second other-abnormality-occurrence flag XOTH2 (see case 2-5 described above).

Therefore, in this case, the CPU 81 starts a process at step 2300 of FIG. 23, and makes the "Yes" determination at step 2305 followed by step 2300 to proceed to step 2350.

The CPU 81 carries out the treatments indicated in step 2350 to step 2365 in this order. Specifically, the CPU 81 stores the following values as the following flags: "0" as the value of the third fuel-excess-injection flag XQP3 at step 2350, "0" as the value of the third fuel-deficient-injection flag XQN3 at step 2355, "0" as the value of the third intake-air-excess-measurement flag XGAP3 at step 2360, and "0" as the value of the third intake-air-deficient-measurement flag XGAN3 at step 2365. After that, the CPU 81 proceeds to step 2395 so as to end this routine once.

And, the CPU 81 starts a process at step 2400 of FIG. 24 and then proceeds toward step 2410 at a predetermined timing. According to the third precondition for default setting, setting "zero" is done at this moment to all of the values of the flags: the value of the third fuel-excess-injection flag XQP3; the value of the third fuel-deficient-injection flag XQN3; the value of the third intake-air-excess-measurement flag XGAP3; and the value of the third intake-air-deficient-measurement flag XGAN3, and therefore the CPU 81 makes the "No" determination at step 2410 to proceed to step 2495 so as to end this routine once.

And, the CPU 81 starts a process at step 2100 of FIG. 21 and then proceeds toward step 2195 so as to end this routine once, through step 2110, step 2120, step 2130 and step 2140, since the value of the third fuel-excess-injection flag XQP3 is "0" and the third fuel-deficient-injection flag XQN3 is "0".

Furthermore, the CPU 81 starts a process at step 2200 of FIG. 22 and then proceeds toward step 2295 so as to end this routine once, through step 2210, step 2220 and step 2230, since the value of the third intake-air-excess-measurement flag XGAP3 is "0" and the third intake-air-deficient-measurement flag XGAN3 is "0".

As described above, when it is determined by both of the first situation-determination routine and the second situation-determination routine that "the difference in intake air amount is zero and the difference in fuel injection amount is zero" (that is, the value of the third intake-air-excess-measurement flag XGAP3 is "0" and the value of the third intake-air-deficient-measurement flag XGAN3 is "0"), the target value Qtgt of the fuel injection amount and the measured value Gamsr of the intake air amount are not corrected. These are the treatment carried out when it is determined by both of the first situation-determination routine and the second situation-determination routine that "the difference in intake air amount is zero and the difference in fuel injection amount is zero".

(Case 3-6) In the Case that it is Determined by Both of the First Situation-Determination Routine and the Second Situation-Determination Routine that "a Difference(s) Other than the Difference in Fuel Injection Amount and the Difference in Intake Air Amount Occur(s)".

In this case, the first other-abnormality-occurrence flag XOTH1 is set at "1" (see case 1-6 described above) and the second other-abnormality-occurrence flag XOTH2 is set at "1" (see case 2-6 described above).

Therefore, in this case, the CPU 81 starts a process at step 2300 of FIG. 23 and then proceeds toward step 2370 through step 2305, step 2310, step 2320, step 2330 and step 2340.

At step 2370, the CPU 81 stores "1" as the value of the third other-abnormality-occurrence flag XOTH3. Next, the CPU 81 proceeds to step 2350 through the connecting index A. After that, the CPU 81 proceeds to step 2395 so as to end this routine once, through step 2350 to step 2365. Therefore, in this case, the value of the third fuel-excess-injection flag XQP3 is "0", the value of the third fuel-deficient-injection flag XQN3 is "0", the value of the third intake-air-excess-measurement flag XGAP3 is "0", and the value of the third intake-air-deficient-measurement flag XGAN3 is "0".

And, the CPU 81 starts a process at step 2400 of FIG. 24, and makes the "No" determination at step 2410 followed by step 2400 to proceeds to step 2495 so as to end this routine once.

And, the CPU 81 starts a process at step 2100 of FIG. 21 and then proceeds toward step 2195 so as to end this routine once, through step 2110, step 2120, step 2130 and step 2140.

Furthermore, the CPU 81 starts a process at step 2200 of FIG. 22 and then proceeds toward step 2295 so as to end this routine once, through step 2210, step 2220 and step 2230.

As described above, when it is determined by both of the first situation-determination routine and the second situation-determination routine that "a difference(s) other than the difference in fuel injection amount and the difference in intake air amount occur(s)" (that is, the value of the third other-abnormality-occurrence flag XOH3 is "1"), the target value Qtgt of the fuel injection amount and the measured value Gamsr of the intake air amount are not corrected. These are the treatment carried out when it is determined by both of the first situation-determination routine and the second situation-determination routine that "a difference(s) other than the difference in fuel injection amount and the difference in intake air amount occur(s)".

(Case 3-7) In the Case that the Result of the Determination by the First Situation-Determination Routine is Different from the Result of the Determination by the Second Situation-Determination Routine.

In this case, for example, if it is determined by the first situation-determination routine that "the difference in fuel injection amount is zero and the difference in intake air amount is zero", then it is not determined by the second situation-determination routine that "the difference in fuel injection amount is zero and the difference in intake air amount is zero". Therefore, setting "1" is done to at least one of the values of the flags: the value of the first fuel-excess-injection flag XQP1; the value of the first fuel-deficient-injection flag XQN1; the value of the first intake-air-excess-measurement flag XGAP1; the value of the first intake-air-deficient-measurement flag XGAN1; the first other-abnormality-occurrence flag XOTH1; the value of the second fuel-excess-injection flag XQP2; the value of the second fuel-deficient-injection flag XQN2; the value of the second intake-air-excess-measurement flag XGAP2; the value of the second intake-air-deficient-measurement flag XGAN2; and the second other-abnormality-occurrence flag XOTH2.

Therefore, in this case, the CPU 81 starts a process at step 2300 of FIG. 23, and makes the "No" determination at step 2305 followed by step 2305 to proceed to step 2310.

In this case 3-7, if one of the first fuel-excess-injection flag XQP1 and the second fuel-excess-injection flag XQP2 is "1", then the other of them is "0". Furthermore, if one of the first fuel-deficient-injection flag XQN1 and the second fuel-deficient-injection flag XQN2 is "1", then the other of them is "0". Additionally, if one of the first intake-air-excess-measurement flag XGAP1 and the second intake-air-excess-measurement flag XGAP2 is "1", then the other of them is "0". Still additionally, if one of the first intake-air-deficient-measurement flag XGAN1 and the second intake-air-deficient-measurement flag XGAN2 is "1", then the other of them is "0".

Therefore, the CPU 81 makes the "No" determination at all of step 2310, step 2320, step 2330 and step 2340 to proceed to step 2370.

At step 2370, the CPU 81 stores "1" as the value of the third other-abnormality-occurrence flag XOTH3, and proceeds to step 2350 through the connecting index A. Next, the CPU 81 carries out the treatments indicated in step 2350 to step 2365 in this order, and proceeds to step 2395 so as to end this routine once.

As described above, in this case 3-7, the value of the third other-abnormality-occurrence flag XOTH3 is "1", the third fuel-excess-injection flag XQP3 is "0", the third fuel-deficient-injection flag XQN3 is "0", the third intake-air-excess-measurement flag XGAP3 is "0", and the third intake-air-deficient-measurement flag XGAN3 is "0", as same as the case 3-6.

Therefore, the target value Qtgt of the fuel injection amount and the measured value Gamsr of the intake air amount are not corrected, as described in the case 3-6. These are the treatment carried out in the case that the result of the determination by the first situation-determination routine is different from the result of the determination by the second situation-determination routine.

As explained in the Case 3-1 to the Case 3-7, if the result of the determination by the first situation-determination routine "coincides with" the result of the determination by the second situation-determination routine, then corrects the measured value Gamsr of the intake air amount and the target value Qtgt of the fuel injection amount, depending on these results. On the other hand, if the result of the determination by the first situation-determination routine "is different from" the result of the determination by the second situation-determination routine, then the third device does not correct the measured value Gamsr of the intake air amount and the target value Qtgt of the fuel injection amount.

Furthermore, the CPU 81 starts a process at step 1100 of FIG. 11 and then proceeds toward step 1110 at a predetermined timing to determine whether or not the accumulated value Gacsum of the correction amount is larger than the predetermined threshold value Gacsumth.

If the accumulated value Gacsum of the correction amount is larger than the predetermined threshold value Gacsumth, then the CPU 81 makes the "Yes" determination at step 1110 to proceed to step 1120. At step 1120, the CPU 81 shows the status that "the intake air flow sensor 71 is abnormal" on the display device (not illustrated), and proceeds to step 1130.

To the contrary, if the accumulated value Gacsum of the correction amount is equal to or smaller than the predetermined threshold value Gacsumth, then the CPU 81 makes the "No" determination at step 1110 to directly proceed to step 1130. That is, the status that "the intake air flow sensor 71 is abnormal" is not shown on the display device.

At step 1130, the CPU 81 determines whether or not the accumulated value Gacsum of the correction amount is larger than a predetermined threshold value Qcsumth.

If the accumulated value Gacsum of the correction amount is larger than the predetermined threshold value Qcsumth, then the CPU 81 makes the "Yes" determination at step 1130 to proceed to step 1140. At step 1140, the CPU 81 shows the status that "the fuel injecting device 22 is abnormal" on the display device (not illustrated), and proceeds to step 1195 so as to end this routine once.

To the contrary, if the accumulated value Qcsum of the correction amount is equal to or smaller than the predetermined threshold value Qcsumth, then the CPU 81 makes the "No" determination at step 1130 to directly proceed to step 1195 so as to end this routine once. That is, the status that "the fuel injecting device 22 is abnormal" is not shown on the display device.

By the way, as described above, the value of the third fuel-excess-injection flag XQP3 and the value of the third fuel-deficient-injection flag XQN3 are re-set to "0" after the target value Qtgt of the fuel injection amount is corrected (see step 2180 in FIG. 21). Therefore, in the case, for example, that "only" the difference in fuel injection amount occurs, if the difference in fuel injection amount is not sufficiently corrected (that is, if the difference in fuel injection amount does not become zero) by the above treatments carried out at one time point, then the value of the third fuel-excess-injection flag XQP3 or the value of the third fuel-deficient-injection flag XQN3 is set to "1" again when the third situation-determination routine is carried out at another time period that is after the one time period. As a result thereof, the target value Qtgt of the fuel injection amount is also corrected at the another time period.

On the other hand, if the difference in fuel injection amount is sufficiently corrected at the one time point, then the value of the third fuel-excess-injection flag XQP3 and the value of the third fuel-deficient-injection flag XQN3 is not set to "1" when the third situation-determination routine is carried out at the another time period. As described above, in the case that "only" the difference in fuel injection amount occurs, the third device repeatedly corrects the target value Qtgt of the fuel injection amount until the difference in fuel injection amount is sufficiently decreased.

Furthermore, the value of the third intake-air-excess-measurement flag XGAP3 and the value of the third intake-air-deficient-measurement flag XGAN3 are re-set to "0" after the measured value Gamsr of the intake air amount is corrected (see step 2270 in FIG. 22). As will be appreciated from the above descriptions, in the case that "only" the difference in intake air amount occurs, the third device repeatedly corrects the measured value Gamsr of the intake air amount until the difference in intake air amount is sufficiently decreased.

On the other hand, in the case that "both" of the difference in intake air amount and the difference in fuel injection amount occur, if it is determined, for example, that "at least the difference in intake air amount occurs" at the one time point, then the value of the third intake-air-excess-measurement flag XGAP3 and the value of the third intake-air-deficient-measurement flag XGAN3 are re-set to "0" after the measured value Gamsr of the intake air amount is corrected. If the difference in intake air amount is not sufficiently corrected by this correction, then it is determined that "at least the difference in intake air amount occurs" again at the another time point, and the measured value Gamsr of the intake air amount is corrected.

On the other hand, if the difference in intake air amount is sufficiently corrected by the correction carried out at the one time point, then it is determined that "the difference in fuel injection amount occurs" at the another time point, and the target value Qtgt of the fuel injection amount is corrected. After that, the target value Qtgt of the fuel injection amount will be repeatedly corrected until the difference in fuel injection amount is sufficiently decreased.

As described above, the third device repeatedly carries out the correction until the difference in fuel injection amount and the difference in intake air amount is sufficiently decreased, either in the case that "one" of the difference in intake air amount and the difference in fuel injection amount occurs or "both" of them occur.

<Function and Effect of the Device>

The third device determines the situation of the difference in fuel injection amount and the situation of the difference in intake air amount based on "both" of the results of the determination by the first situation-determination routine and the second situation-determination routine. Therefore, the third device can determine these situations more accurately compared with the determination carried out by "one" of the results of the determination by the first situation-determination routine and the second situation-determination routine.

By the way, as described above, the control device of the first embodiment to the third embodiment is configured to determine whether at least one of the difference in fuel injection amount and the difference in intake air amount is zero, positive or negative, and corrects at least one of the target value Qtgt of the fuel injection amount and the measured value Gamsr of the intake air amount depending on the result of the determination. That is, if at least one of the difference in fuel injection amount and the difference in intake air amount is "other than zero", then the control device of the embodiments correct at least one of the target value Qtgt of the fuel injection amount and the measured value Gamsr of the intake air amount.

However, in the case that it can be accepted from the view point of decreasing the amount of the emissions that at least one of the difference in fuel injection amount and the difference in intake air amount is "a value within a predetermined range that includes zero", the control device of the present invention may be configured to determine that whether the at least one of the difference in fuel injection amount and the difference in intake air amount is "a value within the predetermined range that includes zero", "a value larger than the maximum value in the predetermined range" or "a value smaller than the minimum value in the predetermined range".

Such control device can be prepared by changing the above routine: such as changing the routine in FIG. 9 so that it is determined "whether or not the value of the first NOx concentration difference $\Delta$NOx(Qtgt1) is larger than the value of the second NOx concentration difference $\Delta$NOx(Qtgt2) by 'a predetermined value or more'" at step 816, "whether or not the value of the first NOx concentration difference $\Delta$NOx (Qtgt1) is smaller than the value of the second NOx concentration difference $\Delta$NOx(Qtgt2) by 'a predetermined value or more'" at step 824, "whether or not the value of the first NOx concentration difference $\Delta$NOx(Qtgt1) is 'within a predetermined range that includes zero' and the value of the second NOx concentration difference $\Delta$NOx(Qtgt2) is 'within a predetermined range that includes zero'" at step 832. Furthermore, such control device can be prepared by changing the above routine: such as changing the routine in FIG. 9 so that it is determined "whether or not the value of the second NOx concentration difference $\Delta$NOx(Qtgt2) is 'larger than a predetermined value'" at step 818 and step 826.

Additionally, Such control device can be prepared by changing the above routine: such as changing the routine in FIG. 19 so that it is determined "whether or not the value of the first NOx concentration difference $\Delta$NOx(Ocon1) is larger than the value of the second NOx concentration difference $\Delta$NOx(Ocon2) by 'a predetermined value or more'" at step 1816, "whether or not the value of the first NOx concentration difference $\Delta$NOx(Ocon1) is smaller than the value of the second NOx concentration difference $\Delta$NOx(Ocon2) by 'a predetermined value or more'" at step 1824, "whether or not the value of the first NOx concentration difference $\Delta$NOx (Ocon1) is 'within a predetermined range that includes zero' and the value of the second NOx concentration difference $\Delta$NOx(Ocon2) is 'within a predetermined range that includes zero'" at step 1832. Furthermore, such control device can be prepared by changing the above routine: such as changing the routine in FIG. 19 so that it is determined "whether or not the value of the second NOx concentration difference $\Delta$NOx (Ocon1) is 'larger than a predetermined value'" at step 1818 and step 1826.

By the way, as will be presumed from the first relationship R1(Qtgt, $\Delta$NOx) indicated in FIG. 2, there may be "a target value Qtgt of the fuel injection amount where the difference in fuel injection amount does not substantially affect the NOx concentration difference $\Delta$NOx". In other words, there may be a fuel injection amount where it is presumed that "the NOx concentration difference $\Delta$NOx is zero or a value within a predetermined range that includes zero, even when the difference in intake air amount is zero or a value within a predetermined range but the difference in fuel injection amount is not zero or a value within a predetermined range". Hereinafter, this fuel injection amount is referred to as "singularity fuel injection amount" for convenience.

In the case that the NOx concentration difference $\Delta$NOx occurs when the target value Qtgt of the fuel injection amount is "the singularity fuel injection amount", if it has been confirmed in advance that a difference(s) other than the difference in fuel injection amount and the difference in intake air amount occur(s) does not occur, then it can be determined unambiguously that this NOx concentration difference $\Delta$NOx is due to "the difference in intake air amount". That is, in this case, the situation determination can be carried out "only" based on the NOx concentration difference $\Delta$NOx when the target value Qtgt of the fuel injection amount is the predetermined value (the singularity fuel injection amount), without using "the amount of change of the NOx concentration difference $\Delta$NOx when the target value Qtgt of the fuel injection amount increases", which is used in the first embodiment.

Furthermore, as same as the above, there may be "a target value Qtgt of the fuel injection amount where the difference in intake air amount does not substantially affect the NOx concentration difference $\Delta$NOx". In other words, there may be a fuel injection amount where it is presumed that "the NOx concentration difference $\Delta$NOx is zero or a value within a predetermined range that includes zero, even when the difference in fuel injection amount is zero or a value within a predetermined range but the difference in intake air amount is not zero or a value within a predetermined range". As same as the above, if it has been confirmed in advance that a difference(s) other than the difference in fuel injection amount and the difference in intake air amount occur(s) does not occur, the situation determination can be carried out by using this fuel injection amount, without using "the amount of change of the NOx concentration difference $\Delta$NOx when the target value Qtgt of the fuel injection amount increases".

Such control device can be prepared by changing the above routine: such as changing the routine in FIG. 9 so as to delete step 816, step 824, step 832 and step 842.

Additionally, as will be presumed from the second relationship R2(Ocon, $\Delta$NOx) indicated in FIG. 12, there may be "an intake oxygen concentration Ocon where the difference in fuel injection amount does not substantially affect the NOx concentration difference $\Delta$NOx". In other words, there may be an intake oxygen concentration where it is presumed that "the NOx concentration difference $\Delta$NOx is zero or a value within a predetermined range that includes zero, even when the difference in intake air amount is zero or a value within a predetermined range but the difference in fuel injection amount is not zero or a value within a predetermined range". Hereinafter, this intake oxygen concentration is referred to as "singularity intake oxygen concentration" for convenience.

In the case that the NOx concentration difference $\Delta$NOx occurs when the intake oxygen concentration Ocon is "the singularity intake oxygen concentration", if it has been confirmed in advance that a difference(s) other than the difference in fuel injection amount and the difference in intake air amount occur(s) does not occur, then it can be determined unambiguously that this NOx concentration difference $\Delta$NOx is due to "the difference in intake air amount". That is, in this case, the situation determination can be carried out "only" based on the NOx concentration difference $\Delta$NOx when the intake oxygen concentration Ocon is the predetermined value (the singularity intake oxygen concentration), without using "the amount of change of the NOx concentration difference $\Delta$NOx when the intake oxygen concentration Ocon increases", which is used in the second embodiment.

Furthermore, as same as the above, there may be "an intake oxygen concentration Ocon where the difference in intake air amount does not substantially affect the NOx concentration difference $\Delta$NOx". In other words, there may be an intake oxygen concentration where it is presumed that "the NOx concentration difference $\Delta$NOx is zero or a value within a predetermined range that includes zero, even when the difference in fuel injection amount is zero or a value within a predetermined range but the difference in intake air amount is not zero or a value within a predetermined range". As same as the above, if it has been confirmed in advance that a difference(s) other than the difference in fuel injection amount and the difference in intake air amount occur(s) does not occur, the situation determination can be carried out by using this intake oxygen concentration, without using "the amount of change of the NOx concentration difference ΔNOx when the intake oxygen concentration Ocon increases".

Such control device can be prepared by changing the above routine: such as changing the routine in FIG. 19 so as to delete step 1816, step 1824, step 1832 and step 1842.

<General Overview of Embodiments>

As explained above, the control devices according to the first embodiment to the third embodiment comprises:

a means for determining a target value Qtgt of fuel injection amount based on an operating condition of the internal combustion engine, the fuel injection amount being an amount of fuel injected in a cylinder of the internal combustion engine (the routines in FIG. 5, FIG. 16 and FIG. 21);

a means for obtaining a parameter relevant to intake oxygen concentration to obtain a measured value, an estimated value or a target value (the measured value Gamsr in the first embodiment to the third embodiment) of the parameter relevant to intake oxygen concentration Gamsr, the intake oxygen concentration Ocon being an oxygen concentration of gas introduced into the cylinder (the routines in FIG. 6, FIG. 17 and FIG. 22);

a means for obtaining the intake oxygen concentration Ocon based on the parameter relevant to intake oxygen concentration Gamsr (step 808 in FIG. 8 and step 1808 in FIG. 18);

a means for obtaining NOx concentration to obtain a measured value or an estimated value of NOx concentration (the measured value NOxmsr in the first embodiment to the third embodiment), the NOx concentration being a concentration of nitrogen oxide (step 804 in FIG. 8 and step 1808 in FIG. 18); and a means for determining situations (the routines in FIG. 8 and FIG. 9, and the routines in FIG. 18 and FIG. 19) to determine at least one of:

whether a difference in fuel injection amount is zero, positive or negative, the difference in fuel injection amount is a relative difference of an actual value Qact of the fuel injection amount in reference to the target value Qtgt thereof;

whether the difference in fuel injection amount is a value within a predetermined range including zero, a value larger than the maximum value in the predetermined range or a value smaller than the minimum value in the predetermined range;

whether a difference in the parameter relevant to intake oxygen concentration is zero, positive or negative, the difference in the parameter relevant to intake oxygen concentration is a relative difference of the measured value, the estimated value or the target value Gamsr of the parameter in reference to an actual value Gaact thereof; or whether the difference in the parameter relevant to intake oxygen concentration is a value within a predetermined range including zero, a value larger than the maximum value in the predetermined range or a value smaller than the minimum value in the predetermined range, based on at least one of the following indications:

a first indication including: an amount of change of NOx concentration difference ΔNOx with an increasing amount of the target value Qtgt of the fuel injection amount within a predetermined range (Qtgt1≤Qtgt≤Qtgt2, in the first embodiment), the NOx concentration difference ΔNOx is a relative difference of the measured value or the estimated value NOxmsr of the NOx concentration in reference to a predetermined NOx referential concentration NOxref; and the NOx concentration difference ΔNOx(Qtgt2) upon the target value Qtgt of fuel injection amount is a predetermined first value (Qtgt2 in the first embodiment); and a second indication including: an amount of change of NOx concentration difference ΔNOx with an increasing amount of the intake oxygen concentration Ocon within a predetermined range (Ocon1≤Ocon≤Ocon2, in the second embodiment); and the NOx concentration difference ΔNOx (Ocon1) upon the intake oxygen concentration Ocon is a predetermined second value (Ocon1 in the second embodiment).

Furthermore, the control devices according to the first embodiment to the third embodiment may be configured to carry out the situation determination without using "the amount of change of NOx concentration difference ΔNOx with an increasing amount of the target value Qtgt of the fuel injection amount" and "the amount of change of NOx concentration difference ΔNOx with an increasing amount of the intake oxygen concentration Ocon".

Specifically, the control devices according to the above embodiments may be configured to comprise:

a means for determining a target value Qtgt of fuel injection amount based on an operating condition of the internal combustion engine (the routines in FIG. 5, FIG. 16 and FIG. 21);

a means for obtaining a parameter relevant to intake oxygen concentration Gamsr to obtain a measured value, an estimated value or a target value (the measured value Gamsr in the first embodiment to the third embodiment) of a parameter relevant to intake oxygen concentration Gamsr (the routines in FIG. 6, FIG. 17 and FIG. 22);

a means for obtaining the intake oxygen concentration Ocon based on the parameter relevant to intake oxygen concentration Gamsr (step 808 in FIG. 8 and step 1808 in FIG. 18);

a means for obtaining NOx concentration to determine a measured value or an estimated value (the measured value NOxmsr in the first embodiment to the third embodiment) of NOx concentration (step 804 in FIG. 8 and step 1808 in FIG. 18); and a means for determining situations (the routine obtained by deleting step 816, step 824, step 832 and step 842 from the routines in FIG. 9, and the routines by deleting step 1816, step 1824, step 1832 and step 1842 from the routine in FIG. 19) to determine at least one of:

whether a difference in fuel injection amount is zero, positive or negative, the difference in fuel injection amount is a relative difference of an actual value Qact of the fuel injection amount in reference to the target value Qtgt thereof;

whether the difference in fuel injection amount is a value within a predetermined range including zero, a value larger than the maximum value in the predetermined range or a value smaller than the minimum value in the predetermined range;

whether a difference in the parameter relevant to intake oxygen concentration is zero, positive or negative, the difference in the parameter relevant to intake oxygen concentration is a relative difference of the measured value, the estimated value or the target value Gamsr of the parameter in reference to an actual value Gaact thereof; or whether the difference in the parameter relevant to intake oxygen concentration is a value within a predetermined range including zero, a value larger than the maximum value in the predetermined range or a value smaller than the minimum value in the predetermined range, based on at least one of the following indications:

a first indication including a NOx concentration difference ΔNOx upon the target value Qtgt of fuel injection amount is a predetermined first value (the singularity fuel injection amount), the NOx concentration difference ΔNOx is a relative difference of the measured value or the estimated value NOxmsr of the NOx concentration in reference to a predetermined NOx referential concentration NOxref; and a second indication including the NOx concentration difference ΔNOx upon the intake oxygen concentration Ocon is a predetermined second value (the singularity intake oxygen concentration), the first value is employed to be at least one of: the fuel injection amount (the singularity fuel injection amount) estimated to allow the NOx concentration difference ΔNOx to be zero or the value within the predetermined range upon the difference in the parameter relevant to intake oxygen concentration is zero or the value within the predetermined range and the difference in fuel injection amount is not zero or the value within the predetermined range; and the fuel injection amount estimated to allow the NOx concentration difference ΔNOx to be zero or the value within the predetermined range upon the difference in fuel injection amount is zero or the value within the predetermined range and the difference in the parameter relevant to intake oxygen concentration is not zero or the value within the predetermined range, the second value is employed to be at least one of: the intake oxygen concentration (the singularity intake oxygen concentration) estimated to allow the NOx concentration difference ΔNOx to be zero or the value within the predetermined range upon the difference in the parameter relevant to intake oxygen concentration is zero or the value within the predetermined range and the difference in fuel injection amount is not zero or the value within the predetermined range; and the intake oxygen concentration Ocon estimated to allow the NOx concentration difference ΔNOx to be zero or the value within the predetermined range upon the difference in fuel injection amount is zero or the value within the predetermined range and the difference in the parameter relevant to intake oxygen concentration is not zero or the value within the predetermined range.

Furthermore, the control devices according to the above embodiments is configured to comprise a means for correcting values (the routines in FIG. 5 and FIG. 6 according to the first embodiment, the routines in FIG. 16 and FIG. 17 according to the second embodiment, and the routines in FIG. 21 and FIG. 22 according to the third embodiment) so as to:

decrease the target value Qtgt of the fuel injection amount by a first correction amount Qc upon being determined as the difference in fuel injection amount is positive or a value larger than the maximum value in the predetermined range;

increase the target value Qtgt of fuel injection amount by a second correction amount Qc upon being determined as the difference in fuel injection amount is negative or a value smaller than the minimum value in the predetermined range;

decrease the measured value, the estimated value or the target value of the parameter relevant to intake oxygen concentration Gamsr by a third correction amount Gac upon being determined as the difference in the parameter relevant to intake oxygen concentration is positive or a value larger than the maximum value in the predetermined range; and increase the measured value, the estimated value or the target value of the parameter relevant to intake oxygen concentration Gamsr by a fourth correction amount Gac upon being determined as the difference in the parameter relevant to intake oxygen concentration is negative or a value smaller than the minimum value in the predetermined range.

Additionally, in the control device according to the embodiment (the third embodiment), the means for determining situations is configured so as to determine at least one of:

whether the difference in fuel injection amount is zero, positive or negative;

whether the difference in fuel injection amount is a value within a predetermined range including zero, a value larger than the maximum value in the predetermined range or a value smaller than the minimum value in the predetermined range;

whether the difference in the parameter relevant to intake oxygen concentration is zero, positive or negative; or whether the difference in the parameter relevant to intake oxygen concentration is a value within a predetermined range including zero, a value larger than the maximum value in the predetermined range or a value smaller than the minimum value in the predetermined range, based on both of the first indication and the second indication (the routine in FIG. 23).

More additionally, in the control devices according to the above embodiments, the means for correcting values is configured so as to determine amounts of the first correction amount Qc, the second correction amount Qc, the third correction amount Gac and the fourth correction amount Gac depending on an amount of the NOx concentration difference ΔNOx.

Furthermore, in the control devices according to the above embodiments, the means for correcting values is configured so as to:

repeatedly correct the target value Qtgt of the fuel injection amount until being determined as the difference in fuel injection amount being zero or a value within the predetermined range; and repeatedly correct the measured value, the estimated value or the target value of the parameter relevant to intake oxygen concentration Gamsr until being determined as the difference in the parameter relevant to intake oxygen concentration being zero or a value within the predetermined range (the combination of step 580 in FIG. 5 and FIG. 10, the combination of step 1680 in FIG. 16 and FIG. 19, and the combination of step 2180 in FIG. 21 and FIG. 23).

Additionally, the control devices according to the above embodiments comprises a means for determining abnormality (the routine in FIG. 11) to determine at least one of: whether or not the fuel is normally injected; and whether or not the measured value, the estimated value or the target value of the parameter relevant to intake oxygen concentration Gamsr is normally obtained, the means for determining abnormality is configured so as to:

determine as the fuel is not normally injected upon at least one of the first correction amount Qc and the second correction amount Qc is larger than a predetermined threshold value Qcsumth; and determine as the measured value, the estimated value or the target value of the parameter relevant to intake oxygen concentration Gamsr is not normally obtained upon at least one of the third correction amount Gac and the fourth correction amount Gac is larger than a predetermined threshold value Gacsumth.

Specifically, the means for determining abnormality (the routine in FIG. 11) is configured so as to accumulate:

the first correction amount Qc every time the target value Qtgt of the fuel injection amount is corrected;

the second correction amount Qc every time the target value Qtgt of the fuel injection amount is corrected;

the third correction amount Gac every time the measured value, the estimated value or the target value of the parameter relevant to intake oxygen concentration Gamsr is corrected; and the fourth correction amount Gac every time the measured value, the estimated value or the target value of the parameter relevant to intake oxygen concentration Gamsr is corrected, the means for determining abnormality is configured so as to:

determine as the fuel is not normally injected upon at least one of the accumulated value Qcsum of the first correction amount Qc and the accumulated value Qcsum of the second correction amount Qc is larger than a predetermined threshold value Qcsumth; and determine as the measured value, the estimated value or the target value of the parameter relevant to intake oxygen concentration Gamsr is not normally obtained upon at least one of the accumulated value Gacsum of the third correction amount Gac and the accumulated value Gacsum of the fourth correction amount Gac is larger than a predetermined threshold value Gacsumth.

In addition, as described above, in the control devices according to the above embodiments, the means for obtaining the parameter relevant to intake oxygen concentration Gamsr is configured so as to employ an intake air amount Ga as one of the parameter relevant to intake oxygen concentration. The intake air amount is an amount of air introduced into the internal combustion engine (the routines in FIG. 6, FIG. 17 and FIG. 22).

Furthermore, in the control devices according to the above embodiments, it is configured that the first value Qtgt2 and the second value Ocon1 is determined by using the model for estimating NOx concentration (see the formula (5)).

While the invention has been described in detail by referring to the specific embodiments, it is apparent that various modifications or corrections may be made by the person skilled in the art without departing from the spirit and the scope of the invention.

For example, the control devices according to the above embodiments obtain the NOx referential concentration based on "the relationship (map) between the operating conditions of the engine 10 and the NOx concentration, which is defined in advance". However, the control device according to the present invention may be configured to determine the NOx referential concentration by using the "model for estimating NOx concentration".

Furthermore, the control devices according to the above embodiments determine the NOx concentration difference based on the NOx referential concentration NOxref and the measured value NOxmsr of the NOx concentration. However, the control device according to the present invention may be configured to determine the NOx concentration difference ΔNOx based on the NOx referential concentration NOxref and an "estimated value" of the NOx concentration.

Additionally, the control devices according to the above embodiments employ the "intake air amount" as the parameter relevant to intake oxygen concentration. However, the control device according to the present invention may be configured to employ, as the parameter relevant to intake oxygen concentration, at least one of the fuel injection amount, the engine rotation speed, the pressure of gas in the intake passage, the pressure of gas in the exhaust passage, the fuel injection timing, the EGR ratio, and the output value of the device for the measurement of the intake oxygen concentration. Then, the situation determination is carried out by using the measured value, the estimated value or the target value of them.

Furthermore, the control devices according to the above embodiments employ the maximum value (Qtgt2) of the predetermined range (Qtgt1≤Qtgt≤Qtgt2) as the "first value" according to the first indication. However, the first value is not limited to this value. For example, the control device according to the present invention may be configured to employ any value included in the predetermined range as the "first value". Furthermore, the control device according to the present invention may be configured to employ a value that is not included in the predetermined range if the value is an appropriate value to carry out the determination, as the "first value".

Furthermore, the control device according to the present invention may be configured to employ, as the "first value", "a fuel injection amount estimated to allow the NOx concentration difference to be zero or the value within the predetermined range when the difference in the parameter relevant to intake oxygen concentration is zero or the value within the predetermined range and the difference in fuel injection amount is not zero or the value within the predetermined range". When this value is employed as the "first value", the difference in fuel injection amount does not substantially affect the NOx concentration difference, and therefore the situation of the difference in parameter relevant to intake oxygen concentration can be determined more appropriately.

Furthermore, the control device according to the present invention may be configured to employ, as the "first value", "a fuel injection amount estimated to allow the NOx concentration difference to be zero or the value within the predetermined range when the difference in fuel injection amount is zero or the value within the predetermined range and the difference in the parameter relevant to intake oxygen concentration is not zero or the value within the predetermined range". When this value is employed as the "first value", the difference in parameter relevant to intake oxygen concentration does not substantially affect the NOx concentration difference, and therefore the situation of the difference in parameter relevant to intake oxygen concentration can be determined more appropriately.

Additionally, the control devices according to the above embodiments employ the minimum value (Ocon1) of the predetermined range (Ocon1≤Ocon≤Ocon2) as the "second value" according to the second indication. However, the second value is not limited to this value. For example, the control device according to the present invention may be configured to employ any value included in the predetermined range as the "second value". Furthermore, the control device according to the present invention may be configured to employ even a value that is not included in the predetermined range if the value is an appropriate value to carry out the determination, as the "second value".

Additionally, the control device according to the present invention may be configured to employ, as the "second value", "an intake oxygen concentration estimated to allow the NOx concentration difference to be zero or the value within the predetermined range when the difference in the parameter relevant to intake oxygen concentration is zero or the value within the predetermined range and the difference in fuel injection amount is not zero or the value within the predetermined range". When this value is employed as the "second value", the difference in fuel injection amount does not substantially affect the NOx concentration difference, and therefore the situation of the difference in parameter relevant to intake oxygen concentration can be determined more appropriately.

Furthermore, the control device according to the present invention may be configured to employ, as the "second value", "an intake oxygen concentration estimated to allow the NOx concentration difference to be zero or the value within the predetermined range when the difference in fuel injection amount is zero or the value within the predetermined range and the difference in the parameter relevant to intake oxygen concentration is not zero or the value within the predetermined range". When this value is employed as the "second value", the difference in parameter relevant to intake oxygen concentration does not substantially affect the NOx concentration difference, and therefore the situation of the difference in parameter relevant to intake oxygen concentration can be determined more appropriately.

Additionally, the control devices according to the above embodiments determine the correction amount of the fuel injection amount and the correction amount of the intake air amount based on "the average value of the first NOx concentration difference and the second NOx concentration difference". However, the control device according to the present invention may be configured to determine these correction amounts based on "one of the average value of the first NOx concentration difference and the second NOx concentration difference". Furthermore, the control device according to the present invention may be configured to determine these correction amounts based on the model for estimating NOx concentration. Still furthermore, the control device according to the present invention may be configured to determine these correction amounts based on "a relationship (map) between the amount of the NOx concentration difference and the correction amounts, which is defined in advance".

Furthermore, the control devices according to the above embodiments is configured to carry out the situation determination based on "only" the amount of change of the NOx concentration difference and the amount of the NOx concentration difference. However, the control device according to the present invention may be configured to determine the amount of change of the NOx concentration difference and the amount of the NOx concentration difference, and "other" parameters (i.e., parameters other than them) that may affect the above determination.

The invention claimed is:

1. A control device for internal combustion engine, the control device being configured to:
   determine a target value of fuel injection amount based on an operating condition of the internal combustion engine, the fuel injection amount being an amount of fuel injected in a cylinder of the internal combustion engine;
   obtain a measured value, an estimated value of a target value of a parameter relevant to intake oxygen concentration, the intake oxygen concentration being an oxygen concentration of gas introduced into the cylinder;
   obtain the intake oxygen concentration based on the parameter relevant to intake oxygen concentration;
   obtain a measured value or an estimated value of NOx concentration of gas discharged from the cylinder, the NOx concentration being a concentration of nitrogen oxide; and
   determine at least one of the following situations:
   whether a difference in fuel injection amount being zero, positive or negative, the difference in fuel injection amount being a relative difference of an actual value of the fuel injection amount in reference to the target value thereof;
   whether the difference in fuel injection amount being a value within a predetermined range including zero, a value larger than the maximum value in the predetermined range or a value smaller than the minimum value in the predetermined range;
   whether a difference in the parameter relevant to intake oxygen concentration being zero, positive or negative, the difference in the parameter relevant to intake oxygen concentration being a relative difference of the measured value, the estimated value or the target value of the parameter in reference to an actual value thereof; or
   whether the difference in the parameter relevant to intake oxygen concentration being a value within a predetermined range including zero, a value larger than the maximum value in the predetermined range or a value smaller than the minimum value in the predetermined range,
   based on at least one of the following indications:
   a first indication including: an amount of change of NOx concentration difference with an increasing amount of the target value of the fuel injection amount within a predetermined range, the NOx concentration difference being a relative difference of the measured value or the estimated value of the NOx concentration in reference to a predetermined NOx referential concentration; and the NOx concentration difference upon the target value of fuel injection amount being a predetermined first value; and
   a second indication including: an amount of change of NOx concentration difference with an increasing amount of the intake oxygen concentration within a predetermined range; and the NOx concentration difference upon the intake oxygen concentration being a predetermined second value.

2. The control device according to claim 1,
   wherein the control device is configured to correct the following values so as to:
   decrease the target value of the fuel injection amount by a first correction amount upon being determined as the difference in fuel injection amount being positive or a value larger than the maximum value in the predetermined range;
   increase the target value of fuel injection amount by a second correction amount upon being determined as the difference in fuel injection amount being negative or a value smaller than the minimum value in the predetermined range;
   decrease the measured value, the estimated value or the target value of the parameter relevant to intake oxygen concentration by a third correction amount upon being determined as the difference in the parameter relevant to intake oxygen concentration being positive or a value larger than the maximum value in the predetermined range; and
   increase the measured value, the estimated value or the target value of the parameter relevant to intake oxygen concentration by a fourth correction amount upon being determined as the difference in the parameter relevant to intake oxygen concentration being negative or a value smaller than the minimum value in the predetermined range.

3. The control device according to claim 2,
   wherein the control device is configured so as to determine amounts of the first correction amount, the second correction amount, the third correction amount and the fourth correction amount depending on an amount of the NOx concentration difference.

4. The control device according to claim 2,
wherein the control device is configured so as to:
repeatedly correct the target value of the fuel injection amount until being determined as the difference in fuel injection amount being zero or a value within the predetermined range; and
repeatedly correct the measured value, the estimated value or the target value of the parameter relevant to intake oxygen concentration until being determined as the difference in the parameter relevant to intake oxygen concentration being zero or a value within the predetermined range.

5. The control device according to claim 4,
wherein the control device is configured so as to accumulate:
the first correction amount every time the target value of the fuel injection amount being corrected;
the second correction amount every time the target value of the fuel injection amount being corrected;
the third correction amount every time the measured value, the estimated value or the target value of the parameter relevant to intake oxygen concentration being corrected; and
the fourth correction amount every time the measured value, the estimated value or the target value of the parameter relevant to intake oxygen concentration being corrected,
the control device being configured so as to:
determine as the fuel not being normally injected upon at least one of the accumulated value of the first correction amount and the accumulated value of the second correction amount being larger than a predetermined threshold value; and
determine as the measured value, the estimated value or the target value of the parameter relevant to intake oxygen concentration not being normally obtained upon at least one of the accumulated value of the third correction amount and the accumulated value of the fourth correction amount being larger than a predetermined threshold value.

6. The control device according to claim 2,
wherein the control device is configured to determine at least one of: whether or not the fuel being normally injected; and whether or not the measured value, the estimated value or the target value of the parameter relevant to intake oxygen concentration being normally obtained,
the control device being configured so as to:
determine as the fuel not being normally injected upon at least one of the first correction amount and the second correction amount being larger than a predetermined threshold value; and
determine as the measured value, the estimated value or the target value of the parameter relevant to intake oxygen concentration not being normally obtained upon at least one of the third correction amount and the fourth correction amount being larger than a predetermined threshold value.

7. The control device according to claim 1,
wherein the control device is configured so as to determine at least one of the following situations:
whether the difference in fuel injection amount being zero, positive or negative;
whether the difference in fuel injection amount being a value within a predetermined range including zero, a value larger than the maximum value in the predetermined range or a value smaller than the minimum value in the predetermined range;
whether the difference in the parameter relevant to intake oxygen concentration being zero, positive or negative; or
whether the difference in the parameter relevant to intake oxygen concentration being a value within a predetermined range including zero, a value larger than the maximum value in the predetermined range or a value smaller than the minimum value in the predetermined range,
based on both of the first indication and the second indication.

8. The control device according to claim 1,
wherein he control device is configured so as to employ:
at least one of: the fuel injection amount estimated to allow the NOx concentration difference to be zero or the value within the predetermined range upon the difference in the parameter relevant to intake oxygen concentration being zero or the value within the predetermined range and the difference in fuel injection amount not being zero or the value within the predetermined range; and the fuel injection amount estimated to allow the NOx concentration difference to be zero or the value within the predetermined range upon the difference in fuel injection amount being zero or the value within the predetermined range and the difference in the parameter relevant to intake oxygen concentration not being zero or the value within the predetermined range, as the first value; and
at least one of: the intake oxygen concentration estimated to allow the NOx concentration difference to be zero or the value within the predetermined range upon the difference in the parameter relevant to intake oxygen concentration being zero or the value within the predetermined range and the difference in fuel injection amount not being zero or the value within the predetermined range; and the intake oxygen concentration estimated to allow the NOx concentration difference to be zero or the value within the predetermined range upon the difference in fuel injection amount being zero or the value within the predetermined range and the difference in the parameter relevant to intake oxygen concentration not being zero or the value within the predetermined range, as the second value.

9. The control device according to claim 1,
wherein the control device is configured so as to employ an intake air amount as one of the parameter relevant to intake oxygen concentration, the intake air amount being an amount of air introduced into the internal combustion engine.

10. The control device according to claim 1,
wherein the NOx referential concentration is determined by using a model for estimating NOx concentration, the model for estimating NOx concentration being configured so as to estimate the NOx concentration based on the fuel injection amount and the intake oxygen concentration.

11. The control device according to claim 10,
wherein the first value and the second value are determined by using the model for estimating NOx concentration.

12. A control device for internal combustion engine, the control device being configured to:
determine a target value of fuel injection amount based on an operating condition of the internal combustion engine, the fuel injection amount being an amount of fuel injected in a cylinder of the internal combustion engine;

obtain a measured value, an estimated value or a target value of a parameter relevant to intake oxygen concentration, the intake oxygen concentration being an oxygen concentration of gas introduced into the cylinder;

obtain the intake oxygen concentration based on the parameter relevant to intake oxygen concentration;

obtain a measured value or an estimated value of NOx concentration of gas discharged from the cylinder, the NOx concentration being a concentration of nitrogen oxide; and determine at least one of the following situations:

whether a difference in fuel injection amount being zero, positive or negative, the difference in fuel injection amount being a relative difference of an actual value of the fuel injection amount in reference to the target value thereof;

whether the difference in fuel injection amount being a value within a predetermined range including zero, a value larger than the maximum value in the predetermined range or a value smaller than the minimum value in the predetermined range;

whether a difference in the parameter relevant to intake oxygen concentration being zero, positive or negative, the difference in the parameter relevant to intake oxygen concentration being a relative difference of the measured value, the estimated value or the target value of the parameter in reference to an actual value thereof; or whether the difference in the parameter relevant to intake oxygen concentration being a value within a predetermined range including zero, a value larger than the maximum value in the predetermined range or a value smaller than the minimum value in the predetermined range, based on at least one of the following indications:

a first indication including a NOx concentration difference upon the target value of fuel injection amount being a predetermined first value, the NOx concentration difference being a relative difference of the measured value or the estimated value of the NOx concentration in reference to a predetermined NOx referential concentration; and a second indication including the NOx concentration difference upon the intake oxygen concentration being a predetermined second value, the first value being employed to be at least one of: the fuel injection amount estimated to allow the NOx concentration difference to be zero or the value within the predetermined range upon the difference in the parameter relevant to intake oxygen concentration being zero or the value within the predetermined range and the difference in fuel injection amount not being zero or the value within the predetermined range; and the fuel injection amount estimated to allow the NOx concentration difference to be zero or the value within the predetermined range upon the difference in fuel injection amount being zero or the value within the predetermined range and the difference in the parameter relevant to intake oxygen concentration not being zero or the value within the predetermined range, the second value being employed to be at least one of: the intake oxygen concentration estimated to allow the NOx concentration difference to be zero or the value within the predetermined range upon the difference in the parameter relevant to intake oxygen concentration being zero or the value within the predetermined range and the difference in fuel injection amount not being zero or the value within the predetermined range; and the intake oxygen concentration estimated to allow the NOx concentration difference to be zero or the value within the predetermined range upon the difference in fuel injection amount being zero or the value within the predetermined range and the difference in the parameter relevant to intake oxygen concentration not being zero or the value within the predetermined range.

13. The control device according to claim 12, wherein the control device is configured to correct the following values so as to:

decrease the target value of the fuel injection amount by a first correction amount upon being determined as the difference in fuel injection amount being positive or a value larger than the maximum value in the predetermined range;

increase the target value of fuel injection amount by a second correction amount upon being determined as the difference in fuel injection amount being negative or a value smaller than the minimum value in the predetermined range;

decrease the measured value, the estimated value or the target value of the parameter relevant to intake oxygen concentration by a third correction amount upon being determined as the difference in the parameter relevant to intake oxygen concentration being positive or a value larger than the maximum value in the predetermined range; and increase the measured value, the estimated value or the target value of the parameter relevant to intake oxygen concentration by a fourth correction amount upon being determined as the difference in the parameter relevant to intake oxygen concentration being negative or a value smaller than the minimum value in the predetermined range.

14. The control device according to claim 13, wherein the control device is configured so as to determine amounts of the first correction amount, the second correction amount, the third correction amount and the fourth correction amount depending on an amount of the NOx concentration difference.

15. The control device according to claim 13, wherein the control device is configured so as to:

repeatedly correct the target value of the fuel injection amount until being determined as the difference in fuel injection amount being zero or a value within the predetermined range; and repeatedly correct the measured value, the estimated value or the target value of the parameter relevant to intake oxygen concentration until being determined as the difference in the parameter relevant to intake oxygen concentration being zero or a value within the predetermined range.

16. The control device according to claim 15, wherein the control device is configured so as to accumulate:

the first correction amount every time the target value of the fuel injection amount being corrected;

the second correction amount every time the target value of the fuel injection amount being corrected;

the third correction amount every time the measured value, the estimated value or the target value of the parameter relevant to intake oxygen concentration being corrected; and the fourth correction amount every time the measured value, the estimated value or the target value of the parameter relevant to intake oxygen concentration being corrected, the control device being configured so as to:

determine as the fuel not being normally injected upon at least one of the accumulated value of the first correction amount and the accumulated value of the second correction amount being larger than a predetermined threshold value; and determine as the measured value, the estimated value or the target value of the parameter relevant to intake oxygen concentration not being normally obtained upon at least one of the accumulated value of the third correction amount and the accumulated value of the fourth correction amount being larger than a predetermined threshold value.

17. The control device according to claim 13, wherein the control device is configured to determine at least one of: whether or not the fuel being normally injected; and whether or not the measured value, the estimated value or the target value of the parameter relevant to intake oxygen concentration being normally obtained, the control device being configured so as to:

determine as the fuel not being normally injected upon at least one of the first correction amount and the second correction amount being larger than a predetermined threshold value; and determine as the measured value, the estimated value or the target value of the parameter relevant to intake oxygen concentration not being nounally obtained upon at least one of the third correction amount and the fourth correction amount being larger than a predetermined threshold value.

18. The control device according to claim 12, wherein the control device is configured so as to determine at least one of the following situations:

whether the difference in fuel injection amount being zero, positive or negative;

whether the difference in fuel injection amount being a value within a predetermined range including zero, a value larger than the maximum value in the predetermined range or a value smaller than the minimum value in the predetermined range;

whether the difference in the parameter relevant to intake oxygen concentration being zero, positive or negative; or whether the difference in the parameter relevant to intake oxygen concentration being a value within a predetermined range including zero, a value larger than the maximum value in the predetermined range or a value smaller than the minimum value in the predetermined range, based on both of the first indication and the second indication.

19. The control device according to claim 12, wherein the control device is configured so as to employ an intake air amount as one of the parameter relevant to intake oxygen concentration, the intake air amount being an amount of air introduced into the internal combustion engine.

20. The control device according to claim 12, wherein the NOx referential concentration is determined by using a model for estimating NOx concentration, the model for estimating NOx concentration being configured so as to estimate the NOx concentration based on the fuel injection amount and the intake oxygen concentration.

21. The control device according to claim 20, wherein the first value and the second value are determined by using the model for estimating NOx concentration.

\* \* \* \* \*